US008355862B2

(12) United States Patent
Matas et al.

(10) Patent No.: US 8,355,862 B2
(45) Date of Patent: Jan. 15, 2013

(54) GRAPHICAL USER INTERFACE FOR PRESENTING LOCATION INFORMATION

(75) Inventors: Mike Matas, San Francisco, CA (US); Gregory N. Christie, San Jose, CA (US); Christopher Blumenberg, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1054 days.

(21) Appl. No.: 11/969,901

(22) Filed: Jan. 6, 2008

(65) Prior Publication Data

US 2009/0177385 A1    Jul. 9, 2009

(51) Int. Cl.
*G01C 21/32*    (2006.01)
(52) U.S. Cl. ............ 701/408; 345/441; 455/456.1
(58) Field of Classification Search ............ 701/200, 701/201, 209; 455/456.1, 457
See application file for complete search history.

(56) References Cited

U.S. PATENT DOCUMENTS

| | | | |
|---|---|---|---|
| 4,644,351 A | 2/1987 | Zabarsky et al. |
| 4,903,212 A | 2/1990 | Yokouchi et al. |
| 4,907,159 A | 3/1990 | Mauge et al. |
| 4,999,783 A | 3/1991 | Tenmoku et al. |
| 5,031,104 A | 7/1991 | Ikeda et al. |
| 5,046,011 A | 9/1991 | Kakihara et al. |
| 5,067,081 A | 11/1991 | Person |
| 5,126,941 A | 6/1992 | Gurmu et al. |
| 5,164,904 A | 11/1992 | Sumner |
| 5,170,165 A | 12/1992 | Iihoshi et al. |
| 5,173,691 A | 12/1992 | Sumner |
| 5,182,555 A | 1/1993 | Sumner |
| 5,187,810 A | 2/1993 | Toneyama et al. |
| 5,195,031 A | 3/1993 | Ordish |
| 5,208,763 A | 5/1993 | Hong et al. |
| 5,218,629 A | 6/1993 | Dumond, Jr. et al. |
| 5,243,652 A | 9/1993 | Teare |
| 5,274,560 A | 12/1993 | LaRue |
| 5,289,572 A | 2/1994 | Yano et al. |
| 5,295,064 A | 3/1994 | Malec et al. |
| 5,307,278 A | 4/1994 | Hermans et al. |
| 5,317,311 A | 5/1994 | Martell et al. |
| 5,337,044 A | 8/1994 | Folger et al. |
| 5,339,391 A | 8/1994 | Wroblewski et al. |
| 5,371,678 A | 12/1994 | Nomura |
| 5,374,933 A | 12/1994 | Kao |

(Continued)

FOREIGN PATENT DOCUMENTS

BR    9904979    12/2000

(Continued)

OTHER PUBLICATIONS

U.S. Appl. No. 11/464,671, filed Aug. 15, 2006, Johnson.

(Continued)

*Primary Examiner* — Helal A Algahaim
(74) *Attorney, Agent, or Firm* — Fish & Richardson P.C.

(57) ABSTRACT

Methods, systems, and apparatus, including computer program products, for presenting location information. A first geographic area in which a device is currently located is estimated using a first positioning system. A second geographic area in which the device is currently located is estimated using a second positioning system. A first map view including an indication of the first geographic area on the first map view is presented if the first geographic area is contained within the second geographic area. A second map view including an indication of the second geographic area is presented if the first geographic area is not contained within the second geographic area.

17 Claims, 17 Drawing Sheets

U.S. PATENT DOCUMENTS

| | | | |
|---|---|---|---|
| 5,379,057 A | 1/1995 | Clough et al. | |
| 5,390,125 A | 2/1995 | Sennott et al. | |
| 5,406,490 A | 4/1995 | Braegas | |
| 5,416,712 A | 5/1995 | Geier et al. | |
| 5,416,890 A | 5/1995 | Beretta | |
| 5,463,725 A | 10/1995 | Henckel | |
| 5,469,362 A | 11/1995 | Hunt et al. | |
| 5,479,600 A | 12/1995 | Wroblewski et al. | |
| 5,504,482 A | 4/1996 | Schreder | |
| 5,508,707 A * | 4/1996 | LeBlanc et al. | 342/457 |
| 5,510,801 A | 4/1996 | Engelbrecht et al. | |
| 5,519,760 A | 5/1996 | Borkowski et al. | |
| 5,523,950 A | 6/1996 | Peterson | |
| 5,537,460 A | 7/1996 | Holliday, Jr. et al. | |
| 5,539,395 A | 7/1996 | Buss | |
| 5,539,647 A | 7/1996 | Shibata et al. | |
| 5,552,989 A | 9/1996 | Bertrand | |
| 5,559,520 A | 9/1996 | Barzeger et al. | |
| 5,570,412 A | 10/1996 | LeBlanc | |
| 5,598,572 A | 1/1997 | Tanikoshi et al. | |
| 5,627,547 A | 5/1997 | Ramaswamy et al. | |
| 5,627,549 A | 5/1997 | Park | |
| 5,628,050 A | 5/1997 | McGraw | |
| 5,630,206 A | 5/1997 | Urban et al. | |
| 5,636,245 A | 6/1997 | Ernst | |
| 5,642,303 A | 6/1997 | Small | |
| 5,646,853 A | 7/1997 | Takahashi et al. | |
| 5,654,908 A | 8/1997 | Yokoyama | |
| 5,663,732 A | 9/1997 | Stangeland et al. | |
| 5,675,362 A | 10/1997 | Clough et al. | |
| 5,675,573 A | 10/1997 | Karol et al. | |
| 5,677,837 A | 10/1997 | Reynolds | |
| 5,684,859 A | 11/1997 | Chanroo et al. | |
| 5,689,252 A | 11/1997 | Ayanoglu et al. | |
| 5,689,270 A | 11/1997 | Kelley et al. | |
| 5,689,431 A | 11/1997 | Rudow et al. | |
| 5,708,478 A | 1/1998 | Tognazzini | |
| 5,717,392 A | 2/1998 | Eldridge | |
| 5,732,074 A | 3/1998 | Spaur et al. | |
| 5,742,666 A | 4/1998 | Alpert | |
| 5,745,865 A | 4/1998 | Rostoker et al. | |
| 5,748,109 A | 5/1998 | Kosaka et al. | |
| 5,752,186 A | 5/1998 | Malackowski et al. | |
| 5,754,430 A | 5/1998 | Sawada | |
| 5,758,049 A | 5/1998 | Johnson et al. | |
| 5,760,773 A | 6/1998 | Berman et al. | |
| 5,767,795 A | 6/1998 | Schaphorst | |
| 5,774,824 A | 6/1998 | Streit et al. | |
| 5,774,829 A | 6/1998 | Cisneros et al. | |
| 5,793,630 A | 8/1998 | Theimer | |
| 5,796,365 A | 8/1998 | Lewis et al. | |
| 5,796,613 A | 8/1998 | Kato et al. | |
| 5,806,018 A | 9/1998 | Smith et al. | |
| 5,825,306 A | 10/1998 | Hiyokawa et al. | |
| 5,825,884 A | 10/1998 | Zdepski et al. | |
| 5,831,552 A | 11/1998 | Sogawa et al. | |
| 5,835,061 A | 11/1998 | Stewart | |
| 5,839,086 A | 11/1998 | Hirano | |
| 5,845,227 A | 12/1998 | Peterson | |
| 5,848,373 A | 12/1998 | DeLorme et al. | |
| 5,862,244 A | 1/1999 | Kleiner et al. | |
| 5,867,110 A | 2/1999 | Naito et al. | |
| 5,870,686 A | 2/1999 | Monson | |
| 5,872,526 A | 2/1999 | Tognazzini | |
| 5,873,068 A | 2/1999 | Beaumont et al. | |
| 5,883,580 A | 3/1999 | Briancon | |
| 5,887,269 A | 3/1999 | Brunts et al. | |
| 5,892,454 A | 4/1999 | Schipper et al. | |
| 5,893,898 A | 4/1999 | Tanimoto | |
| 5,898,680 A | 4/1999 | Johnstone | |
| 5,899,954 A | 5/1999 | Sato | |
| 5,905,451 A | 5/1999 | Sakashita | |
| 5,908,465 A | 6/1999 | Ito et al. | |
| 5,910,799 A | 6/1999 | Carpenter | |
| 5,923,861 A | 7/1999 | Bertram et al. | |
| 5,933,094 A | 8/1999 | Goss et al. | |
| 5,933,100 A | 8/1999 | Golding | |
| 5,936,572 A | 8/1999 | Loomis et al. | |
| 5,938,721 A | 8/1999 | Dussell et al. | |
| 5,941,930 A | 8/1999 | Morimoto et al. | |
| 5,941,934 A | 8/1999 | Sato | |
| 5,946,618 A | 8/1999 | Agre et al. | |
| 5,948,040 A | 9/1999 | DeLorme et al. | |
| 5,948,041 A | 9/1999 | Abo et al. | |
| 5,948,061 A | 9/1999 | Merriman et al. | |
| 5,955,973 A | 9/1999 | Anderson | |
| 5,959,577 A | 9/1999 | Fan | |
| 5,959,580 A | 9/1999 | Maloney et al. | |
| 5,968,109 A | 10/1999 | Israni et al. | |
| 5,969,678 A | 10/1999 | Stewart | |
| 5,982,298 A | 11/1999 | Lappenbusch et al. | |
| 5,982,324 A | 11/1999 | Watters et al. | |
| 5,987,381 A | 11/1999 | Oshizawa | |
| 5,991,692 A | 11/1999 | Spencer, II et al. | |
| 5,999,126 A | 12/1999 | Ito | |
| 6,002,932 A | 12/1999 | Kingdon et al. | |
| 6,002,936 A | 12/1999 | Roel-Ng et al. | |
| 6,005,928 A | 12/1999 | Johnson | |
| 6,014,090 A | 1/2000 | Rosen et al. | |
| 6,014,607 A | 1/2000 | Yagyu et al. | |
| 6,023,653 A | 2/2000 | Ichimura et al. | |
| 6,026,375 A | 2/2000 | Hall et al. | |
| 6,028,550 A | 2/2000 | Froeberg et al. | |
| 6,029,069 A | 2/2000 | Takaki | |
| 6,031,490 A | 2/2000 | Forssen et al. | |
| 6,041,280 A | 3/2000 | Kohli et al. | |
| 6,052,645 A | 4/2000 | Harada | |
| 6,058,350 A | 5/2000 | Ihara | |
| 6,064,335 A | 5/2000 | Eschenbach | |
| 6,067,502 A | 5/2000 | Hayashida et al. | |
| 6,069,570 A | 5/2000 | Herring | |
| 6,073,013 A | 6/2000 | Agre et al. | |
| 6,073,062 A | 6/2000 | Hoshino et al. | |
| 6,076,041 A | 6/2000 | Watanabe | |
| 6,078,818 A | 6/2000 | Kingdon et al. | |
| 6,081,206 A | 6/2000 | Kielland | |
| 6,085,090 A | 7/2000 | Yee et al. | |
| 6,085,148 A | 7/2000 | Jamison | |
| 6,087,965 A | 7/2000 | Murphy | |
| 6,088,594 A | 7/2000 | Kingdon et al. | |
| 6,091,956 A | 7/2000 | Hollenberg | |
| 6,091,957 A | 7/2000 | Larkins | |
| 6,092,076 A | 7/2000 | McDonough et al. | |
| 6,094,607 A | 7/2000 | Diesel | |
| 6,101,443 A | 8/2000 | Kato | |
| 6,104,931 A | 8/2000 | Havinis et al. | |
| 6,108,555 A | 8/2000 | Maloney et al. | |
| 6,111,541 A | 8/2000 | Karmel | |
| 6,115,611 A | 9/2000 | Kimoto et al. | |
| 6,115,754 A | 9/2000 | Landgren | |
| 6,119,014 A | 9/2000 | Alperovich et al. | |
| 6,122,520 A | 9/2000 | Want et al. | |
| 6,125,279 A | 9/2000 | Hyziak et al. | |
| 6,127,945 A | 10/2000 | Mura-Smith | |
| 6,128,482 A | 10/2000 | Nixon et al. | |
| 6,128,571 A | 10/2000 | Ito et al. | |
| 6,134,548 A | 10/2000 | Gottsman et al. | |
| 6,138,003 A | 10/2000 | Kingdon et al. | |
| 6,138,142 A | 10/2000 | Linsk | |
| 6,140,957 A | 10/2000 | Wilson et al. | |
| 6,151,309 A | 11/2000 | Busuioc et al. | |
| 6,151,498 A | 11/2000 | Roel-Ng et al. | |
| 6,154,152 A | 11/2000 | Ito | |
| 6,157,381 A | 12/2000 | Bates et al. | |
| 6,157,841 A | 12/2000 | Bolduc et al. | |
| 6,163,749 A | 12/2000 | McDonough et al. | |
| 6,166,627 A | 12/2000 | Reeley | |
| 6,167,266 A | 12/2000 | Havinis et al. | |
| 6,169,552 B1 | 1/2001 | Endo et al. | |
| 6,175,740 B1 | 1/2001 | Souissi et al. | |
| 6,177,905 B1 | 1/2001 | Welch | |
| 6,177,938 B1 | 1/2001 | Gould | |
| 6,181,934 B1 | 1/2001 | Havinis et al. | |
| 6,185,427 B1 | 2/2001 | Krasner et al. | |
| 6,188,959 B1 | 2/2001 | Schupfner | |
| 6,195,557 B1 | 2/2001 | Havinis et al. | |
| 6,195,609 B1 | 2/2001 | Pilley et al. | |

| | | |
|---|---|---|
| 6,199,014 B1 | 3/2001 | Walker |
| 6,199,045 B1 | 3/2001 | Giniger et al. |
| 6,199,099 B1 | 3/2001 | Gershman et al. |
| 6,202,008 B1 | 3/2001 | Beckert et al. |
| 6,202,023 B1 | 3/2001 | Hancock et al. |
| 6,208,866 B1 | 3/2001 | Rouhollahzadeh et al. |
| 6,212,473 B1 | 4/2001 | Stefan et al. |
| 6,216,086 B1 | 4/2001 | Seymour et al. |
| 6,222,483 B1 | 4/2001 | Twitchell et al. |
| 6,233,518 B1 | 5/2001 | Lee |
| 6,236,365 B1 | 5/2001 | LeBlanc et al. |
| 6,236,933 B1 | 5/2001 | Lang |
| 6,246,948 B1 | 6/2001 | Thakker |
| 6,249,252 B1 | 6/2001 | Dupray |
| 6,252,543 B1 | 6/2001 | Camp |
| 6,252,544 B1 | 6/2001 | Hoffberg |
| 6,256,498 B1 | 7/2001 | Ludwig |
| 6,259,405 B1 | 7/2001 | Stewart et al. |
| 6,266,612 B1 | 7/2001 | Dussell et al. |
| 6,266,614 B1 | 7/2001 | Alumbaugh |
| 6,266,615 B1 | 7/2001 | Jin |
| 6,272,342 B1 | 8/2001 | Havinis et al. |
| 6,278,884 B1 | 8/2001 | Kim |
| 6,281,807 B1 | 8/2001 | Kynast et al. |
| 6,282,491 B1 | 8/2001 | Bochmann et al. |
| 6,282,496 B1 | 8/2001 | Chowdhary |
| 6,295,454 B1 | 9/2001 | Havinis et al. |
| 6,298,306 B1 | 10/2001 | Suarez et al. |
| 6,304,758 B1 | 10/2001 | Iierbig et al. |
| 6,313,761 B1 | 11/2001 | Shinada |
| 6,314,369 B1 | 11/2001 | Ito et al. |
| 6,314,406 B1 | 11/2001 | O'Hagan et al. |
| 6,317,684 B1 | 11/2001 | Roeseler et al. |
| 6,321,158 B1 | 11/2001 | DeLorme et al. |
| 6,323,846 B1 | 11/2001 | Westerman et al. |
| 6,324,692 B1 | 11/2001 | Fiske |
| 6,326,918 B1 | 12/2001 | Stewart |
| 6,332,127 B1 | 12/2001 | Bandera et al. |
| 6,339,437 B1 | 1/2002 | Nielsen |
| 6,339,746 B1 | 1/2002 | Sugiyama et al. |
| 6,343,317 B1 | 1/2002 | Glorikian |
| 6,345,288 B1 | 2/2002 | Reed et al. |
| 6,351,235 B1 | 2/2002 | Stilp |
| 6,353,398 B1 | 3/2002 | Amin et al. |
| 6,353,743 B1 | 3/2002 | Karmel |
| 6,353,837 B1 | 3/2002 | Blumenau |
| 6,356,761 B1 | 3/2002 | Huttunen |
| 6,356,763 B1 | 3/2002 | Kangas et al. |
| 6,356,836 B1 | 3/2002 | Adolph |
| 6,356,838 B1 | 3/2002 | Paul |
| 6,370,629 B1 | 4/2002 | Hastings et al. |
| 6,377,886 B1 | 4/2002 | Gotou |
| 6,381,465 B1 | 4/2002 | Chern et al. |
| 6,381,539 B1 | 4/2002 | Shimazu |
| 6,381,603 B1 | 4/2002 | Chan et al. |
| 6,385,458 B1 | 5/2002 | Papadimitriou et al. |
| 6,385,465 B1 | 5/2002 | Yoshioka |
| 6,385,535 B2 | 5/2002 | Ohishi et al. |
| 6,389,288 B1 | 5/2002 | Kuwahara et al. |
| 6,401,032 B1 | 6/2002 | Jamison |
| 6,405,034 B1 | 6/2002 | Tijerino |
| 6,405,123 B1 | 6/2002 | Rennar et al. |
| 6,411,899 B2 | 6/2002 | Dussell et al. |
| 6,414,635 B1 * | 7/2002 | Stewart et al. ................ 342/457 |
| 6,415,207 B1 | 7/2002 | Jones |
| 6,415,220 B1 | 7/2002 | Kovacs |
| 6,415,227 B1 | 7/2002 | Lin |
| 6,427,115 B1 | 7/2002 | Sekiyama |
| 6,430,411 B1 | 8/2002 | Lempio et al. |
| 6,434,530 B1 | 8/2002 | Sloane et al. |
| 6,438,490 B2 | 8/2002 | Ohta |
| 6,449,485 B1 | 9/2002 | Anzil |
| 6,452,498 B2 | 9/2002 | Stewart |
| 6,456,234 B1 | 9/2002 | Johnson |
| 6,456,956 B1 | 9/2002 | Xiong |
| 6,459,782 B1 | 10/2002 | Bedrosian et al. |
| 6,463,289 B1 | 10/2002 | Havinis et al. |
| 6,477,581 B1 | 11/2002 | Carpenter |
| 6,487,305 B2 | 11/2002 | Kambe et al. |
| 6,490,454 B1 | 12/2002 | Kangas et al. |
| 6,490,519 B1 | 12/2002 | Lapidot et al. |
| 6,501,421 B1 | 12/2002 | Dutta et al. |
| 6,505,046 B1 | 1/2003 | Baker |
| 6,505,048 B1 | 1/2003 | Moles et al. |
| 6,505,123 B1 | 1/2003 | Root et al. |
| 6,507,802 B1 | 1/2003 | Payton et al. |
| 6,516,197 B2 | 2/2003 | Havinis et al. |
| 6,519,463 B2 | 2/2003 | Tendler |
| 6,526,335 B1 | 2/2003 | Treyz et al. |
| 6,529,143 B2 | 3/2003 | Mikkola et al. |
| 6,535,140 B1 | 3/2003 | Goss et al. |
| 6,542,812 B1 | 4/2003 | Obradovich et al. |
| 6,542,819 B1 | 4/2003 | Kovacs et al. |
| 6,546,360 B1 | 4/2003 | Gilbert et al. |
| 6,552,682 B1 | 4/2003 | Fan |
| 6,563,430 B1 | 5/2003 | Kemink et al. |
| 6,564,143 B1 | 5/2003 | Alewine et al. |
| 6,570,557 B1 | 5/2003 | Westerman et al. |
| 6,571,279 B1 | 5/2003 | Herz et al. |
| 6,574,484 B1 | 6/2003 | Carley |
| 6,587,688 B1 | 7/2003 | Chambers et al. |
| 6,587,782 B1 | 7/2003 | Nocek et al. |
| 6,587,835 B1 | 7/2003 | Treyz et al. |
| 6,594,480 B1 | 7/2003 | Montalvo et al. |
| 6,597,305 B2 | 7/2003 | Szeto et al. |
| 6,611,687 B1 | 8/2003 | Clark et al. |
| 6,611,788 B1 | 8/2003 | Hussa |
| 6,615,131 B1 | 9/2003 | Rennard et al. |
| 6,615,213 B1 | 9/2003 | Johnson |
| 6,647,257 B2 | 11/2003 | Owensby |
| 6,650,902 B1 | 11/2003 | Richton |
| 6,650,997 B2 | 11/2003 | Funk |
| 6,662,016 B1 | 12/2003 | Buckham et al. |
| 6,662,023 B1 | 12/2003 | Helle |
| 6,667,963 B1 | 12/2003 | Rantalainen et al. |
| 6,671,377 B1 | 12/2003 | Havinis et al. |
| 6,674,849 B1 | 1/2004 | Froeberg |
| 6,677,894 B2 | 1/2004 | Sheynblat et al. |
| 6,678,516 B2 | 1/2004 | Nordman et al. |
| 6,679,932 B2 | 1/2004 | Birler et al. |
| 6,680,694 B1 | 1/2004 | Knockeart et al. |
| 6,681,120 B1 | 1/2004 | Kim |
| 6,683,538 B1 | 1/2004 | Wilkes, Jr. |
| 6,697,018 B2 | 2/2004 | Stewart |
| 6,697,734 B1 | 2/2004 | Suomela |
| 6,711,408 B1 * | 3/2004 | Raith ........................... 455/440 |
| 6,711,474 B1 | 3/2004 | Treyz et al. |
| 6,714,791 B2 | 3/2004 | Friedman |
| 6,718,344 B2 | 4/2004 | Hirono |
| 6,721,572 B1 | 4/2004 | Smith et al. |
| 6,731,236 B1 | 5/2004 | Hager et al. |
| 6,731,238 B1 | 5/2004 | Johnson |
| 6,732,047 B1 | 5/2004 | de Silva |
| 6,738,808 B1 | 5/2004 | Zellner et al. |
| 6,741,188 B1 | 5/2004 | Miller et al. |
| 6,741,926 B1 | 5/2004 | Zhao et al. |
| 6,748,226 B1 | 6/2004 | Wortham |
| 6,748,318 B1 | 6/2004 | Jones |
| 6,750,883 B1 | 6/2004 | Parupudi et al. |
| 6,759,960 B2 | 7/2004 | Stewart |
| 6,762,772 B1 | 7/2004 | Imamura et al. |
| 6,766,174 B1 | 7/2004 | Kenyon |
| 6,781,575 B1 | 8/2004 | Hawkins et al. |
| 6,782,278 B2 | 8/2004 | Chen et al. |
| 6,789,012 B1 | 9/2004 | Childs et al. |
| 6,795,686 B2 | 9/2004 | Master et al. |
| 6,801,855 B1 | 10/2004 | Walters et al. |
| 6,810,323 B1 | 10/2004 | Bullock et al. |
| 6,813,501 B2 | 11/2004 | Kinnunen et al. |
| 6,813,503 B1 | 11/2004 | Zillikens et al. |
| 6,816,782 B1 | 11/2004 | Walters et al. |
| 6,819,919 B1 | 11/2004 | Tanaka |
| 6,823,188 B1 | 11/2004 | Stern |
| 6,834,195 B2 | 12/2004 | Brandenberg et al. |
| 6,845,318 B1 | 1/2005 | Moore et al. |
| 6,847,891 B2 | 1/2005 | Pietras et al. |
| 6,847,969 B1 | 1/2005 | Mathai et al. |
| 6,853,911 B1 | 2/2005 | Sakarya |

| | | |
|---|---|---|
| 6,853,917 B2 | 2/2005 | Miwa |
| 6,859,149 B1 | 2/2005 | Ohta |
| 6,865,483 B1 | 3/2005 | Cook, III et al. |
| 6,868,074 B1 | 3/2005 | Hanson |
| 6,871,144 B1 | 3/2005 | Lee |
| 6,882,313 B1 | 4/2005 | Fan et al. |
| 6,888,536 B2 | 5/2005 | Westerman et al. |
| 6,909,902 B1 | 6/2005 | Sawada et al. |
| 6,912,398 B1 | 6/2005 | Domnitz |
| 6,914,626 B2 | 7/2005 | Squibbs |
| 6,915,208 B2 | 7/2005 | Garin et al. |
| 6,933,841 B2 | 8/2005 | Muramatsu et al. |
| 6,944,447 B2 | 9/2005 | Portman et al. |
| 6,948,656 B2 | 9/2005 | Williams |
| 6,954,646 B2 | 10/2005 | Churt |
| 6,954,735 B1 | 10/2005 | Djupsjobacka et al. |
| 6,957,072 B2 | 10/2005 | Kangras et al. |
| 6,975,959 B2 | 12/2005 | Dietrich et al. |
| 6,980,909 B2 | 12/2005 | Root et al. |
| 6,990,495 B1 | 1/2006 | Grason et al. |
| 6,999,779 B1 | 2/2006 | Hashimoto |
| 7,003,289 B1 | 2/2006 | Kolls |
| 7,009,556 B2 | 3/2006 | Stewart |
| 7,031,725 B2 | 4/2006 | Rorabaugh |
| 7,044,372 B2 | 5/2006 | Okuda et al. |
| 7,058,594 B2 | 6/2006 | Stewart |
| 7,076,255 B2 | 7/2006 | Parupudi et al. |
| 7,089,264 B1 * | 8/2006 | Guido et al. .................... 1/1 |
| 7,096,029 B1 | 8/2006 | Parupudi et al. |
| 7,096,030 B2 | 8/2006 | Huomo |
| 7,103,470 B2 | 9/2006 | Mintz |
| 7,117,015 B2 | 10/2006 | Scheinert et al. |
| 7,120,469 B1 | 10/2006 | Urakawa |
| 7,123,189 B2 | 10/2006 | Lalik et al. |
| 7,123,926 B2 | 10/2006 | Himmelstein |
| 7,146,298 B2 | 12/2006 | Motamedi et al. |
| 7,149,503 B2 | 12/2006 | Aarnio et al. |
| 7,151,921 B2 | 12/2006 | Otsuka |
| 7,165,725 B2 | 1/2007 | Casey |
| 7,171,190 B2 | 1/2007 | Ye et al. |
| 7,181,189 B2 | 2/2007 | Hotta et al. |
| 7,187,997 B2 | 3/2007 | Johnson |
| 7,200,409 B1 | 4/2007 | Ichikawa et al. |
| 7,200,566 B1 | 4/2007 | Moore et al. |
| 7,213,048 B1 | 5/2007 | Parupudi et al. |
| 7,215,967 B1 | 5/2007 | Kransmo et al. |
| 7,236,883 B2 | 6/2007 | Garin et al. |
| 7,254,481 B2 | 8/2007 | Yamada et al. |
| 7,256,711 B2 | 8/2007 | Sheha et al. |
| 7,257,392 B2 | 8/2007 | Tang et al. |
| 7,260,378 B2 | 8/2007 | Holland et al. |
| 7,266,376 B2 | 9/2007 | Nakagawa |
| 7,269,601 B2 | 9/2007 | Kinno et al. |
| 7,271,765 B2 | 9/2007 | Stilp et al. |
| 7,272,403 B2 | 9/2007 | Creamer et al. |
| 7,272,404 B2 | 9/2007 | Overy et al. |
| 7,274,332 B1 | 9/2007 | Dupray |
| 7,274,939 B2 | 9/2007 | Ruutu et al. |
| 7,280,822 B2 | 10/2007 | Fraccaroli |
| 7,295,556 B2 | 11/2007 | Roese et al. |
| 7,295,925 B2 | 11/2007 | Breed et al. |
| 7,299,008 B2 | 11/2007 | Gluck |
| 7,310,516 B1 | 12/2007 | Vacanti |
| 7,313,467 B2 | 12/2007 | Breed et al. |
| 7,319,412 B1 | 1/2008 | Coppinger et al. |
| 7,336,928 B2 | 2/2008 | Paalasmaa et al. |
| 7,336,949 B2 | 2/2008 | Nasielski |
| 7,339,496 B2 | 3/2008 | Endo et al. |
| 7,343,564 B2 | 3/2008 | Othmer |
| 7,349,706 B2 | 3/2008 | Kim et al. |
| 7,359,713 B1 | 4/2008 | Tiwari |
| 7,370,283 B2 | 5/2008 | Othmer |
| 7,373,246 B2 * | 5/2008 | O'Clair .................... 701/208 |
| 7,386,396 B2 | 6/2008 | Johnson |
| 7,389,179 B2 | 6/2008 | Jin et al. |
| 7,392,017 B2 | 6/2008 | Chu et al. |
| 7,395,031 B1 | 7/2008 | Ritter |
| 7,418,402 B2 | 8/2008 | McCrossin et al. |
| 7,421,422 B1 | 9/2008 | Dempster et al. |
| 7,421,486 B1 | 9/2008 | Parupudi et al. |
| 7,426,437 B2 | 9/2008 | Breed et al. |
| 7,433,694 B2 | 10/2008 | Morgan et al. |
| 7,440,842 B1 | 10/2008 | Vorona |
| 7,466,235 B1 | 12/2008 | Kolb et al. |
| 7,483,944 B2 | 1/2009 | Parupudi et al. |
| 7,486,201 B2 | 2/2009 | Kelly et al. |
| 7,500,607 B2 | 3/2009 | Williams |
| 7,512,487 B1 | 3/2009 | Golding et al. |
| 7,522,927 B2 | 4/2009 | Fitch et al. |
| 7,536,388 B2 | 5/2009 | Jung et al. |
| 7,545,281 B2 | 6/2009 | Richards et al. |
| 7,558,696 B2 | 7/2009 | Vilppula et al. |
| 7,565,132 B2 | 7/2009 | Ayed |
| 7,565,157 B1 | 7/2009 | Ortega et al. |
| 7,574,222 B2 | 8/2009 | Sawada et al. |
| 7,577,448 B2 | 8/2009 | Pande et al. |
| 7,587,345 B2 * | 9/2009 | Mann et al. .................... 705/28 |
| 7,593,740 B2 | 9/2009 | Crowley et al. |
| 7,593,991 B2 | 9/2009 | Friedman et al. |
| 7,599,795 B1 | 10/2009 | Blumberg et al. |
| 7,603,233 B2 | 10/2009 | Tashiro |
| 7,606,580 B2 | 10/2009 | Granito et al. |
| 7,617,044 B2 | 11/2009 | Lee |
| 7,620,404 B2 | 11/2009 | Chesnais et al. |
| 7,623,848 B2 | 11/2009 | Rosenfelt et al. |
| 7,624,358 B2 | 11/2009 | Kim et al. |
| 7,647,174 B2 | 1/2010 | Kwon |
| 7,680,591 B2 | 3/2010 | Nagata et al. |
| 7,689,916 B1 | 3/2010 | Goel et al. |
| 7,710,290 B2 | 5/2010 | Johnson |
| 7,711,478 B2 | 5/2010 | Gluck |
| 7,714,778 B2 | 5/2010 | Dupray |
| 7,729,691 B2 | 6/2010 | Newville |
| 7,739,040 B2 | 6/2010 | Horvitz |
| 7,743,074 B1 | 6/2010 | Parupudi et al. |
| 7,756,639 B2 | 7/2010 | Colley et al. |
| 7,768,395 B2 * | 8/2010 | Gold .................... 340/539.2 |
| 7,792,273 B2 | 9/2010 | Fano et al. |
| 7,811,203 B2 | 10/2010 | Unuma et al. |
| 7,817,033 B2 | 10/2010 | Motoyama |
| 7,848,388 B2 | 12/2010 | Tudosoiu |
| 7,848,765 B2 | 12/2010 | Phillips et al. |
| 7,860,758 B2 | 12/2010 | McCrossin et al. |
| 7,890,123 B2 | 2/2011 | Granito et al. |
| 7,933,929 B1 | 4/2011 | McClendon et al. |
| 7,941,188 B2 | 5/2011 | Jung et al. |
| 7,970,418 B2 | 6/2011 | Schmidt et al. |
| 7,979,350 B1 | 7/2011 | Carion |
| 7,991,432 B2 | 8/2011 | Silverbrook et al. |
| 8,036,630 B2 | 10/2011 | Park et al. |
| 8,046,009 B2 | 10/2011 | Bodmer et al. |
| 2001/0018349 A1 | 8/2001 | Kinnunen et al. |
| 2001/0046884 A1 | 11/2001 | Yoshioka |
| 2002/0032035 A1 * | 3/2002 | Teshima .................... 455/456 |
| 2002/0035493 A1 | 3/2002 | Mozayeny et al. |
| 2002/0035609 A1 | 3/2002 | Lessard et al. |
| 2002/0042266 A1 | 4/2002 | Heyward et al. |
| 2002/0046069 A1 | 4/2002 | Mozayeny et al. |
| 2002/0046077 A1 | 4/2002 | Mozayeny et al. |
| 2002/0046084 A1 | 4/2002 | Steele et al. |
| 2002/0055373 A1 | 5/2002 | King et al. |
| 2002/0067353 A1 | 6/2002 | Kenyon et al. |
| 2002/0077144 A1 | 6/2002 | Keller et al. |
| 2002/0087505 A1 | 7/2002 | Smith et al. |
| 2002/0091991 A1 | 7/2002 | Castro |
| 2002/0095486 A1 | 7/2002 | Bahl |
| 2002/0126146 A1 | 9/2002 | Burns et al. |
| 2002/0128773 A1 | 9/2002 | Chowanic et al. |
| 2002/0132625 A1 | 9/2002 | Ogino et al. |
| 2002/0140560 A1 | 10/2002 | Altman et al. |
| 2002/0160815 A1 | 10/2002 | Patel et al. |
| 2002/0167442 A1 | 11/2002 | Taylor |
| 2002/0173905 A1 | 11/2002 | Jin et al. |
| 2003/0014181 A1 | 1/2003 | Myr |
| 2003/0016804 A1 | 1/2003 | Sheha et al. |
| 2003/0032404 A1 * | 2/2003 | Wager et al. .................... 455/406 |
| 2003/0055560 A1 | 3/2003 | Phillips et al. |
| 2003/0060212 A1 | 3/2003 | Thomas |

| | | | | | | |
|---|---|---|---|---|---|---|
| 2003/0060215 A1* | 3/2003 | Graham ............... 455/456 | | 2005/0153681 A1 | 7/2005 | Hanson |
| 2003/0060973 A1 | 3/2003 | Mathews et al. | | 2005/0176411 A1 | 8/2005 | Taya |
| 2003/0060976 A1 | 3/2003 | Sato et al. | | 2005/0186954 A1 | 8/2005 | Kenney |
| 2003/0065934 A1 | 4/2003 | Angelo et al. | | 2005/0192025 A1 | 9/2005 | Kaplan |
| 2003/0069029 A1 | 4/2003 | Dowling et al. | | 2005/0197767 A1 | 9/2005 | Nortrup |
| 2003/0069683 A1 | 4/2003 | Lapidot et al. | | 2005/0203698 A1 | 9/2005 | Lee |
| 2003/0078054 A1 | 4/2003 | Okuda | | 2005/0221799 A1 | 10/2005 | Tervo et al. |
| 2003/0078055 A1 | 4/2003 | Smith et al. | | 2005/0221808 A1 | 10/2005 | Karlsson et al. |
| 2003/0078057 A1 | 4/2003 | Watanabe et al. | | 2005/0221843 A1 | 10/2005 | Friedman et al. |
| 2003/0093217 A1 | 5/2003 | Petzold et al. | | 2005/0222756 A1 | 10/2005 | Davis et al. |
| 2003/0096620 A1* | 5/2003 | Ozturk et al. ............. 455/456 | | 2005/0222763 A1 | 10/2005 | Uyeki |
| 2003/0100326 A1 | 5/2003 | Grube et al. | | 2005/0227709 A1 | 10/2005 | Chang et al. |
| 2003/0100334 A1 | 5/2003 | Mazzara, Jr. | | 2005/0228860 A1 | 10/2005 | Hamynen et al. |
| 2003/0101225 A1 | 5/2003 | Han et al. | | 2005/0234637 A1 | 10/2005 | Obradovich et al. |
| 2003/0120423 A1 | 6/2003 | Cochlovius et al. | | 2005/0239477 A1 | 10/2005 | Kim et al. |
| 2003/0134657 A1 | 7/2003 | Norta et al. | | 2005/0250440 A1 | 11/2005 | Zhou et al. |
| 2003/0140136 A1 | 7/2003 | Nakamura | | 2005/0256639 A1 | 11/2005 | Aleksic et al. |
| 2003/0144793 A1 | 7/2003 | Melaku et al. | | 2005/0286421 A1 | 12/2005 | Janacek |
| 2003/0148774 A1 | 8/2003 | Naghian et al. | | 2006/0009908 A1 | 1/2006 | Tomita et al. |
| 2003/0158655 A1 | 8/2003 | Obradovich et al. | | 2006/0015249 A1 | 1/2006 | Gieseke |
| 2003/0191578 A1 | 10/2003 | Paulauskas et al. | | 2006/0022048 A1 | 2/2006 | Johnson |
| 2003/0236106 A1 | 12/2003 | Master et al. | | 2006/0029109 A1 | 2/2006 | Moran |
| 2004/0010358 A1 | 1/2004 | Oesterling et al. | | 2006/0038719 A1 | 2/2006 | Pande et al. |
| 2004/0036649 A1 | 2/2004 | Taylor | | 2006/0041374 A1 | 2/2006 | Inoue |
| 2004/0054428 A1 | 3/2004 | Sheha et al. | | 2006/0041377 A1 | 2/2006 | Jung et al. |
| 2004/0059502 A1 | 3/2004 | Levi et al. | | 2006/0041378 A1 | 2/2006 | Cheng et al. |
| 2004/0068439 A1 | 4/2004 | Elgrably | | 2006/0056388 A1 | 3/2006 | Livingwood |
| 2004/0072577 A1 | 4/2004 | Myllymaki et al. | | 2006/0058955 A1 | 3/2006 | Mehren |
| 2004/0073361 A1 | 4/2004 | Tzamaloukas et al. | | 2006/0063539 A1 | 3/2006 | Beyer, Jr. |
| 2004/0082351 A1 | 4/2004 | Westman | | 2006/0068809 A1 | 3/2006 | Wengler et al. |
| 2004/0083050 A1 | 4/2004 | Biyani | | 2006/0069503 A1 | 3/2006 | Suomela |
| 2004/0093155 A1 | 5/2004 | Simonds | | 2006/0085392 A1* | 4/2006 | Wang et al. ............... 707/3 |
| 2004/0104842 A1* | 6/2004 | Drury et al. ............. 342/357.13 | | 2006/0094353 A1 | 5/2006 | Nielsen et al. |
| 2004/0110515 A1 | 6/2004 | Blumberg et al. | | 2006/0101005 A1* | 5/2006 | Yang et al. ............... 707/3 |
| 2004/0128067 A1 | 7/2004 | Smith | | 2006/0111122 A1 | 5/2006 | Carlson et al. |
| 2004/0151151 A1 | 8/2004 | Kubler et al. | | 2006/0116137 A1 | 6/2006 | Jung |
| 2004/0158401 A1 | 8/2004 | Yoon | | 2006/0148463 A1 | 7/2006 | Zhu et al. |
| 2004/0158584 A1 | 8/2004 | Necsoiu et al. | | 2006/0149461 A1 | 7/2006 | Rowley |
| 2004/0172409 A1 | 9/2004 | James | | 2006/0150119 A1 | 7/2006 | Chesnais et al. |
| 2004/0176907 A1 | 9/2004 | Nesbitt | | 2006/0166679 A1 | 7/2006 | Karaoguz et al. |
| 2004/0180669 A1 | 9/2004 | Kall | | 2006/0168300 A1 | 7/2006 | An et al. |
| 2004/0192299 A1 | 9/2004 | Wilson et al. | | 2006/0172769 A1 | 8/2006 | Oh |
| 2004/0198335 A1 | 10/2004 | Campen | | 2006/0172778 A1 | 8/2006 | Sundararajan et al. |
| 2004/0198379 A1 | 10/2004 | Magee et al. | | 2006/0179114 A1 | 8/2006 | Deeds |
| 2004/0198397 A1* | 10/2004 | Weiss ............... 455/456.5 | | 2006/0180649 A1 | 8/2006 | Casey |
| 2004/0203569 A1 | 10/2004 | Jijina et al. | | 2006/0184978 A1 | 8/2006 | Casey |
| 2004/0203746 A1 | 10/2004 | Knauerhase et al. | | 2006/0195481 A1 | 8/2006 | Arrouye et al. |
| 2004/0203836 A1 | 10/2004 | Gorday et al. | | 2006/0199567 A1 | 9/2006 | Alston |
| 2004/0203880 A1 | 10/2004 | Riley | | 2006/0202819 A1 | 9/2006 | Adamczyk et al. |
| 2004/0203909 A1 | 10/2004 | Koster | | 2006/0211453 A1 | 9/2006 | Schick |
| 2004/0215707 A1 | 10/2004 | Fujita et al. | | 2006/0218209 A1 | 9/2006 | Arrouye et al. |
| 2004/0225436 A1 | 11/2004 | Yoshihashi | | 2006/0227047 A1 | 10/2006 | Rosenberg |
| 2004/0228330 A1 | 11/2004 | Kubler et al. | | 2006/0229802 A1 | 10/2006 | Vertelney et al. |
| 2004/0236504 A1 | 11/2004 | Bickford et al. | | 2006/0237385 A1 | 10/2006 | Baker |
| 2004/0242149 A1 | 12/2004 | Luneau | | 2006/0247855 A1* | 11/2006 | de Silva et al. ............. 701/212 |
| 2004/0246940 A1 | 12/2004 | Kubler et al. | | 2006/0251034 A1 | 11/2006 | Park |
| 2004/0248586 A1 | 12/2004 | Patel et al. | | 2006/0270421 A1 | 11/2006 | Phillips et al. |
| 2004/0260939 A1 | 12/2004 | Ichikawa et al. | | 2006/0271280 A1* | 11/2006 | O'Clair ............... 701/208 |
| 2004/0263084 A1 | 12/2004 | Mor et al. | | 2006/0284767 A1 | 12/2006 | Taylor |
| 2004/0264442 A1 | 12/2004 | Kubler et al. | | 2006/0288824 A1 | 12/2006 | Lin |
| 2005/0002419 A1 | 1/2005 | Doviak et al. | | 2006/0291639 A1 | 12/2006 | Radziewicz et al. |
| 2005/0004838 A1 | 1/2005 | Perkowski et al. | | 2006/0293069 A1 | 12/2006 | Jha et al. |
| 2005/0009511 A1 | 1/2005 | Bostrom et al. | | 2006/0293083 A1 | 12/2006 | Bowen |
| 2005/0027442 A1 | 2/2005 | Kelley et al. | | 2007/0001875 A1 | 1/2007 | Taylor |
| 2005/0033515 A1 | 2/2005 | Bozzone | | 2007/0003040 A1 | 1/2007 | Radziewicz et al. |
| 2005/0037781 A1 | 2/2005 | Ozugur et al. | | 2007/0005188 A1 | 1/2007 | Johnson |
| 2005/0039140 A1 | 2/2005 | Chen | | 2007/0005233 A1 | 1/2007 | Pinkus et al. |
| 2005/0046584 A1 | 3/2005 | Breed | | 2007/0006098 A1 | 1/2007 | Krumm et al. |
| 2005/0071078 A1 | 3/2005 | Yamada et al. | | 2007/0008515 A1* | 1/2007 | Otani et al. ............... 356/5.02 |
| 2005/0071702 A1 | 3/2005 | Morisawa | | 2007/0010942 A1 | 1/2007 | Bill |
| 2005/0075116 A1 | 4/2005 | Laird | | 2007/0016362 A1 | 1/2007 | Nelson |
| 2005/0085272 A1 | 4/2005 | Anderson et al. | | 2007/0027614 A1 | 2/2007 | Reeser et al. |
| 2005/0091408 A1 | 4/2005 | Parupudi et al. | | 2007/0027628 A1 | 2/2007 | Geelen |
| 2005/0096840 A1 | 5/2005 | Simske | | 2007/0042790 A1 | 2/2007 | Mohi et al. |
| 2005/0114021 A1 | 5/2005 | Krull et al. | | 2007/0055684 A1 | 3/2007 | Steven |
| 2005/0130677 A1 | 6/2005 | Meunier et al. | | 2007/0060328 A1 | 3/2007 | Zrike et al. |
| 2005/0134440 A1 | 6/2005 | Breed | | 2007/0061245 A1 | 3/2007 | Ramer et al. |
| 2005/0134578 A1 | 6/2005 | Chambers et al. | | 2007/0061301 A1 | 3/2007 | Ramer et al. |
| 2005/0149250 A1 | 7/2005 | Isaac | | 2007/0061363 A1 | 3/2007 | Ramer et al. |

| Publication No. | Date | Inventor | Ref |
|---|---|---|---|
| 2007/0071114 A1* | 3/2007 | Sanderford et al. | 375/259 |
| 2007/0073480 A1* | 3/2007 | Singh | 701/211 |
| 2007/0073719 A1 | 3/2007 | Ramer et al. | |
| 2007/0087726 A1 | 4/2007 | McGary et al. | |
| 2007/0093258 A1 | 4/2007 | Steenstra et al. | |
| 2007/0106465 A1 | 5/2007 | Adam et al. | |
| 2007/0115868 A1 | 5/2007 | Chen et al. | |
| 2007/0123490 A1 | 5/2007 | Yokoyama | |
| 2007/0124043 A1 | 5/2007 | Ayoub et al. | |
| 2007/0124058 A1 | 5/2007 | Kitagawa et al. | |
| 2007/0124066 A1 | 5/2007 | Kikuchi | |
| 2007/0127661 A1 | 6/2007 | Didcock | |
| 2007/0129888 A1 | 6/2007 | Rosenberg | |
| 2007/0130153 A1 | 6/2007 | Nachman et al. | |
| 2007/0135136 A1 | 6/2007 | Ische | |
| 2007/0135990 A1 | 6/2007 | Seymour et al. | |
| 2007/0142026 A1 | 6/2007 | Kuz et al. | |
| 2007/0149212 A1 | 6/2007 | Gupta et al. | |
| 2007/0150320 A1 | 6/2007 | Huang | |
| 2007/0153983 A1 | 7/2007 | Bloebaum et al. | |
| 2007/0153984 A1 | 7/2007 | Bloebaum et al. | |
| 2007/0153986 A1 | 7/2007 | Bloebaum et al. | |
| 2007/0155360 A1 | 7/2007 | An | |
| 2007/0156326 A1 | 7/2007 | Nesbitt | |
| 2007/0162224 A1 | 7/2007 | Luo | |
| 2007/0179854 A1 | 8/2007 | Ziv et al. | |
| 2007/0184855 A1 | 8/2007 | Klassen | |
| 2007/0191029 A1* | 8/2007 | Zarem et al. | 455/456.5 |
| 2007/0200713 A1 | 8/2007 | Weber et al. | |
| 2007/0204218 A1 | 8/2007 | Weber et al. | |
| 2007/0206730 A1 | 9/2007 | Polk | |
| 2007/0208492 A1 | 9/2007 | Downs et al. | |
| 2007/0208497 A1 | 9/2007 | Downs et al. | |
| 2007/0208498 A1 | 9/2007 | Barker et al. | |
| 2007/0218925 A1 | 9/2007 | Islam et al. | |
| 2007/0219706 A1 | 9/2007 | Sheynblat | |
| 2007/0229549 A1 | 10/2007 | Dicke et al. | |
| 2007/0232272 A1 | 10/2007 | Gonsalves et al. | |
| 2007/0232326 A1 | 10/2007 | Johnson | |
| 2007/0233387 A1 | 10/2007 | Johnson | |
| 2007/0238491 A1 | 10/2007 | He | |
| 2007/0243853 A1 | 10/2007 | Bumiller et al. | |
| 2007/0247435 A1 | 10/2007 | Benko et al. | |
| 2007/0254676 A1 | 11/2007 | Pedigo et al. | |
| 2007/0259674 A1 | 11/2007 | Neef et al. | |
| 2007/0260751 A1 | 11/2007 | Meesseman | |
| 2007/0266116 A1 | 11/2007 | Rensin et al. | |
| 2007/0271328 A1 | 11/2007 | Geelen et al. | |
| 2007/0276586 A1 | 11/2007 | Jeon et al. | |
| 2007/0276587 A1 | 11/2007 | Johnson | |
| 2007/0276596 A1 | 11/2007 | Solomon et al. | |
| 2007/0281664 A1 | 12/2007 | Kaneko et al. | |
| 2007/0282521 A1 | 12/2007 | Broughton | |
| 2007/0282565 A1 | 12/2007 | Bye et al. | |
| 2007/0290920 A1 | 12/2007 | Shintai et al. | |
| 2007/0299601 A1 | 12/2007 | Zhao et al. | |
| 2008/0004789 A1 | 1/2008 | Horvitz et al. | |
| 2008/0004791 A1 | 1/2008 | Sera | |
| 2008/0004802 A1 | 1/2008 | Horvitz | |
| 2008/0005104 A1 | 1/2008 | Flake et al. | |
| 2008/0005301 A1 | 1/2008 | Li et al. | |
| 2008/0015422 A1 | 1/2008 | Wessel | |
| 2008/0021632 A1 | 1/2008 | Amano | |
| 2008/0024360 A1 | 1/2008 | Taylor | |
| 2008/0024364 A1 | 1/2008 | Taylor | |
| 2008/0027636 A1 | 1/2008 | Tengler et al. | |
| 2008/0030308 A1 | 2/2008 | Johnson | |
| 2008/0032703 A1 | 2/2008 | Krumm et al. | |
| 2008/0032721 A1 | 2/2008 | MacDonald et al. | |
| 2008/0045234 A1 | 2/2008 | Reed | |
| 2008/0046176 A1 | 2/2008 | Jurgens | |
| 2008/0052407 A1 | 2/2008 | Baudino et al. | |
| 2008/0065311 A1 | 3/2008 | Bauchot et al. | |
| 2008/0070593 A1 | 3/2008 | Altman et al. | |
| 2008/0071466 A1 | 3/2008 | Downs et al. | |
| 2008/0082254 A1 | 4/2008 | Huhtala et al. | |
| 2008/0085727 A1 | 4/2008 | Kratz | |
| 2008/0086240 A1 | 4/2008 | Breed | |
| 2008/0088486 A1 | 4/2008 | Rozum et al. | |
| 2008/0091347 A1 | 4/2008 | Tashiro | |
| 2008/0096518 A1 | 4/2008 | Mock et al. | |
| 2008/0097698 A1 | 4/2008 | Arnold-Huyser et al. | |
| 2008/0098090 A1 | 4/2008 | Geraci et al. | |
| 2008/0104634 A1 | 5/2008 | Gajdos et al. | |
| 2008/0109153 A1 | 5/2008 | Gueziec | |
| 2008/0129528 A1 | 6/2008 | Guthrie | |
| 2008/0132243 A1 | 6/2008 | Spalink et al. | |
| 2008/0132251 A1 | 6/2008 | Altman et al. | |
| 2008/0132252 A1 | 6/2008 | Altman et al. | |
| 2008/0140308 A1 | 6/2008 | Yamane et al. | |
| 2008/0140520 A1 | 6/2008 | Hyder et al. | |
| 2008/0153512 A1 | 6/2008 | Kale et al. | |
| 2008/0153513 A1 | 6/2008 | Flake et al. | |
| 2008/0155453 A1 | 6/2008 | Othmer | |
| 2008/0160956 A1 | 7/2008 | Jackson et al. | |
| 2008/0161034 A1 | 7/2008 | Akiyama | |
| 2008/0167083 A1 | 7/2008 | Wyld et al. | |
| 2008/0167796 A1 | 7/2008 | Narayanaswami | |
| 2008/0167811 A1 | 7/2008 | Geelen | |
| 2008/0172173 A1 | 7/2008 | Chang et al. | |
| 2008/0172374 A1 | 7/2008 | Wolosin et al. | |
| 2008/0176545 A1 | 7/2008 | Dicke et al. | |
| 2008/0177793 A1 | 7/2008 | Epstein et al. | |
| 2008/0178116 A1 | 7/2008 | Kim | |
| 2008/0186162 A1 | 8/2008 | Rajan et al. | |
| 2008/0189033 A1 | 8/2008 | Geelen et al. | |
| 2008/0194273 A1 | 8/2008 | Kansal et al. | |
| 2008/0200142 A1 | 8/2008 | Abdel-Kader et al. | |
| 2008/0207167 A1 | 8/2008 | Bugenhagen | |
| 2008/0225779 A1* | 9/2008 | Bragiel et al. | 370/328 |
| 2008/0227473 A1* | 9/2008 | Haney | 455/457 |
| 2008/0233919 A1 | 9/2008 | Kenney | |
| 2008/0248815 A1 | 10/2008 | Busch | |
| 2008/0249667 A1 | 10/2008 | Horvitz et al. | |
| 2008/0268876 A1 | 10/2008 | Gelfand et al. | |
| 2008/0284642 A1 | 11/2008 | Seacat et al. | |
| 2008/0287124 A1* | 11/2008 | Karabinis | 455/427 |
| 2008/0288166 A1 | 11/2008 | Onishi | |
| 2008/0293397 A1 | 11/2008 | Gajdos et al. | |
| 2008/0310850 A1 | 12/2008 | Pederson et al. | |
| 2008/0318550 A1 | 12/2008 | DeAtley | |
| 2008/0319644 A1 | 12/2008 | Zehler | |
| 2008/0319652 A1 | 12/2008 | Moshfeghi | |
| 2009/0003659 A1 | 1/2009 | Forstall et al. | |
| 2009/0005005 A1 | 1/2009 | Forstall et al. | |
| 2009/0005018 A1 | 1/2009 | Forstall et al. | |
| 2009/0005021 A1 | 1/2009 | Forstall et al. | |
| 2009/0005068 A1 | 1/2009 | Forstall et al. | |
| 2009/0005070 A1 | 1/2009 | Forstall et al. | |
| 2009/0005071 A1 | 1/2009 | Forstall et al. | |
| 2009/0005072 A1 | 1/2009 | Forstall et al. | |
| 2009/0005076 A1 | 1/2009 | Forstall et al. | |
| 2009/0005080 A1 | 1/2009 | Forstall et al. | |
| 2009/0005082 A1 | 1/2009 | Forstall et al. | |
| 2009/0005964 A1 | 1/2009 | Forstall et al. | |
| 2009/0005965 A1 | 1/2009 | Forstall et al. | |
| 2009/0005975 A1 | 1/2009 | Forstall et al. | |
| 2009/0005978 A1 | 1/2009 | Forstall et al. | |
| 2009/0005981 A1 | 1/2009 | Forstall et al. | |
| 2009/0006336 A1 | 1/2009 | Forstall et al. | |
| 2009/0018769 A1 | 1/2009 | Poliak | |
| 2009/0030605 A1 | 1/2009 | Breed | |
| 2009/0031006 A1 | 1/2009 | Johnson | |
| 2009/0042585 A1* | 2/2009 | Matsuda | 455/456.1 |
| 2009/0047979 A1 | 2/2009 | Oh et al. | |
| 2009/0089706 A1 | 4/2009 | Furches et al. | |
| 2009/0098857 A1 | 4/2009 | DeAtley | |
| 2009/0121927 A1 | 5/2009 | Moshfeghi | |
| 2009/0143048 A1 | 6/2009 | Ayanamcottil et al. | |
| 2009/0182492 A1 | 7/2009 | Alten | |
| 2009/0197612 A1 | 8/2009 | Kiiskinen | |
| 2009/0228961 A1 | 9/2009 | Wald et al. | |
| 2009/0234743 A1 | 9/2009 | Wald et al. | |
| 2009/0271271 A1* | 10/2009 | Johnson | 705/14.58 |
| 2009/0281724 A1 | 11/2009 | Blumenberg et al. | |
| 2009/0286549 A1 | 11/2009 | Sazegari et al. | |
| 2010/0082820 A1* | 4/2010 | Furukawa | 709/227 |
| 2010/0106397 A1 | 4/2010 | Van Essen | |

| | | | |
|---|---|---|---|
| 2010/0131584 A1 | 5/2010 | Johnson | |
| 2010/0173647 A1 | 7/2010 | Sheynblat | |
| 2010/0207782 A1 | 8/2010 | Johnson | |
| 2010/0223006 A1 | 9/2010 | Sasaki | |
| 2011/0039513 A1 | 2/2011 | Carlstrom | |
| 2011/0051658 A1* | 3/2011 | Jin et al. | 370/328 |

FOREIGN PATENT DOCUMENTS

| | | |
|---|---|---|
| CA | 2163215 | 5/1994 |
| CA | 2287596 | 4/2000 |
| CA | 2432239 | 12/2004 |
| DE | 3 621 456 | 1/1988 |
| DE | 4437360 | 4/1996 |
| DE | 19506890 | 8/1996 |
| DE | 19914257 | 3/1999 |
| DE | 10 141 695 | 3/2003 |
| EP | 0 288 068 | 7/1992 |
| EP | 0 633 452 | 1/1995 |
| EP | 0 745 867 | 12/1996 |
| EP | 0 762 362 | 3/1997 |
| EP | 0 763 749 | 3/1997 |
| EP | 0 786 646 | 7/1997 |
| EP | 785535 | 7/1997 |
| EP | 0 813 072 | 12/1997 |
| EP | 0 699 330 | 4/1998 |
| EP | 0 908 835 | 4/1999 |
| EP | 0 997 808 | 5/2000 |
| EP | 1 083 764 | 3/2001 |
| EP | 1 251 362 | 10/2002 |
| EP | 1 300 652 | 4/2003 |
| EP | 1 457 928 | 9/2004 |
| EP | 1 469 287 | 10/2004 |
| EP | 1 496 338 | 1/2005 |
| EP | 1 770 956 | 9/2005 |
| EP | 1 465 041 | 2/2006 |
| EP | 1 659 817 | 5/2006 |
| EP | 1 672 474 | 6/2006 |
| EP | 1 790 947 | 5/2007 |
| EP | 1 860 904 | 11/2007 |
| EP | 1 933 249 | 8/2008 |
| EP | 1 975 567 | 10/2008 |
| FR | 2730083 | 8/1996 |
| FR | 2754093 | 4/1998 |
| FR | 2272911 | 6/1999 |
| FR | 2810183 | 12/2001 |
| GB | 2 278 196 | 11/1994 |
| GB | 2 322 248 | 8/1998 |
| GB | 2 359 888 | 5/2001 |
| GB | 2 407 230 | 4/2005 |
| JP | 62142215 | 6/1987 |
| JP | 05-071974 | 3/1993 |
| JP | 06-525189 | 5/1994 |
| JP | 2007-221433 | 5/1994 |
| JP | 08-069436 | 3/1996 |
| JP | 09-054895 | 2/1997 |
| JP | 09-098474 | 4/1997 |
| JP | 9-113288 | 5/1997 |
| JP | 09-153125 | 6/1997 |
| JP | 9-062993 | 7/1997 |
| JP | 09-200850 | 7/1997 |
| JP | 9-210710 | 8/1997 |
| JP | 0 809 117 | 11/1997 |
| JP | 9-319300 | 12/1997 |
| JP | 10-021259 | 1/1998 |
| JP | 11-234736 | 8/1999 |
| JP | 2000-163379 | 6/2000 |
| JP | 2001-008270 | 1/2001 |
| JP | 2001-160063 | 6/2001 |
| JP | 2002-310680 | 10/2002 |
| JP | 10-030933 | 2/2003 |
| JP | 2003-228532 | 8/2003 |
| JP | 2004-045054 | 2/2004 |
| JP | 2004-219146 | 7/2004 |
| JP | 2004-362271 | 12/2004 |
| JP | 2005-106741 | 4/2005 |
| JP | 2005-182146 | 7/2005 |
| JP | 2005-241519 | 9/2005 |
| JP | 2005/277764 | 10/2005 |
| JP | 2006-112338 | 4/2006 |
| JP | 2006-184007 | 7/2006 |
| JP | 2006-270889 | 10/2006 |
| JP | 2006-279838 | 10/2006 |
| JP | 2007-033220 | 2/2007 |
| JP | 2007-033331 | 2/2007 |
| JP | 2007-033368 | 2/2007 |
| JP | 2007-127439 | 5/2007 |
| JP | 2007-147439 | 6/2007 |
| JP | 2007-201699 | 8/2007 |
| JP | 2007-240400 | 9/2007 |
| JP | 2007-259291 | 10/2007 |
| JP | 2007-271299 | 10/2007 |
| JP | 2007-304009 | 11/2007 |
| JP | 2008-058917 | 3/2008 |
| JP | 2008-129774 | 6/2008 |
| KR | 2004-102440 | 12/2004 |
| KR | 2005-096746 | 10/2005 |
| TW | 200426387 | 12/2004 |
| WO | WO 93/20546 | 10/1993 |
| WO | WO 94/08250 | 4/1994 |
| WO | WO 97/07467 | 2/1997 |
| WO | WO 97/24577 | 7/1997 |
| WO | WO 97/41654 | 11/1997 |
| WO | WO 98/03951 | 1/1998 |
| WO | WO 98/07112 | 2/1998 |
| WO | WO 98/54682 | 12/1998 |
| WO | WO 99/16036 | 4/1999 |
| WO | WO 99/44183 | 9/1999 |
| WO | WO 99/61934 | 12/1999 |
| WO | WO 01/31966 | 5/2001 |
| WO | WO 01/37597 | 5/2001 |
| WO | WO 02/33533 | 4/2002 |
| WO | WO 02/054813 | 7/2002 |
| WO | WO 03/023593 | 3/2003 |
| WO | WO 03/096055 | 11/2003 |
| WO | WO 2004/008792 | 1/2004 |
| WO | WO 2004/021730 | 3/2004 |
| WO | WO 2004/034194 | 4/2004 |
| WO | WO 2004/061576 | 7/2004 |
| WO | WO 2004/076977 | 9/2004 |
| WO | 2005/006258 | 1/2005 |
| WO | WO 2005/006258 | 1/2005 |
| WO | WO 2005/084052 | 9/2005 |
| WO | WO 2006/065856 | 6/2006 |
| WO | WO 2006/113125 | 10/2006 |
| WO | WO 2007/027065 | 3/2007 |
| WO | WO 2008/051929 | 5/2008 |
| WO | WO 2008/085740 | 7/2008 |
| WO | WO 2009/140031 | 11/2009 |

OTHER PUBLICATIONS

U.S. Appl. No. 11/827,065, filed Jul. 10, 2007, Johnson.
U.S. Appl. No. 12/044,363, filed Mar. 7, 2008, Johnson.
Maxwell et al., "Alfred: The Robot Waiter Who Remembers You," *AAAI Technical Report WS-99-15*, 1999, 12 pages.
Shibata et al., "Development and Integration of Generic Components for a Teachable Vision-Based Mobile Robot," *IEEE/ASME Transactions on Mechatronics*, 1996, 1(3):230-236.
European Search Report from corresponding EP Application No. 09000094.4-1236 dated Apr. 28, 2009, 7 pages.
International Search Report from corresponding PCT Application No. PCT/US2009/030134 dated May 7, 2009, 14 pages.
"27 Countries in your pocket"; [online] [Retrieved on Sep. 29, 2005] Retrieved from the Internet <URL: http://www.mio-tech.be/en/printview/press-releases-2005-09-29.htm; 1 page.
"Animated Transition"; [online] [Retrieved on Oct. 16, 2006] Retrieved from the Internet <URL: http://designinterfaces.com/Animated_Transition; 2 pages.
"DaimlerCrysler Guide5 Usecases Overview Map", 1 page (no reference date).
"FAQ"; [online] [Retrieved Nov. 30, 2007] Retrieved from the Internet, URL: http://www.navizon.com/FAQ.htm; 8 pages.
"How it Works"; Navizon—Peer-to-Peer Wireless Positioning; [online] [Retrieved on Nov. 30, 2007]; Retrieved from the Internet, URL: http://www.navizon.com/FullFeatures.htm, 7 pages.
"International Roaming Guide—Personal Experience(s) from Customer and Community Member"; [online] [Retrieved Jun. 26, 2006]

Retrieved from the Internet <URL: http://forums.cingular.com/cng/board/message?board.id=1185; 6 pages.

"iPhone Software/Hardware Hack: LocoGPS—GPS Add-on for the iPhone"; [online] [Retrieved on Dec. 25, 2007] Retrieved from the Internet <URL: http://www.iphonehacks.com/iphone_applications/index.html; 41 pages.

"Mio 269+ Users Manula"; 2005; 44 pages.

"MOREnet Dialing Plan: PSTN and IP Network Integration for H.323, H320 VoIP and Public Voice Networks", [online] [Retrieved on Jan. 11, 2008] Retrieved from the Internet < URL: http://www.more.net/technical/research/dialplan/index.html, 12 pages.

"New program for mobile blogging for PocketPC released: My Blog"; [online] [Retrieved on Apr. 5, 2006]; Retrieved from the Internet, URL: http://msmobiles.com/news.php/4067.html.

"Numbering and Dialing Plan within the United States", Alliance for Telecommunications Industry Solutions; 2005; 17 pages.

"nüvifone Images"; [online] [Retrieved on Feb. 4, 2008]; Retrieved from the Internet, URL: http://www8.garmin.com/buzz/nuvifone/media_gallery.jsp; 2 pages.

Review Guide—Google Maps for mobile (beta); Google; 2006; 7 pages.

"User-centered design of mobile solutions", NAMAHN, 2006, 18 pages.

"User's Manual MioMap 2.0"; Aug. 2005; 60 pages.

"Windows Live Search for Mobile Goes Final, Still Great"; [online] [Retrieved on Mar. 11, 2007]; Retrieved from the Internet, URL: http://gizmodo.com/gadgets/software/windows-live-search-for-mobile-goes-final-still-great-236002.php; 3 pages.

"Windows Mobile 6 Professional Video Tour"; [online] [Retrieved on Mar. 11, 2007]; Retrieved from the Internet, URL: http://gizmodo.com/gadgets/cellphones/windows-mobile-6-professional-video-tour-237039.php; 4 pages.

"Windows Mobile"; Microsoft; 2007, 2 pages.

Anand et al., "Quantitative Analysis of Power Consumption for Location-Aware Applications on Smart Phones", IEEE International Symposium on Industrial Electronics, 2007.

Balliet, "Transportation Information Distribution System", IBM Technical Disclosure Bulletin, [online] [Retrieved Nov. 7, 2008] Retrieved from the Internet, URL: https://www.delphion.com/tdbs/tdb?order=86A+61395; Jun. 1986; 2 pages.

Beard et al., "Estimating Positions and Paths of Moving Objects", IEEE 2000, pp. 1-8.

Bederson, B.B., Audio Augmented Reality: A Prototype Automated Tour Guide [online] [retrieved on Aug. 30, 2002] [retrieved from http://www.cs.umd.edu/~bederson/papers/chi-95-aar/] pp. 1-4.

Berman et al., "The Role of Dead Reckoning and Inertial Sensors in Future General Aviation Navigation", IEEE, 1998, pp. 510-517.

Bevly et al., "Cascaded Kalman Filters for Accurate Estimation of Multiple Biases, Dead-Reckoning Navigation, and Full State Feedback Control of Ground Vehicles", IEEE Transactions on Control Systems in Technology, vol. 15, No. 2, Mar. 2007, pp. 199-208.

Binzhuo et al., "Mobile Phone GIS Based on Mobile SVG", IEEE 2005.

Bokharouss et al., "A Location-Aware Mobile Call Handling Assistant", International Conference on Advanced Information Networking and Applications Workshops, 2007.

Boonsrimuang et al., "Mobile Internet Navigation System", IEEE, 2002, pp. 325-328.

Camp et al., "A computer-based method for predicting transit time systems", Decsision Sciences, vol. 5, pp. 339-346, 1974.

Carew; "Phones that tell you where to drive, meet, eat"; [online] [Retrieved May 26, 2007]; Retrieved from the Internet <URL htlp://news.yahoo.com/s/nm/20070525/wr_nm/column_pluggedin_dc_2&printer=1;_ylt=Ahqaftn7xm1S2r0FZFeu9G4ht.cA; 2 pages.

Charny, "AT&T puts 411 to the text"; [online] [Retrieved Mar. 4, 2009]; Retrieved from the Internet <URL http://news.cnet.com/ATT-puts-411-to-the-text/2100-1039_3-1000669.html; May 8, 2003; 2 pages.

Cho et al., A Traveler Information Service Structure in Hybrid T-DMB and Cellular Communication Network, Broadcast Systems Research Group, IEEE, 2006, pp. 747-750.

Christie et al., "Development and Deployment of GPS wireless devices for E911 and Location based services", IEEE 2002.

Chua et al., "Intelligent Portal for Event-triggered SMS Alerts", 2nd International Conference on Mobile Technology, Applications and Systems, 2005.

Civilis et al., "Efficient Tracking of Moving Objects with Precision Guarantees", IEEE, Proceedings of the First Annual International Conference on Mobile and Ubiquitous Systems: Networking and Services, 2004, 10 pages.

Dalrymple, Jim; "Google Maps adds locator, but not for iPhone", [online] [Retrieved Nov. 30, 2007]; Retrieved from the Internet <URL: http://news.yahoo.com/s/macworld/20071130/tc_macworld/googlemaps20071130_0&printer=1;_ylt=Auvf3s6LQK_pOaJlb954T_DQn6gB; 1 page.

Dibdin, Peter, "Where are mobile location based services?", Dec. 14, 2001, pp. 1-8.

Dunn et al., "Wireless Emergency Call System", IBM TDB, Sep. 1994.

Ebine, "Dual Frequency resonant base station antennas for PDC systems in Japan", IEEE, pp. 564-567, 1999.

Evans, "In-Vehicle Man-Machine Interaction the Socrates Approach", Vehicle Navigation & Information System Conference Proceedings, Aug. 31, 1994-Sep. 2, 1994, pp. 473-477.

FM 3-25.26 Map Reading and Land Navigation Field Manual No. 3-25.26, Headquarters Department of the Army, Washington, DC [online] [retrieved on Apr. 9, 2004] [retrieved from http://155.217.58.58/cgi-bin/atdl.d11/fm/3-25.26/toc.htm] Jul. 20, 2001, pp. 1-7 and J-1 to J-3.

*GPS 12 Personal Navigator Owner's Manual & Reference*, Garmin Corporation, Jan. 1999, pp. 1-60.

Guo et al., "An Intelligent Query System based on Chinese Short Message Service for Restaurant Recommendation", IEEE 2007, 1 page.

Hameed et al., "An Intelligent Agent-Based Medication and Emergency System", IEEE 2006.

Helal et al., "Drishti: An Integrated Navigation System for Visually Impaired and Disabled", Fifth International Symposium on Wearable Computers (ISWC'01), IEEE, 2001, pp. 149-156.

Hohman et al., "GPS Roadside Integrated Precision Positioning System", Position Location and Navigation Symposium (IEEE 2000), pp. 221-230.

International Numbering and SMS—Type of Numbering, TON, Numbering Plan Indicator, NPI, [online] [Retrieved Jan. 5, 2007] Retrieved from the Internet <URL: http://www.activeexperts.com/support/activsms/tonnpi/.

Jain, R., Potential Networking Applications of Global Positioning Systems (GPS) [online] [retrieved on Nov. 18, 2008] [retrieved from http://arxiv.org/ftp/cs/papers/9809/9809079.pdf] OSU Technical Report TR-24, Apr. 1996, pp. 1-40.

Jirawimut et al., "A Method for Dead Reckoning Parameter Correction in Pedestrian Navigation System", IEEE Transactions on Instrumentation and Measurement, vol. 52, No. 1, Feb. 2003, pp. 209-215.

Ju et al., "RFID Data Collection and Integration based on Mobile Agent", IEEE, 2006.

Kbar et al., "Mobile Station Location based on Hybrid of Signal Strength and Time of Arrival", IEEE, 2005.

Koide et al., "3-D Human Navigation System with Consideration of Neighboring Space Information", IEEE International Conference on Systems, Man and Cybernetics, 2006 (SMC '06), vol. 2, (Oct. 8-11, 2006), pp. 1693-1698.

Lloyd et al., "Cellular phone base stations installation violate the Electromagnetic Compatibility regulations", IEEE, 2004.

Manabe et al., "On the M-CubITS Pedestrian Navigation System", IEEE, 2006, pp. 793-798.

Meier et al., "Location-Aware Event-Base Middleware: A Paradigm for Collaborative Mobile Applications?", Sep. 2003.

Miller et al., "Synchronization of Mobile XML Databases by Utilizing Deferred Views", IEEE 2004.

Nardi et al., "Integrating Communication and Information through Contact Map", Communications of the ACM, vol. 45, No. 4, Apr. 2002.

Navizon Peer-to-Peer Wireless Positioning; [online] [Retrieved on Nov. 30, 2007]; Retrieved from the Internet, URL: http//www.navizon.com/; 2 pages.

Northard, "Docking Station Communication Link", IBM TDB, Feb. 1994.
Oh et al., "Spatial Applications Using 4S Technology for Mobile Environment", IEEE 2002.
Paksoy et al., "The Global Position System—Navigation Tool of the Future", Journal of Electrical & Electronics, 2002, vol. 2, No. 1, pp. 467-476.
Parikh, "Tele Locate", IBM Technical Disclosure Bulletin, [online] [Retrieved Nov. 7, 2008] Retrieved from the Internet, URL: https://www.delphion.com/tdbs/tdb?order=92A+62775; Sep. 1992; 1 page.
Partial International Search Report, dated Jul. 29, 2008, issued in corresponding PCT/US2008/050295.
International Search Report and Written Opinion, dated Jun. 9, 2008, issued in Interntiaonal Application No. PCT/US2007/088880, filed Dec. 27, 2007.
Pfoser et al., "Dynamic Travel Time Maps—Enabling Efficient Navigation", Proceedings of the 18th International Conference on Scientific and Statistical Database Management (SSDBM'06), IEEE, 10 pages.
Portfolio 2007; [online] [Retrieved on Jun. 14, 2007]; Retrieved from the Internet, URL: http://eric.wahlforss.com/folio; 3 pages.
RD 409052, Research Disclosure Alerting Abstract, "Location dependent information for satellite based vehicle communication—required application of Global Position System (GPS) to automatically extract relevant portions of data package as vehicle changes position," May 10, 1998, 1 page.
Rekimoto, J., *Augment-able Reality: Situated Communication through Physical and Digital Spaces*, iswc, pp. 68, Second International Symposium on Wearable computers (ISWC'98), 1998, pp. 1-8.
Rogers et al., "Adaptive User Interfaces for Automotive Environments", IEEE Intelligent Vehicles Symposium 2000, Oct. 3-5, 2000, pp. 662-667.
Rozier, J., *Hear & There: An Augmented Reality System of Linked Audio*, Proceedings of the International Conference on Auditory Display, Atlanta, GA, Apr. 2000, pp. 1-6.
Samadani et al., "PathMaker: Systems for Capturing Trips", IEEE (2004) International Conference on Multimedia and Expo., Publication Date: Jun. 27-30, 2004, vol. 3, pp. 2123-2126, 2004.
Schreiner, "Where We At? Mobile Phones Bring GPS to the Masses", IEEE Computers Society, May/Jun. 2007, pp. 6-11.
Spohrer. "New Paradigms for Using Computers", 1997; retrieved from the Internet, URL: <http://almaden.ibm.com/npuc97/1997/spohrer.htm>.
Sung et al., "Towards Reliable Peer-to-Peer Data Sharing over Mobile Ad hoc Networks", IEEE, 2005.
Weiss et al., "Zone services—An approach for location-based data collection", Proceedings of the 8th International Conference on E-commerce Technology and the 3rd IEEE International Conference on Enterprise Computing, E-Commerce and E-Services (8 pages), 2006.
Yang et al., "A Mutlimedia System for Route Sharing and Video-based Navigation", IEEE, 2006, pp. 73-76.
Yang et al. "Global Snapshots for Distributed Debugging", IEEE, pp. 436-440, 1992.
Yanyan et al., "The model of optimum route selection in vehicle automatic navigation system based on unblocked reliability analyses", IEEE 2003.
"Cyberguide: a mobile context-aware tour guide", Wireless Networks Archive (Special Issue: Mobile computing and networking; selecting papers from MobiCom '96), 3(5):421-433, 1997.
"Frontiers in electronic media", Interactions Archive 4(4):32-64, 1997.
"Location-aware mobile applications based on directory services", International Conference on Mobile Computing and Networking Archive, Proceedings on the 3rd Annual ACM/IEEE International Conference on Mobile Computing and Networking, Budapest, Hungary, pp. 23-33, 1997.
Sharpe et al., U.S. Appl. No. 12/434,586, filed May 1, 2009.
Sharpe et al., U.S. Appl. No. 12/434,582, filed May 1, 2009.
Van Os et al., U.S. Appl. No. 12/165,413, filed Jun. 30, 2008.
Blumenberg et al., U.S. Appl. No. 12/119,316, filed May 12, 2008.
Low et al., U.S. Appl. No. 12/233,358, filed Sep. 18, 2008.
Sazegari et al., U.S. Appl. No. 12/122,339, filed May 16, 2008.
Johnson, U.S. Appl. No. 12/044,363, filed Mar. 7, 2008.
Johnson, U.S. Appl. No. 11/827,065, filed Jul. 10, 2007.
Herz, U.S. Appl. No. 12/270,814, filed Nov. 13, 2008.
Budka et al., "A Bayesian method to Improve Mobile Geolocation Accuracy", IEEE, 2002, pp. 1021-1025.
Yamamoto et al., "Position Location Technologies Using Signal Strength in Cellular Systems", IEEE, 2001, pp. 2570-2575.
International Search Report and Written Opinion, dated Oct. 1, 2009, issued in PCT/US2009/041298.
Drane et al., "The accurate location of mobile telephones", Third Annual World Congress on Intelligent Transport Systems, Orlando, Florida, Oct. 1996.
"Travel Time Data Collection Handbook—Chapter 5: Its Probe Vehicle Techniques", FHWA-PL-98-035 Report, Department of Transport, University of Texas, Mar. 1998; [online] Retrieved from the Internet at http://www.fhwa.dot.gov/ohim/handbook/chap5.pdf.
Ygnace et al., "Travel Time Estimation on the San Francisco Bay Area Network Using Cellular Phones as Probes", Working Paper, Institute of Transportation Studies, University of California, Berkeley, 2000.
Wang et al., "A Unified Vehicle Supervising and Traffic Information System", IEEE, 1996, pp. 968-972.
Weiss et al., "Zone services—An approach for location-based data collection", Proceedings of the 8th International Conference on E-commerce Technology and the 3rd IEEE International Conference on Enterprise Computing, E-Commerce and E-Services, 2006; 8 pages.
Dey, "Context-Aware Computing: The CyberDesk Project," [online] Retrieved from the Internet: URL: http://www.cc.gatech.edu/fce/cyberdesk/pubs/AAAI98/AAAI98.html; AAAI '98 Spring Symposium, Stanford University, Mar. 23-25, 1998, downloaded from the Internet on Aug. 6, 2010, 8 pages.
Challe, "CARMINAT—An Integrated information and guidance system," Vehicle Navigation and Information Systems Conference, Oct. 20-23, 1991, Renault—Direction de la Recherche, Rueil-Malmaison, France.
Pungel, "Traffic control-beat the jam electronically," Funkschau, 1988, 18:43-45 (w/English translation).
Rillings and Betsold, "Advanced driver information systems," Vehicular Technology, IEEE Vehicular Technology Society, 1991, 40:31-40.
Tsuzawa and Okamoto, "Advanced Mobile Traffic Information and Communication System," First Vehicle Navigation and Information Systems Conference, Sep. 11-13, 1989, Toronto, Canada, Abstract only.
Wong, "GPS: making roads safer and solving traffic tangles," Asia Engineer, 1995, 23(9):31-32.
"Sprite Terminator User Guide," [online] Dec. 6, 2007, pp. 1-45, Retrieved from the Internet: URL: http://www.spritesoftware.com/getmedia/4d21ad24-fd62-4c5e-a4fe-15ebc99aac9a/SpriteTerminator.aspx> [retrieved on Jul. 9, 2010].
Authorized officer Athina Nickitas-Etienne, International Preliminary Report on Patentability in PCT/US2009/030134 mailed Jul. 15, 2010, 9 pages.
Ayatsuka et al., "UbiquitousLinks: Hypermedia Links Embedded in the Real World, Technical Report of Information Processing Society, 96-HI-67," Information Processing Society of Japan, Jul. 11, 1996, 96(62):23-30.
Nagao et al., Walk Navi: A Location-Aware Interactive Navigation/Guideline System and Software III, First edition, pp. 9-48, published by Kindai-Kagaku-Sya Co. Ltd., Dec. 10, 1995.
Benefon ESC! GSM+GPS Personal Navigation Phone, benefon.com, Copyright 2001, 4 pages.
Freundschuh, "Does 'Anybody' Really Want (or Need) Vehicle Navigation Aids?" First Vehicle Navigation and Information System Conference, Sep. 11-13, 1989, Toronto, Canada, 5 pages.
Gould, "The Provision of Usable Navigation Assistance: Considering Individual Cognitive Ability," First Vehicle Navigation and Information System Conference, Sep. 11-13, 1989, Toronto, Canada, 7 pages.
Mark, "A Conceptual Model for Vehicle Navigation Systems," First Vehicle Navigation and Information System Conference, Sep. 11-13, 1989, Toronto, Canada, 11 pages.

Wheeler et al., "Development of Human Factors Guidelines for Advanced Traveler Information Systems and Commercial Vehicle Operations: Task Analysis of ATIS/CVO Functions," US Dept. Transportation Federal Highway Administration Research and Development, Publication No. FHWA-RD-95-176, Nov. 1996, 124 pages.

Miller et al., "Integrating Hierarchical Navigation and Querying: A User Customizable Solution," ACM Multimedia Workshop on Effective Abstractions in Multimedia Layout, Presentation, and Interaction, San Francisco, CA, Nov. 1995, 8 pages.

Hoogenraad, "Location Dependent Services," 3rd Agile Conference on Geographic Information Science, Helsinki/Espoo, Finland, May 25-27, 2000, pp. 74-77.

Bonsignore, "A Comparative Evaluation of the Benefits of Advanced Traveler Information System (ATIS) Operational Tests," MIT Masters Thesis, Feb. 1994, 140 pages.

Noonan and Shearer, "Intelligent Transportation Systems Field Operational Test Cross-Cutting Study Advance Traveler Information systems," Intelligent Transportation Systems Field Operational Test Cross-Cutting Study, Sep. 1998, 26 pages.

Burnett, "Usable Vehicle Navigation Systems: Are We There Yet?" Vehicle Electronic Systems 2000, Jun. 29-30, 2000, 3.1.1-3.1.12.

Khattak et al., "Bay Area ATIS Testbed Plan," Research Reports, California Partners for Advanced Transit and Highways (PATH), Institute of Transportation Studies, UC Berkeley, Jan. 1, 1992, 83 pages.

Yim et al., "Travinfo Field Operational Test: Work Plan for the Target, Network, and Value Added Reseller (VAR) Customer Studies," Working Papers, California Partners for Advanced Transit and Highways (PATH), Institute of Transportation Studies, UC Berkeley, Apr. 1, 1997, 49 pages.

Mahmassani et al., "Providing Advanced and Real-Time Travel/Traffic Information to Tourists," Center for Transportation Research, Bureau of Engineering Research, The University of Texas at Austin, Oct. 1998, 15 pages.

"New Handsets Strut Their Stuff At Wireless '99," Internet: URL: http://findarticles.com/p/articles/mi_m0BMD/is_1999_Feb_11/ai_n27547656/ downloaded from Internet on Feb. 11, 1999, 3 pages.

"School Buses to Carry Noticom's First Application," Internet: URL: http://findarticles.com/p/articles/mi_m0BMD/is_1999_Feb_17/ai_n27547754/ downloaded from the Internet on Feb. 17, 1999, 2 pages.

Green et al., "Suggested Human Factors Design Guidelines for Driver Information Systems," Technical Report UMTRI-93-21, Nov. 1993, 119 pages.

Tijerina et al., "Driver Workload Assessment of Route Guidance System Destination Entry While Driving: A Test Track Study," Proceedings of the 5th ITS World Congress, Oct. 12-16, 1998, Seoul, Korea, 9 pages.

Muraskin, "Two-Minute Warnings for School Bus Riders," Internet: URL: http://www.callcentermagazine.com/shared/printableArticle.jhtml ;jsessionid=PQH1SZXW... Jul. 1, 1999, 3 pages.

Ni and Deakin, "On-Board Advanced Traveler Information Systems," Dec. 1, 2002, 10 pages.

Serafin et al., "Functions and Features of Future Driver Information Systems," Technical Report UMTRI-91-16, May 1991, 104 pages.

Shekhar and Liu, "Genesis and Advanced Traveler Information Systems (ATIS): Killer Applications for Mobile Computing?" NSF Mobidata Workshop on Mobile and Wireless Information Systems, Nov. 1994, 20 pages.

"LaBarge in joint venture on bus system," Internet: URL: http://www.bizjournals.com/stlouis/stories/1998/08/10/focus2.html?t-printable, Aug. 7, 1998, 1 page.

Clarke et al., "Development of Human Factors Guidelines for Advanced Traveler Information Systems (ATIS) and Commercial Vehicle Operations (CVO): Comparable Systems Analysis," U.S. Department of Transportation Federal Highway Administration, Publication No. FHWA-RD-95-197, Dec. 1996, 212 pages.

Zubac and Strahonja, "Theory and Development of an Online Navigation System," 18th International Conference on Information and Intelligent Systems, University of Zagreb, Sep. 12-14, 2007.

Brown, "The stick-e document: a framework for creating context-aware applications," Electronic Publishing, 1995, 8:259-272.

Brown, "Triggering Information by Context," Personal Technologies, 1998, 2:18-27.

Dey et al., "CyberDesk: a framework for providing self-integrating context-aware services," Knowledge-Based Systems, 1998, 11:3-13.

Hodes and Katz, "Composable ad hoc location-based services for heterogeneous mobile clients," Wireless Networks, 1999, 5:411-427.

Kreller et al., "A Mobile-Aware City Guide Application," ACTS Mobile Communication Summit, 1998, Rhodes, Greece, 7 pages.

Lusky et al., "Mapping the Present," ColoradoBiz, Nov. 1999, 26(11):16-17.

McCarthy and Meidel, "ACTIVEMAP: A Visualization Tool for Location Awareness to Support Informal Interactions," HUC '99, LNCS 1707, 1999, pp. 158-170.

O'Grady et al., "A Tourist-Centric Mechanism for Interacting with the Environment," Proceedings of the First International Workshop on Managing Interactions in Smart Environments (MANSE '99), Dublin, Ireland, Dec. 1999, pp. 56-67.

Pascoe et al., "Developing Personal Technology for the Field," Personal Technologies, 1998, 2:28-36.

Tarumi et al., "Public Applications of SpaceTag and Their Impacts," Digital Cities, LNCS 1765, 2000, pp. 350-363.

Tebbutt, "Dial your way out of the woods," The Australian, Feb. 2000, 1 page.

Tso et al., "Always On, Always Connected Mobile Computing," Mobile Communications Operation—Mobile Handheld Products Group, 1996, pp. 918-924.

Wang and Lin, "Location Aware Information Agent over WAP," Tamkang Journal of Science and Engineering, 2000, 3(2):107-115.

"3rd Generation Partnership Project (3GPP); Technical Specification Group (TSG) RAN; Working Group 2 (WG2); Report on Location Services (LCS)," 3G TR 25.923 v.1.0.0, Apr. 1999, 45 pages.

"Report on Location Service feature (LCS) 25.923 v1.0.0," TSG-RAN Working Group 2 (Radio layer 2 and Radio layer 3), Berlin, May 25-28, 1999, 45 pages.

"3rd Generation Partnership Project; Technical Specification Group Services and System Aspects; Functional stage 2 description of location services in UMTS," 3G TS 23.171 v.1.1.0, Nov. 1999, 42 pages.

"3rd Generation Partnership Project; Technical Specification Group Radio Access Network; Stage 2 Functional Specification of Location Services in UTRAN," 3G TS 25.305 v.3.1.0, Mar. 2000, 45 pages.

"Enabling UMTS / Third Generation Services and Applications," No. 11 Report from the UMTS Forum, Oct. 2000, 72 pages.

"3rd Generation Partnership Project (3GPP); Technical Specification Group (TSG) RAN; Working Group 2 (WG2); Report on Location Services," TS RAN R2.03 V0.1.0, Apr. 1999, 43 pages.

"Revised CR to 09/31 on work item LCS," ETSI SMG3 Plenary Meeting #6, Nice, France, Dec. 13-15, 1999. 18 pages.

Digital cellular telecommunications system (Phase 2+); Location Services (LCS); Service description, Stage 1 (GSM 02.71) ETSI, Apr. 1999, 22 pages.

Akerblom, "Tracking Mobile Phones in Urban Areas," Goteborg University Thesis, Sep. 2000, 67 pages.

Borsodi, "Super Resolution of Discrete Arrivals in a Cellular Geolocation System," University of Calgary Thesis, Apr. 2000, 164 pages.

Abowd et al., "Context-awareness in wearable and ubiquitous computing," 1st International Symposium on Wearable Computers, Oct. 13-14, 1997, Cambridge, MA, 9 pages.

Balsiger et al., "MOGID: Mobile Geo-depended Information on Demand," Workshop on Position Dependent Information Services (W3C-WAP), 2000, 8 pages.

Cheverst et al., "Architectural Ideas for the Support of Adaptive Context-Aware Applications," Proceedings of Workshop on Infrastructure for Smart Devices—How to Make Ubiquity an Actuality, HUC'00, Bristol, Sep. 2000, 3 pages.

Cheverst et al., "The Role of Connectivity in Supporting Context-Sensitive Applications," HUC'99, LNCS 1707, 1999, pp. 193-209.

Efstratiou and Cheverst, "Reflection: A Solution for Highly Adaptive Mobile Systems," 2000 Workshop on Reflective Middleware, 2000, 2 pages.

Cheverst et al., "The Support of Mobile-Awareness in Collaborative Groupware," Personal Technologies, 1999, 3:33-42.

Cheverst et al., "Design of an Object Model for a Context Sensitive Tourist Guide," Computers and Graphics, 1999, 23(6):883-891.

Cheverst et al., "Developing Interfaces for Collaborative Mobile Systems," 1999, 15 pages.

Cheverst et al., "Experiences of Developing and Deploying a Context-Aware Tourist Guide: The GUIDE Project," 2000, pp. 20-31.

Cheverst et al., "Exploiting Context to Support Social Awareness and Social Navigation," SIGGROUP Bulleting Dec. 2000, 21(3):43-48.

Cheverst et al., "Services to Support Consistency in Mobile Collaborative Applications," Proc. 3rd International Workshop on Services in Distributed Networked Environments, 1996, 8 pages.

Cheverst et al., "Sharing (Location) Context to Facilitate Collaboration Between City Visitors," 2000, 8 pages.

Cheverst et al., "Supporting Collaboration in Mobile-aware Groupware," Workshop on Handheld CSCW, 1998, 6 pages.

Change Request for "U.S. specific Emergency Services requirements included as an informative annex," Nov. 29, 1999, 2 pages.

Costa et al., "Experiments with Reflective Middleware," Proceedings of the ECOOP'98 Workshop on Reflective Object-Oriented Programming and Systems, ECOOP'98 Workshop Reader, 1998, 13 pages.

Davies et al., "L2imbo: A distributed systems platform for mobile computing," Mobile Networks and Applications, 1998, 3:143-156.

Davies et al., "'Caches in the Air': Disseminating Tourist Information in the Guide System," Second IEEE Workshop on Mobile Computer Systems and Applications, Feb. 25-26, 1999, 9 pages.

Dix et al., "Exploiting Space and Location as a Design Framework for Interactive Mobile Systems," ACM Transactions on Computer-Human Interaction (TOCHI)—Special issue on human-computer interaction with mobile systems, 2000, 7(3):285-321.

Drane et al., "Positioning GSM Telephones," IEEE Communications Magazine, Apr. 1998, pp. 46-59.

Drane and Rizos, "Role of Positioning Systems in ITS," Positioning Systems in Intelligent Transportation Systems, Dec. 1997, pp. 312, 346-349.

Efstratiou et al., "Architectural Requirements for the Effective Support of Adaptive Mobile Applications," 2000, 12 pages.

"Estonian operator to launch world's first Network-based location services," Ericsson Press Release, Oct. 11, 1999, 2 pages.

Fischer et al., "System Performance Evaluation of Mobile Positioning Methods," IEEE, Aug. 2002, pp. 1962-1966.

Flinn and Satyanarayanan, "PowerScope: A Tool for Profiling the Energy Usage of Mobile Applications," Proc. WMCSA '99 Second IEEE Workshop on Mobile Computing Systems and Applications, Feb. 25-26, 1999, 9 pages.

French and Driscoll, "Location Technologies for ITS Emergency Notification and E911," Proc. 1996 National Technical Meeting of the Institute of Navigation, Jan. 22-24, 1996, pp. 355-359.

Friday et al., "Developing Adaptive Applications: The MOST Experience," J. Integrated Computer-Aided Engineering, 1999, pp. 143-157.

Gunnarsson et al., "Location Trial System for Mobile Phones," IEEE, 1998, pp. 2211-2216.

Jose and Davies, "Scalable and Flexible Location-Based Services for Ubiquitous Information Access," HUC'99, LNCS 1707, 1999, pp. 52-66.

Klinec and Nolz, "Nexus-Positioning and Communication Environment for Spatially Aware Applications," IAPRS, Amsterdam, 2000, 7 pages.

Kovacs et al., "Adaptive Mobile Access to Context-aware Services," Proc. ASAMA '99 Proc. First International Symposium on Agent Systems and Applications Third International Symposium on Mobile Agents, IEEE Computer Society Washington, DC, 1999, 12 pages.

Kreller et al., "UMTS: A Middleware Architecture and Mobile API/ Approach," IEEE Personal Communications, Apr. 1998, pp. 32-38.

Kugler and Lechner, "Combined Use of GPS and LORAN-C in Integrated Navigation Systems," Fifth International Conference on Satellite Systems for Mobile Communications and Navigation, London, UK, May 13-15, 1996, pp. 199-207.

Kyriazakos et al., "Optimization of the Handover Algorithm based on the Position of the Mobile Terminals," Communications and Vehicular Technology, Oct. 2000, pp. 155-159.

Leonhardt and Magee, "Multi-Sensor Location Tracking," MOBICOM 98, Dallas, TX, pp. 203-214.

Leonhardt and Magee, "Towards a general location service for mobile environments," Proc. Third International Workshop on Services in Distributed and Networked Environments, Jun. 3-4, 1996, 8 pages.

Long et al., "Rapid Prototyping of Mobile Context-Aware Applications: The Cyberguide Case Study," MobiCom '96, 1996, 11 pages.

Yokote, "The Apertos Reflective Operating System: The Concept and Its Implementation," OOPSLA'92, pp. 414-434.

Popescu-Zeletin et al., "Applying Location-Aware Computing for Electronic Commerce: Mobile Guide," Proc. 5th Conference on Computer Communications, AFRICOM-CCDC'98,Oct. 20-22, 1998, 14 pages.

Zhao, "Mobile Phone Location Determination and Its Impact on Intelligent Transportation Systems," IEEE Transactions on Intelligent Transportation Systems, Mar. 2000, 1(1):55-64.

Microsoft Outlook 2003 User's Guide, http://opan.admin.ufl.edu/user_guides/outlook2003.htm. Aug. 2004, 17 pages.

"Error: could not find a contact with this e-mail address." Outlookbanter.com. Dec. 2006, 12 pages.

Authorized officer Dorothee Mulhausen, International Preliminary Report on Patentability in PCT/US2009/41298 mailed Nov. 25, 2010, 8 pages.

European Search Report in EP 12 15 4027 mailed Apr. 10, 2012, 7 pages.

European Search Report in EP 12 15 4026 mailed Apr. 10, 2012, 5 pages.

European Search Report in EP 12 15 4025 mailed Apr. 12, 2012, 7 pages.

European Search Report in EP 12 15 4024 mailed Apr. 10, 2012, 6 pages.

US 6,731,928, 05/2004, Tanaka (withdrawn)

* cited by examiner

GRAPHICAL USER INTERFACE FOR PRESENTING LOCATION INFORMATION

BACKGROUND

This specification is related generally to graphical user interfaces.

The role of traditional printed maps is being supplanted by modern devices capable of rendering dynamic map displays. Devices that include mapping or navigation applications provide information regarding an area selected by a user by recalling map data from local memory or networked services.

When coupled with any of a number of positioning technologies, a mapping device can display a current position on a map as well as deliver navigation instructions based on the current position to route a user to a desired destination. Positioning technologies include satellite positioning systems, such as the Global Positioning System (GPS), cell tower triangulation and network-based positioning systems (e.g., Wi-Fi positioning system). Positioning technologies provide varying degrees of accuracy or precision. For example, GPS is generally accurate to a few meters, while other positioning technologies are generally less accurate.

SUMMARY

In general, one aspect of the subject matter described in this specification can be embodied in methods that include the actions of estimating a first geographic area in which a device is currently located using a first positioning system, estimating a second geographic area in which the device is currently located using a second positioning system, presenting a first map view including an indication of the first geographic area on the first map view if the first geographic area is contained within the second geographic area, and presenting a second map view including an indication of the second geographic area if the first geographic area is not contained within the second geographic area. Other embodiments of this aspect include corresponding systems, apparatus, computer program products, and computer readable media.

In general, another aspect of the subject matter described in this specification can be embodied in methods that include the actions of presenting a map view, receiving user input requesting an arbitrary position marker, and presenting the map view with the arbitrary position marker placed at an arbitrary position on the map view. Other embodiments of this aspect include corresponding systems, apparatus, computer program products, and computer readable media.

In general, another aspect of the subject matter described in this specification can be embodied in methods that include the actions of presenting a map view on a first virtual graphical layer, receiving a request to present other content, presenting a flipped-page graphical effect with respect to the map view, where the flipped-page effect simulates a partial peeling of the first virtual graphical layer to reveal a second virtual graphical layer, and presenting the other content on the second virtual graphical layer. Other embodiments of this aspect include corresponding systems, apparatus, computer program products, and computer readable media.

In general, another aspect of the subject matter described in this specification can be embodied in methods that include the actions of presenting a map view, and presenting an indication of a region on the map view, where the region represents a geographic area in which a device is located. Other embodiments of this aspect include corresponding systems, apparatus, computer program products, and computer readable media.

In general, another aspect of the subject matter described in this specification can be embodied in graphical user interfaces that include a map view and an indication of a region on the map view, where the region represents a geographic area in which a device is located, and where the indication includes a circle and one or more crosshairs. Other embodiments of this aspect include corresponding methods, systems, apparatus, computer program products, and computer readable media.

Particular embodiments of the subject matter described in this specification can be implemented to realize one or more of the following advantages. The area of uncertainty associated with a current position determined using a positioning technology can be indicated on a map. Geographic areas in which a device is currently located can be determined or estimated using one or more positioning technologies and the most accurate or precise geographic area can be indicated on a map displayed on a mobile device, for example.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Example Mobile Device

Figure 1:
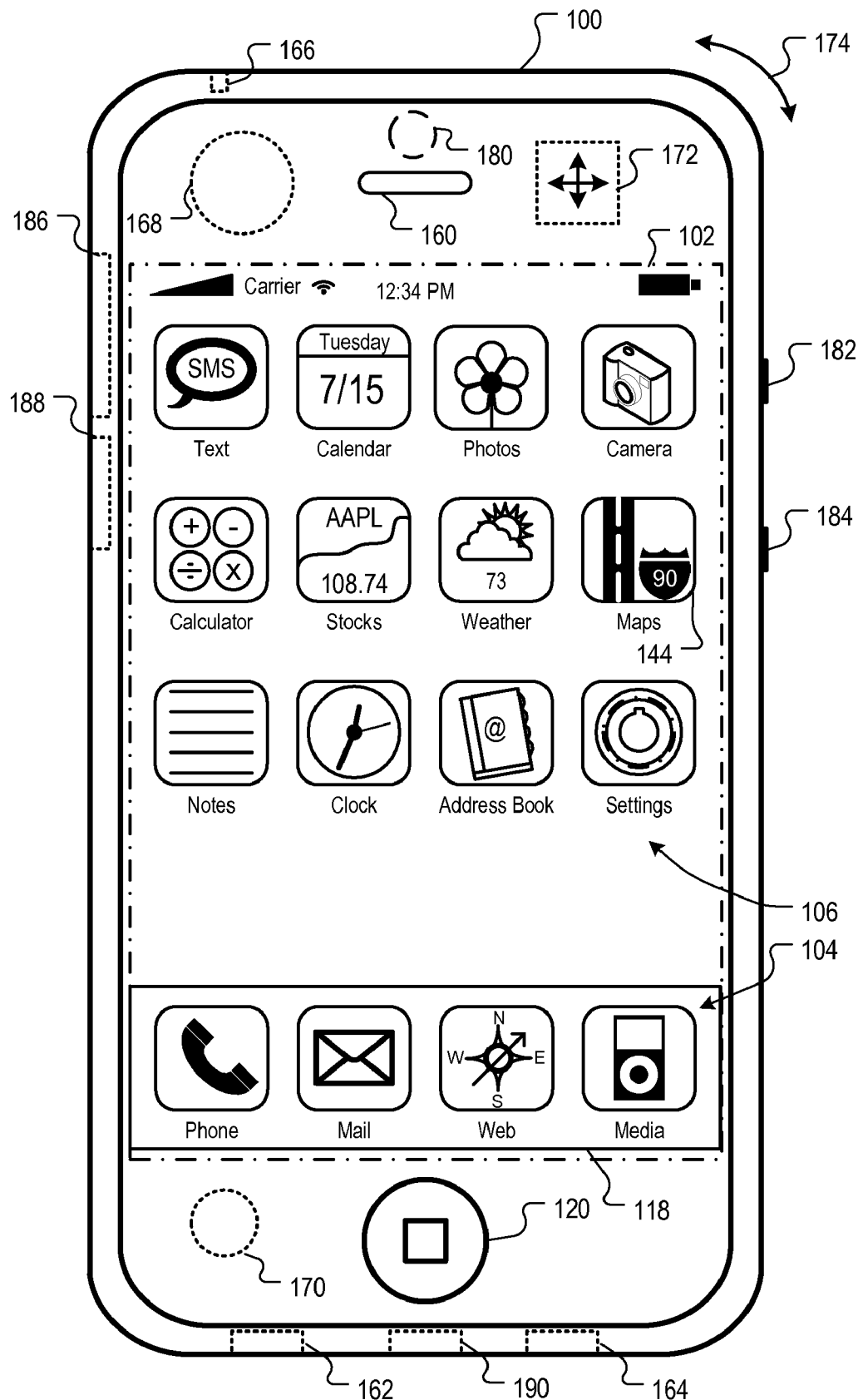
FIG. 1 is a block diagram of an example mobile device.

FIG. 1 is a block diagram of an example mobile device 100. The mobile device 100 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

Mobile Device Overview

In some implementations, the mobile device 100 includes a touch-sensitive display 102. The touch-sensitive display 102 can implement liquid crystal display (LCD) technology, light emitting polymer display (LPD) technology, or some other display technology. The touch sensitive display 102 can be sensitive to haptic and/or tactile contact with a user.

In some implementations, the touch-sensitive display 102 can comprise a multi-touch-sensitive display 102. A multi-touch-sensitive display 102 can, for example, process multiple simultaneous touch points, including processing data related to the pressure, degree, and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323,846, 6,570,557, 6,677,932, and 6,888,536, each of which is incorporated by reference herein in its entirety.

In some implementations, the mobile device 100 can display one or more graphical user interfaces on the touch-sensitive display 102 for providing the user access to various system objects and for conveying information to the user. In some implementations, the graphical user interface can include one or more display objects 104, 106. In the example shown, the display objects 104, 106, are graphic representations of system objects. Some examples of system objects include device functions, applications, windows, files, alerts, events, or other identifiable system objects.

Example Mobile Device Functionality

In some implementations, the mobile device 100 can implement multiple device functionalities, such as a telephony device, an e-mail device, a network data communication device, a Wi-Fi base station device (not shown), and a media processing device. In some implementations, particular display objects 104 can be displayed in a menu bar 118. In some implementations, device functionalities can be accessed from a top-level graphical user interface, such as the graphical user interface illustrated in FIG. 1. Touching one of the objects 104 can, for example, invoke corresponding functionality.

In some implementations, the mobile device 100 can implement network distribution functionality. For example, the functionality can enable the user to take the mobile device 100 and provide access to its associated network while traveling. In particular, the mobile device 100 can extend Internet access (e.g., Wi-Fi) to other wireless devices in the vicinity. For example, mobile device 100 can be configured as a base station for one or more devices. As such, mobile device 100 can grant or deny network access to other wireless devices.

In some implementations, upon invocation of device functionality, the graphical user interface of the mobile device 100 changes, or is augmented or replaced with another user interface or user interface elements, to facilitate user access to particular functions associated with the corresponding device functionality. For example, in response to a user touching a phone object, the graphical user interface of the touch-sensitive display 102 may present display objects related to various phone functions; likewise, touching of an email object may cause the graphical user interface to present display objects related to various e-mail functions; touching a Web object may cause the graphical user interface to present display objects related to various Web-surfing functions; and touching a media player object may cause the graphical user interface to present display objects related to various media processing functions.

In some implementations, the top-level graphical user interface environment or state of FIG. 1 can be restored by pressing a button 120 located near the bottom of the mobile device 100. In some implementations, each corresponding device functionality may have corresponding "home" display objects displayed on the touch-sensitive display 102, and the graphical user interface environment of FIG. 1 can be restored by pressing the "home" display object.

In some implementations, the top-level graphical user interface can include additional display objects 106, such as a short messaging service (SMS) object, a calendar object, a photos object, a camera object, a calculator object, a stocks object, a weather object, a maps object 144, a notes object, a clock object, an address book object, and a settings object. Touching the maps object 144 can, for example, invoke a mapping and location-based services environment and supporting functionality; likewise, a selection of any of the display objects 106 can invoke a corresponding object environment and functionality.

Additional and/or different display objects can also be displayed in the graphical user interface of FIG. 1. For example, if the device 100 is functioning as a base station for other devices, one or more "connection" objects may appear in the graphical user interface to indicate the connection. In some implementations, the display objects 106 can be configured by a user, e.g., a user may specify which display objects 106 are displayed, and/or may download additional applications or other software that provides other functionalities and corresponding display objects.

In some implementations, the mobile device 100 can include one or more input/output (I/O) devices and/or sensor devices. For example, a speaker 160 and a microphone 162 can be included to facilitate voice-enabled functionalities, such as phone and voice mail functions. In some implementations, an up/down button 184 for volume control of the speaker 160 and the microphone 162 can be included. The mobile device 100 can also include an on/off button 182 for a ring indicator of incoming phone calls. In some implementations, a loud speaker 164 can be included to facilitate hands-free voice functionalities, such as speaker phone functions. An audio jack 166 can also be included for use of headphones and/or a microphone.

In some implementations, a proximity sensor 168 can be included to facilitate the detection of the user positioning the mobile device 100 proximate to the user's ear and, in response, to disengage the touch-sensitive display 102 to prevent accidental function invocations. In some implementations, the touch-sensitive display 102 can be turned off to conserve additional power when the mobile device 100 is proximate to the user's ear.

Other sensors can also be used. For example, in some implementations, an ambient light sensor 170 can be utilized to facilitate adjusting the brightness of the touch-sensitive display 102. In some implementations, an accelerometer 172 can be utilized to detect movement of the mobile device 100, as indicated by the directional arrow 174. Accordingly, display objects and/or media can be presented according to a detected orientation, e.g., portrait or landscape. In some implementations, the mobile device 100 may include circuitry and sensors for supporting a location determining capability, such as that provided by the Global Positioning System (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 100 or provided as a separate device that can be coupled to the mobile device 100 through an interface (e.g., port device 190) to provide access to location-based services.

In some implementations, a port device 190, e.g., a Universal Serial Bus (USB) port, or a docking port, or some other wired port connection, can be included. The port device 190 can, for example, be utilized to establish a wired connection to other computing devices, such as other communication devices 100, network access devices, a personal computer, a printer, a display screen, or other processing devices capable of receiving and/or transmitting data. In some implementations, the port device 190 allows the mobile device 100 to synchronize with a host device using one or more protocols, such as, for example, the TCP/IP, HTTP, UDP and any other known protocol.

The mobile device 100 can also include a camera lens and sensor 180. In some implementations, the camera lens and sensor 180 can be located on the back surface of the mobile device 100. The camera can capture still images and/or video.

The mobile device 100 can also include one or more wireless communication subsystems, such as an 802.11b/g communication device 186, and/or a Bluetooth™ communication device 188. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

Network Operating Environment

Figure 2:
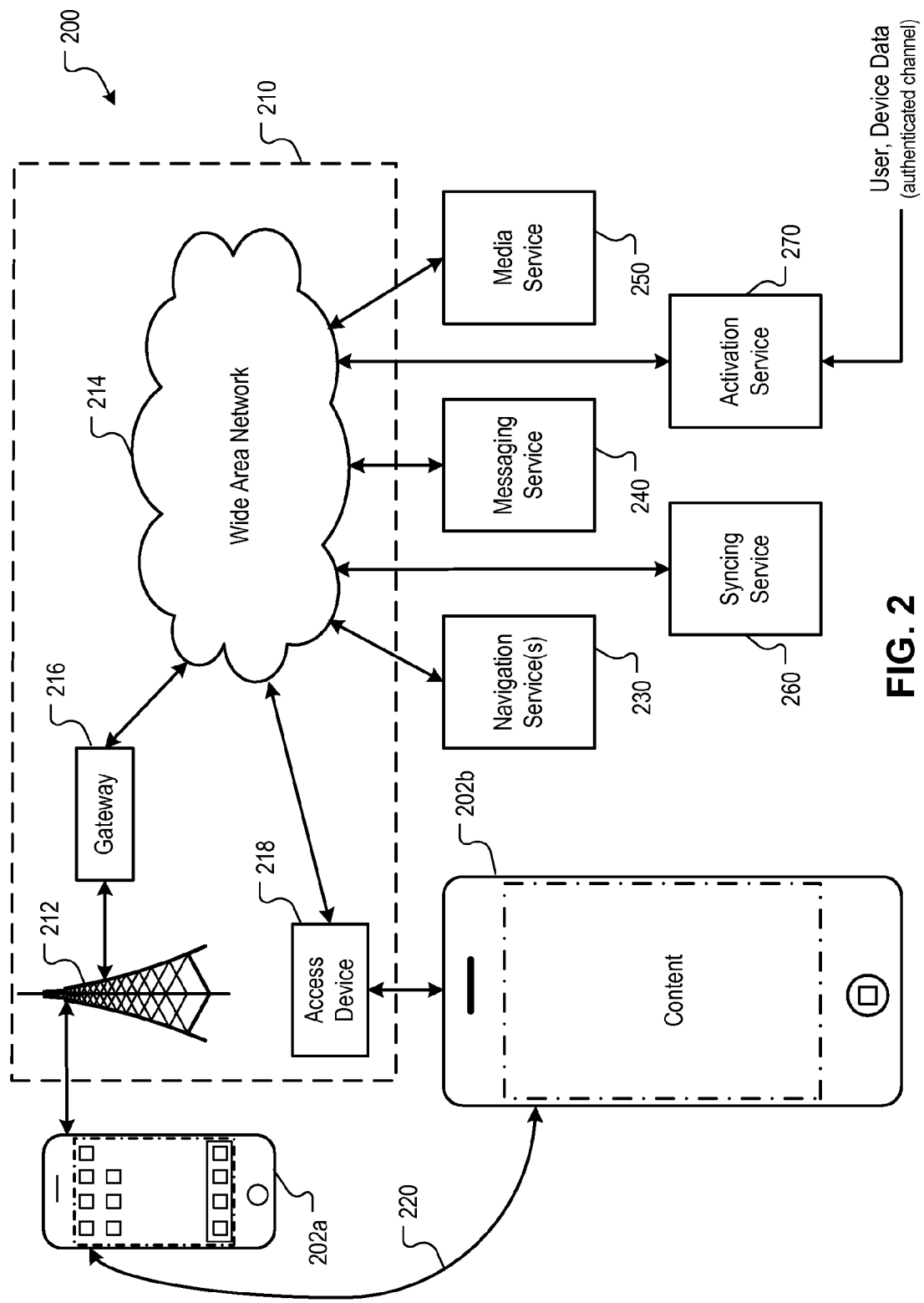
FIG. 2 is a block diagram of an example network operating environment for the mobile device of FIG. 1.

FIG. 2 is a block diagram of an example network operating environment 200. In FIG. 2, mobile devices 202a and 202b each can represent mobile device 100. Mobile devices 202a and 202b can, for example, communicate over one or more wired and/or wireless networks 210 in data communication. For example, a wireless network 212, e.g., a cellular network, can communicate with a wide area network (WAN) 214, such as the Internet, by use of a gateway 216. Likewise, an access device 218, such as an 802.1g wireless access device, can provide communication access to the wide area network 214. In some implementations, both voice and data communications can be established over the wireless network 212 and the access device 218. For example, the mobile device 202a can place and receive phone calls (e.g., using VoIP protocols), send and receive e-mail messages (e.g., using POP3 protocol), and retrieve electronic documents and/or streams, such as web pages, photographs, and videos, over the wireless network 212, gateway 216, and wide area network 214 (e.g., using TCP/IP or UDP protocols). Likewise, in some implementations, the mobile device 202b can place and receive phone calls, send and receive e-mail messages, and retrieve electronic documents over the access device 218 and the wide area network 214. In some implementations, the mobile device 202a or 202b can be physically connected to the access device 218 using one or more cables and the access device 218 can be a personal computer. In this configuration, the mobile device 202a or 202b can be referred to as a "tethered" device.

The mobile devices 202a and 202b can also establish communications by other means. For example, the wireless device 202a can communicate with other wireless devices, e.g., other mobile devices 202a or 202b, cell phones, etc., over the wireless network 212. Likewise, the mobile devices 202a and 202b can establish peer-to-peer communications 220, e.g., a personal area network, by use of one or more communication subsystems, such as the Bluetooth™ communication devices 188 shown in FIG. 1. Other communication protocols and topologies can also be implemented.

The mobile device 202a or 202b can, for example, communicate with one or more services 230, 240, 250, 260, and 270 over the one or more wired and/or wireless networks 210. For example, one or more navigation services 230 can provide navigation information, e.g., map information, location information, route information, and other information, to the mobile device 202a or 202b. A user of the mobile device 202b can invoke a map functionality, e.g., by pressing the maps object 144 on the top-level graphical user interface shown in FIG. 1, and can request and receive a map for a particular location, request and receive route directions, or request and receive listings of businesses in the vicinity of a particular location, for example.

A messaging service 240 can, for example, provide e-mail and/or other messaging services. A media service 250 can, for example, provide access to media files, such as song files, audio books, movie files, video clips, and other media data. In some implementations, separate audio and video services (not shown) can provide access to the respective types of media files. A syncing service 260 can, for example, perform syncing services (e.g., sync files). An activation service 270 can, for example, perform an activation process for activating the mobile device 202a or 202b. Other services can also be provided, including a software update service that automatically determines whether software updates exist for software on the mobile device 202a or 202b, then downloads the software updates to the mobile device 202a or 202b where the software updates can be manually or automatically unpacked and/or installed.

The mobile device 202a or 202b can also access other data and content over the one or more wired and/or wireless networks 210. For example, content publishers, such as news sites, RSS feeds, web sites, blogs, social networking sites, developer networks, etc., can be accessed by the mobile device 202a or 202b. Such access can be provided by invocation of a web browsing function or application (e.g., a browser) in response to a user touching, for example, a Web object.

Example Mobile Device Architecture

Figure 3:
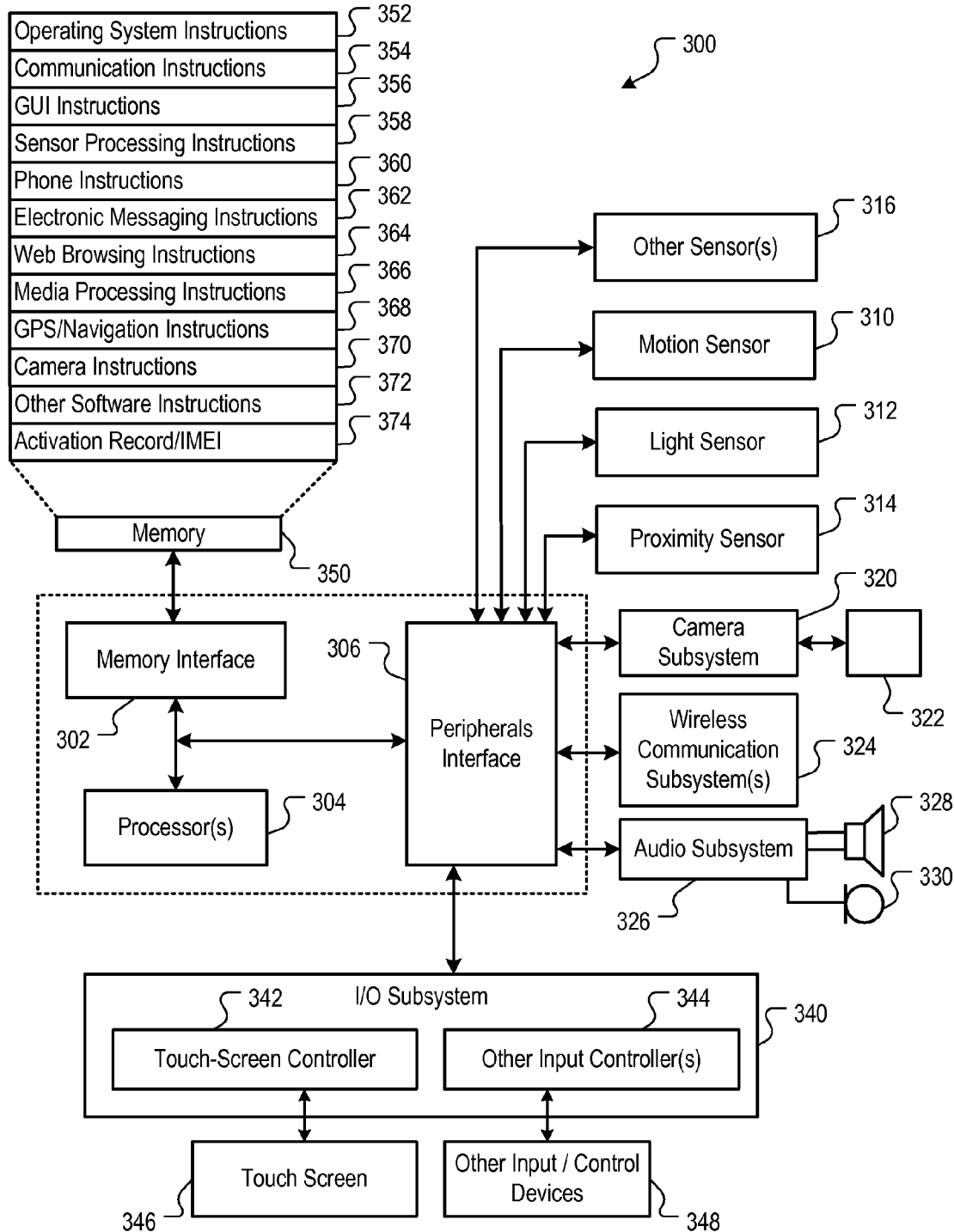
FIG. 3 is a block diagram of an example implementation of the mobile device of FIG. 1.

FIG. 3 is a block diagram 300 of an example implementation of the mobile device 100 of FIG. 1. The mobile device 100 can include a memory interface 302, one or more data processors, image processors and/or central processing units 304, and a peripherals interface 306. The memory interface 302, the one or more processors 304 and/or the peripherals interface 306 can be separate components or can be integrated in one or more integrated circuits. The various components in the mobile device 100 can be coupled by one or more communication buses or signal lines.

Sensors, devices, and subsystems can be coupled to the peripherals interface 306 to facilitate multiple functionalities. For example, a motion sensor 310, a light sensor 312, and a proximity sensor 314 can be coupled to the peripherals interface 306 to facilitate the orientation, lighting, and proximity functions described with respect to FIG. 1. Other sensors 316 can also be connected to the peripherals interface 306, such as a positioning system (e.g., GPS receiver), a temperature sensor, a biometric sensor, or other sensing device, to facilitate related functionalities.

A camera subsystem 320 and an optical sensor 322, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 324, which can include radio frequency receivers and transmitters and/or optical (e.g., infrared) receivers and transmitters. The specific design and implementation of the communication subsystem 324 can depend on the communication network(s) over which the mobile device 100 is intended to operate. For example, a mobile device 100 may include communication subsystems 324 designed to operate over a GSM network, a GPRS network, an EDGE network, a Wi-Fi or WiMax network, and a Bluetooth™ network. In particular, the wireless communication subsystems 324 may include hosting protocols such that the device 100 may be configured as a base station for other wireless devices.

An audio subsystem 326 can be coupled to a speaker 328 and a microphone 330 to facilitate voice-enabled functions, such as voice recognition, voice replication, digital recording, and telephony functions.

The I/O subsystem 340 can include a touch screen controller 342 and/or other input controller(s) 344. The touch-screen controller 342 can be coupled to a touch screen 346. The touch screen 346 and touch screen controller 342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 346.

The other input controller(s) 344 can be coupled to other input/control devices 348, such as one or more buttons, rocker switches, thumb-wheel, infrared port, USB port, and/or a pointer device such as a stylus. The one or more buttons (not shown) can include an up/down button for volume control of the speaker 328 and/or the microphone 330.

In one implementation, a pressing of the button for a first duration may disengage a lock of the touch screen 346; and a pressing of the button for a second duration that is longer than the first duration may turn power to the mobile device 100 on or off. The user may be able to customize a functionality of one or more of the buttons. The touch screen 346 can, for example, also be used to implement virtual or soft buttons and/or a keyboard.

In some implementations, the mobile device 100 can present recorded audio and/or video files, such as MP3, AAC, and MPEG files. In some implementations, the mobile device 100 can include the functionality of an MP3 player, such as an iPod™. The mobile device 100 may, therefore, include a 36-pin connector that is compatible with the iPod. Other input/output and control devices can also be used.

The memory interface 302 can be coupled to memory 350. The memory 350 can include high-speed random access memory and/or non-volatile memory, such as one or more magnetic disk storage devices, one or more optical storage devices, and/or flash memory (e.g., NAND, NOR). The memory 350 can store an operating system 352, such as Darwin, RTXC, LINUX, UNIX, OS X, WINDOWS, or an embedded operating system such as VxWorks. The operating system 352 may include instructions for handling basic system services and for performing hardware dependent tasks. In some implementations, the operating system 352 can be a kernel (e.g., UNIX kernel).

The memory 350 may also store communication instructions 354 to facilitate communicating with one or more additional devices, one or more computers and/or one or more servers. The memory 350 may include graphical user interface instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/Navigation instructions 368 to facilitate GPS and navigation-related processes and instructions; camera instructions 370 to facilitate camera-related processes and functions; and/or other software instructions 372 to facilitate other processes and functions, e.g., security processes and functions. The memory 350 may also store other software instructions (not shown), such as web video instructions to facilitate web video-related processes and functions; and/or web shopping instructions to facilitate web shopping-related processes and functions. In some implementations, the media processing instructions 366 are divided into audio processing instructions and video processing instructions to facilitate audio processing-related processes and functions and video processing-related processes and functions, respectively. An activation record and International Mobile Equipment Identity (IMEI) 374 or similar hardware identifier can also be stored in memory 350.

Each of the above identified instructions and applications can correspond to a set of instructions for performing one or more functions described above. These instructions need not be implemented as separate software programs, procedures, or modules. The memory 350 can include additional instructions or fewer instructions. Furthermore, various functions of the mobile device 100 may be implemented in hardware and/or in software, including in one or more signal processing and/or application specific integrated circuits.

Example Navigation System

Figure 4:
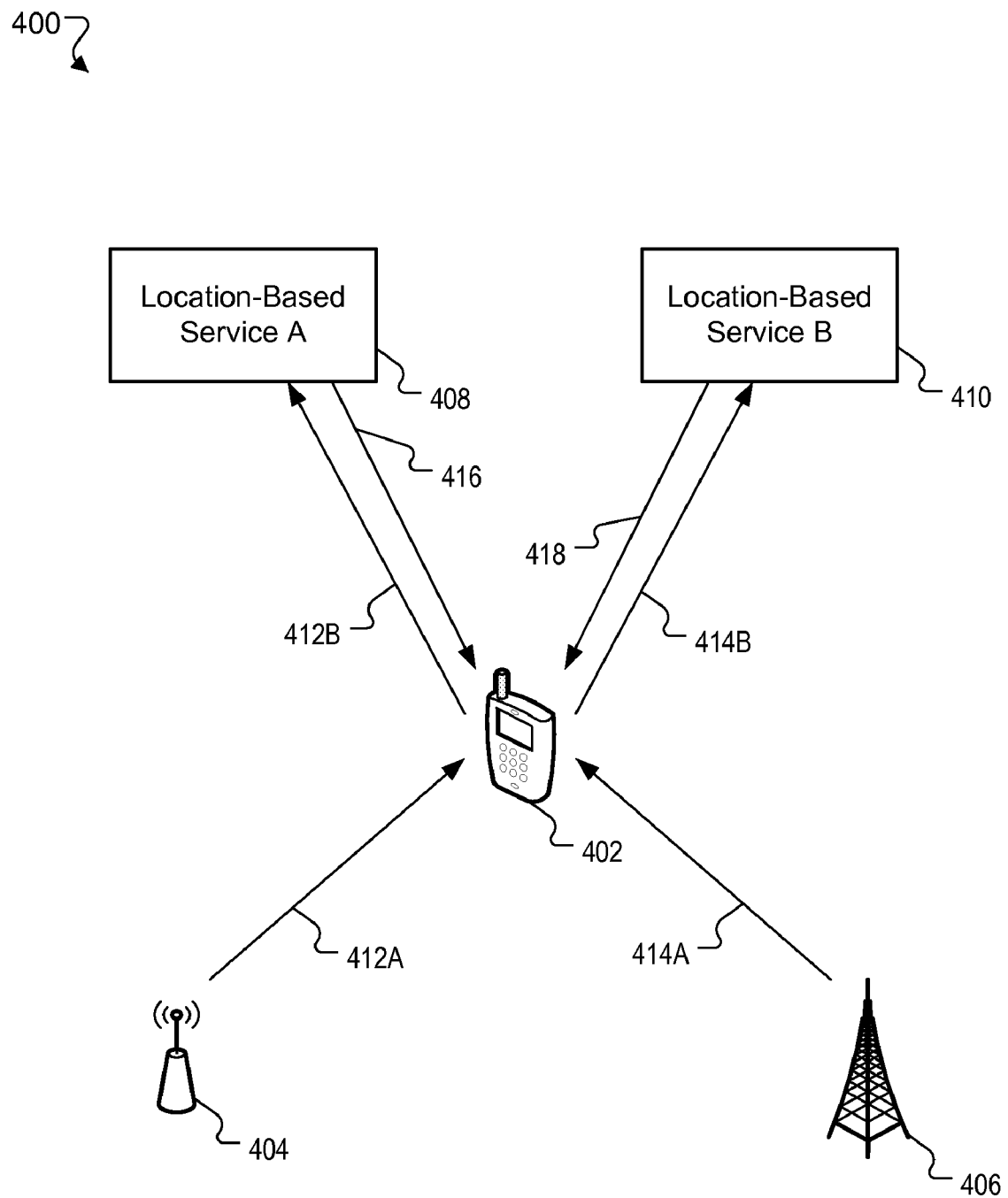
FIG. 4 illustrates an example implementation of a navigation system.

FIG. 4 illustrates an example implementation of a navigation system 400. In FIG. 4, mobile device 402 can represent mobile device 100. The mobile device 402 can, for example, communicate to one or more network access points 404 (e.g., Wi-Fi base station devices) or one or more cell towers 406. In some implementations, the access points 404 can be any combination of 802.11b/g wireless routers, 802.11n wireless routers, and some other Wi-Fi devices that implement any suitable Wi-Fi or other wireless networking technology or protocol. Using the communication with the access points 404 or the cell towers 406, a location-based service 408 (Location-Based Service A) or a location-based service 410 (Location-Based Service B) can estimate geographic areas where the mobile device 402 is currently located. The actual location of the mobile device 402 can be anywhere within the estimated geographic area. An estimated geographic area is not necessarily circular but can be indicated as a circular area on a map display for convenience.

The mobile device 402 can, for example, receive a communication 412A from an access point 404 (e.g., a Wi-Fi access point). The communication 412A can include information about the access point 404, e.g., the Internet Protocol (IP) address and/or the Media Access Control (MAC) address of the access point 404. The communication 412A can include other information, such as the latitude and longitude of the access point 404. The information received in communication 412A can be sent to the location-based service 408 in communication 412B. The location-based service 408 can, for example, with a degree of uncertainty or error, estimate a first geographic area in which the mobile device 402 is currently located using the information sent in communication 412B. In some implementations, the location-based service 408 is a system or service that estimates, with some degree of uncertainty or error, the position of a device using a database of access points mapped to geographic locations. The accuracy or precision (or the degree of uncertainty or error) of the estimated position can, for example, be based on the range of the technology, the accuracy of the range, or some other metric. Accuracy or precision of an estimated position can be affected by one or more factors including, for example, inherent properties or limitations of the technology or system, and a level of deployment of the given technology or system (e.g., number of access points or cell towers in the vicinity of the device).

In some implementations, the accuracy or precision of the estimated position is stated in units of distance (e.g., "the estimated position is accurate up to 50 meters"). That is, the actual position of the mobile device 402 can be within the accuracy distance from the estimated position. For example, the first geographic area can be a circle centered at the latitude and longitude of the estimated position with a radius equal to the stated accuracy or precision (e.g. 38 meters if the accuracy of the estimated position is up to 38 meters). The first geographic area can alternatively be represented on a map display as a square, rectangle, oval, diamond, triangle, or some other shaped enclosed region.

In some other implementations, unique signatures of multiple access points (e.g. five or more) can be compared to a local cache on the mobile device 402 or a central reference database at location-based service 408 via network communication (e.g. communication 412B can be sent to the location-based service 408). The location-based service 408 can use the unique signatures to estimate the latitude and longitude of the center of the first geographic circle with an m meter radius (e.g., about 20 meters).

In some implementations, location-based service 408 includes positioning services and reference database information provided by SKYHOOK WIRELESS of Boston, Mass.

The mobile device 402 can receive a communication 414A from cell tower 406. The cell communication 414A can include, for example, information identifying the cell tower 406. In some implementations, the cell communication 414A can also include the latitude and longitude of the cell tower 406. The identifying information and/or the latitude and longitude of the cell tower 406 can be sent to the location-based service 410 in communication 414B. The location-based service 410 can estimate a position of the mobile device 402 using the information included in communication 414B and estimate an accuracy of the estimate position. Thus, for example, the location-based service 410 can estimate a second geographic area in which the mobile device 402 is currently located. In some implementations, the second geographic area is represented on a map as a circular region centered at the estimated position and with a radius equal to the accuracy of the estimated position. In some other implementations, the second geographic area can represented on a map by a square or rectangular shaped enclosed region, to name a few additional examples.

In some implementations, the position and the geographic area of the mobile device 402 can be estimated using a "cell of origin" positioning technology. In some other implementations, the second geographic area can be determined by cell tower triangulation.

The first and second geographic areas can be sent to the mobile device 402 by communications 416 and 418, respectively. The mobile device 402 can present, on the touch-sensitive display 102 for example, a map view including an indication of one of the geographic areas if that one is entirely contained within the other geographic area (including the case where the boundaries of the geographic areas touch but otherwise no part of the one of the geographic area is outside of the other geographic area). For example, a map view that includes an indication of the first geographic area can be presented if the first geographic area is completely contained within the second geographic area. The mobile device 402 can present a map view that includes an indication of the second geographic area if the first geographic area is not completely contained within the second geographic area. For example, if the technology, system, or service used to estimate the first geographic area has a greater level of accuracy or precision detail than the technology, system, or service used to estimate the second geographic area, and the first geographic area is determined to be more accurate or precise based on the first geographic area being entirely within the second geographic area, the mobile device 402 can use the first geographic area. The level of detail of the technology can, for example, be determined by a priority table stored in the mobile device 402.

In another example, the first geographic area can be estimated using the access point 404, and the second geographic area can be estimated using the cell tower 406. In this example, the access point 404 was moved from its original location and the latitude and longitude coordinates of the access point 404 as they are known to location-based service 408 are incorrect and the mobile device 402 is not actually located within the first geographic area. The cell tower 406 provided correct location-based data and the mobile device 402 is located within the second geographic area. In this situation, the first and second geographic areas do not overlap, so the mobile device 402 would display a map view indicating the second geographic area. The mobile device 402 can be used to determine the accuracy of the first and second geographic areas, or an external server or servers can be used.

The location-based service 408 and location-based service 410 can run on the same device or on separate devices. For example, the location-based services 408 and 410 can run on servers communicating with the mobile device 100 through a network (e.g., WAN 214). The servers can be separate servers or the same server. The location-based services 408 and 410 can alternatively run on the mobile device 402.

The mobile device 402 can, for example, connect to additional devices or services (not shown) for location-based services, instead of, or in addition to the access point 404 and the cell tower 406. Such devices or services could include a Bluetooth™ device, GPS, radio or TV towers, or cellular grids, to name a few examples. For example, the mobile device 402 can connect to peer devices with the Bluetooth™ communication device 188 (FIG. 1) and receive location-based information from other mobile devices and/or Bluetooth™ enabled devices. In some implementations, the mobile device 402 can determine or estimate its position and/or geographic area using other technologies (e.g., GPS). In some implementations, the geographic area determined or estimated using any of these other technologies can be used (e.g., displayed) in lieu of the geographic area estimated using location-based services 408 or 410 (.e.g., Wi-Fi or cellular positioning techniques) if the geographic area determined or estimated using the other technologies is contained entirely within the geographic area estimated using location-based services 408 or 410 and if the other technologies are more accurate or precise according to the priority table stored in the mobile device 402.

Example Map View with Indication of Current Geographic Area

Figure 5A:
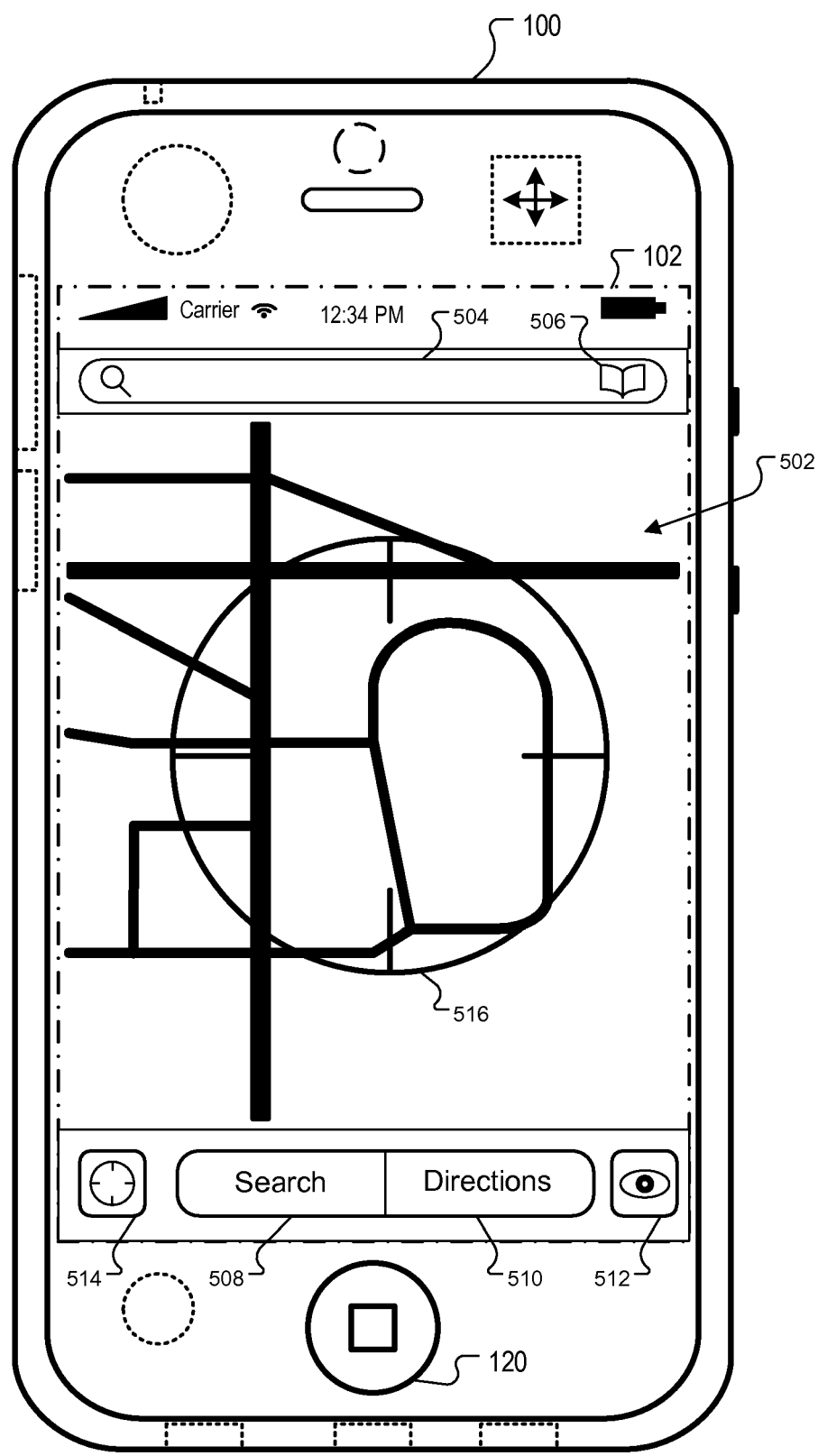
FIG. 5A illustrates an example of a map with a geographic area displayed on the mobile device of FIG. 1.

FIG. 5A illustrates an example of a map 502 with a geographic area displayed on mobile device 100. In some implementations, the mobile device 100 can display the map 502 on the touch sensitive display 102 of mobile device 100. The map 502 can be displayed when a user selects the maps object 144 to view mapping and location based services. In some implementations, objects, such as the maps object 144 (FIG. 1), can be selected by voice activation. A search bar 504 and a bookmarks list object 506 can be displayed at the top of the map 502. Below the bottom of the map one or more display objects can be displayed, for example a search object 508, a directions object 510, a map view object 512, and a current location object 514.

The search bar 504 can be used to find an address or other location on the map. For example, a user can enter their home address in the search bar 504, and the region containing the address would be displayed on the map 502. The bookmarks list object 506 can, for example, bring up a Bookmarks list which contains addresses that are frequently visited, such as a user's home address. The Bookmarks list can also, for example, contain special bookmarks such as the current location, e.g. the current location of the mobile device 100.

The search object 508 can be used to display the search bar 504 and other map related search menus. The directions object 510 can, for example, bring up a menu interface that allows the user to enter a start and end location and then displays information for a route from the start location to the end location, e.g. directions and travel time. The map view object 512 can bring up a menu that will allow the user to select display options for the map 502. An example of a menu that can be displayed when map view 512 is selected is further described below in reference to FIGS. 11 and 14. The map 502 could be changed from black and white to color, the background of the map could be changed, or the user could change the brightness of the map, to name a few examples.

The current location object 514 can allow the user to see a geographic area 516 on the map 502 indicating where the device 100 is currently located. The special current location bookmark can be placed in the Bookmarks list when the current location object 514 is selected. If the special current location bookmark was previously set in the Bookmarks list, the old bookmark information can, for example, be replaced with the new current location information. In some implementations, the special current location bookmark is tied to the centroid of the geographic area 516. That is, the special current location bookmark includes the address for the centroid of the geographic area 516. The geographic area 516 can be based on location data determined or estimated using location-based services 408 or 410, or some other location data, such as the data previously described in reference to FIG. 4. The geographic area 516 can, for example, be depicted by a circle, rectangle, square, or other enclosed region with crosshairs, or some other distinctive element to differentiate the geographic area 516 from the map 502.

In some implementations, the geographic area 516 indicates a region in which the mobile device 100 is determined or estimated to be located, and the geographic area may not necessarily be centered on the actual current position of the mobile device 100. In this example, the mobile device 100 may be located off-center within the geographic area. In another example, the geographic area 516 can be centered on an estimated current position of the mobile device 100.

The mobile device 100 can, for example, center the map view on the geographic area 516 when the current location object 514 is tapped or otherwise selected. In some implementations, the zoom level of the map can be adjusted based on the accuracy or precision of the location data or the technology, system, or service that provided the location data. For example, the map can be zoomed in for higher accuracy GPS location data and zoomed out for lower accuracy cell tower or Wi-Fi location data. In another implementation, the zoom level can be based on the velocity of the mobile device 100, e.g. the map can be zoomed out at higher velocities and zoomed in when the mobile device 100 is not moving. A combination of accuracy or precision and velocity can also be used. If all methods for retrieving location-based data fail, e.g. both location-based service A 408 and location-based service B 410 fail and there are no other systems or services available for determining or estimating the current position of the mobile device 100, an error can be displayed to the user and no geographic area is displayed on the map 502. The error can, for example, contain a message to the user informing them of the failure and the possible reason for the failure.

The current location object 514 can be selected, for example, to activate the estimation and displaying of the geographic area 516 on the map 502, to get directions to or from the estimated current location (i.e., the centroid of the geographic area 516), to send the estimated current location of the mobile device 100 to a friend (e.g. so that the friend can go to the same location), or to create a bookmark for the estimated current location, to name a few examples.

Figure 5B:
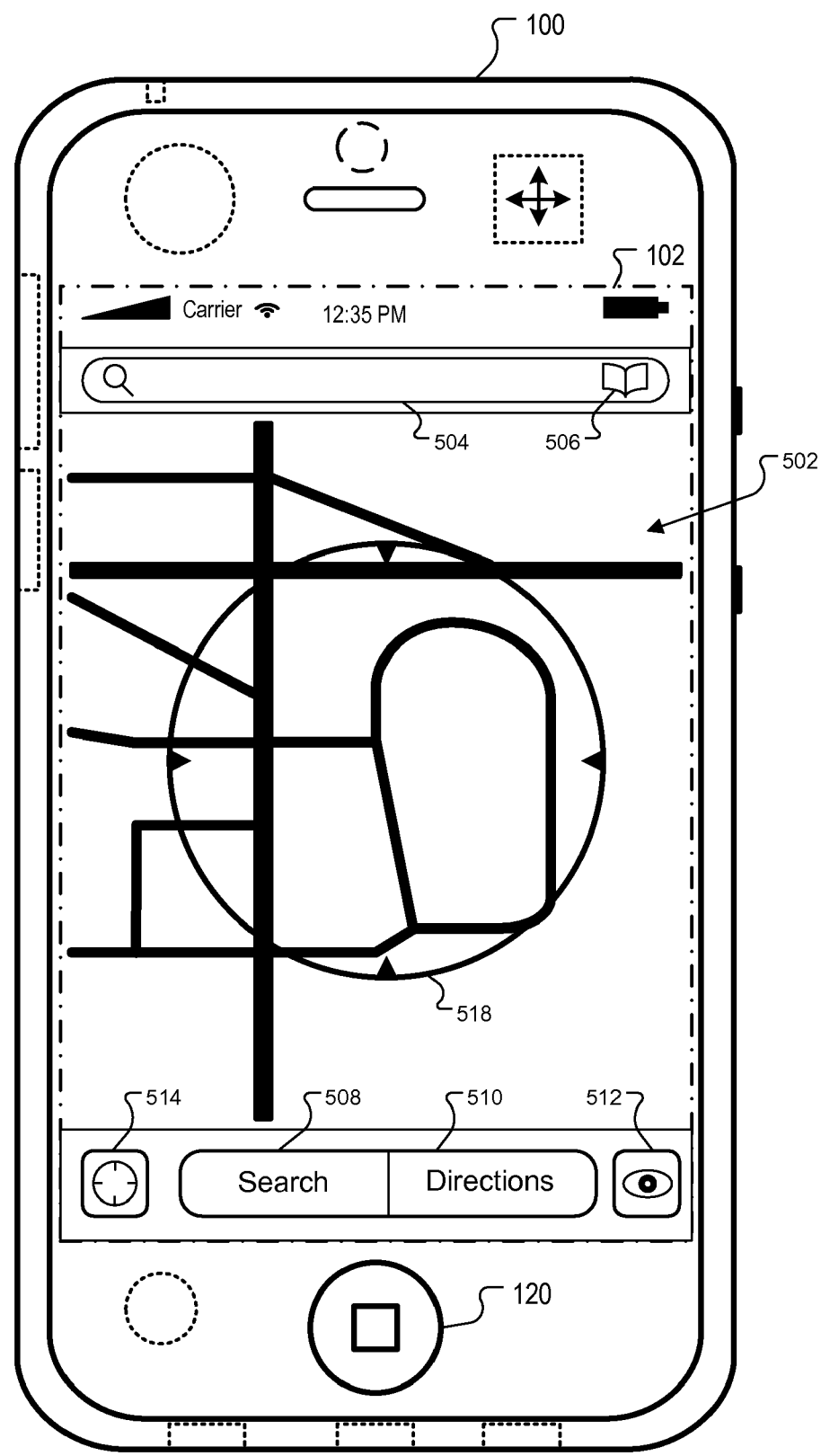
FIG. 5B illustrates another example of the map from FIG. 5A.

FIG. 5B illustrates another example of the map 502 with a geographic area 518 on the mobile device 100. In this example the geographic area 518 is shown as a circle with ticks on the perimeter of the circle. Other distinctive features could also be used to differentiate the geographic area 518 from the remainder of the map 502, such as a square, a triangle, or a shaded region. The perimeter of the geographic area 518 can, for example, have crosshairs, tick marks, shading, or some other feature to make it stand out from the map 502. In another example, the geographic area 518 can be shaded and/or highlighted, or the area of the map 502 outside of the geographic area 518 can be shaded and/or highlighted.

The circle outlining the geographic area 518 can, for example, have animation, or be motionless. The circle can, for example, change color (e.g. user defined colors or pre-programmed colors on the mobile device 100), change distinctive features (e.g. switch between crosshairs and ticks), or have moving distinctive features (e.g. the ticks change position). The circle could, for example, have white space overlaid on top of the map directly around the perimeter, or some combination of features. In some implementations, the contrast of the circle's color oscillates or pulses to differentiate the circle from the map 502.

Figure 6:
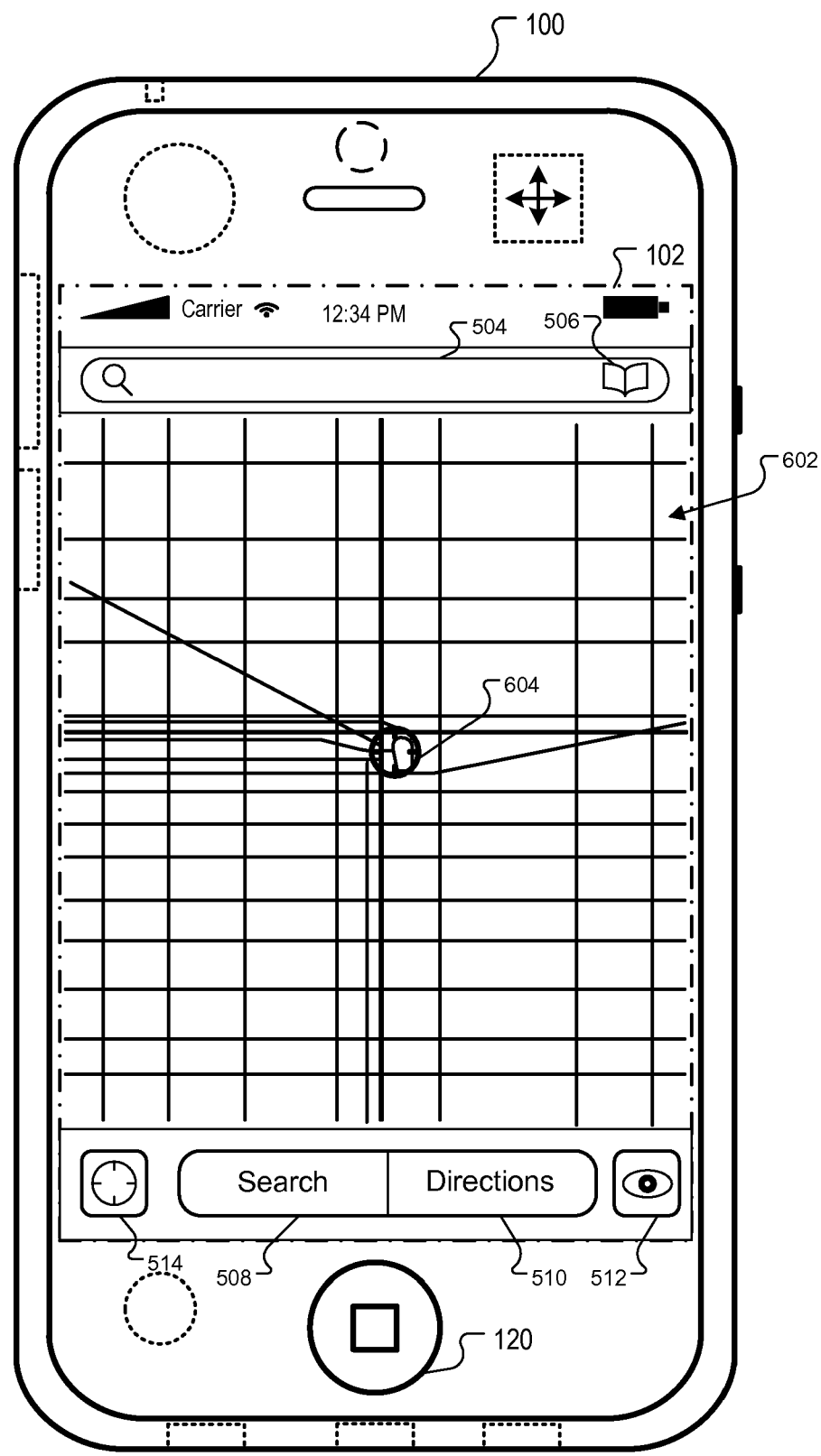
FIG. 6 illustrates a zoomed out view of the map from FIG. 5A.

FIG. 6 illustrates a zoomed out view 602 of the map 502 from FIG. 5A. In this example the user is able to view a large area of the map 602 around a geographic area 604. The geographic area 604 can, for example, be the geographic area 516 rescaled to match the scale of the zoomed out view 602. The user can, for example, find restaurants, entertainment, or some other destination located in or in the vicinity of the geographic area 604. This view of the map 602 can be presented when the mobile device 100 is moving, e.g. the user of the mobile device 100 is a passenger in a moving vehicle. In some implementations, the geographic area 604 is determined or estimated when the current location object 514 is selected and does not change with the movement of the mobile device 100. In some other implementations, the geographic area 604 can move on the map 602 with the movement of the mobile device 100.

In some implementations, the geographic area 604 can be based on data from the most recent query to the Wi-Fi base station device 404. The geographic area 604 could also, for example, be based on historical data of where the mobile device 100 recently was located. For example, if the geographic area 604 was last updated a short time before the newest activation, the previous location can be used to identify the new location. Continuing the example, if the previous current location showed that the user is in California, but the new location 30 minutes later would show a current location in Florida, an error can be displayed on the mobile device 100.

Figure 7:
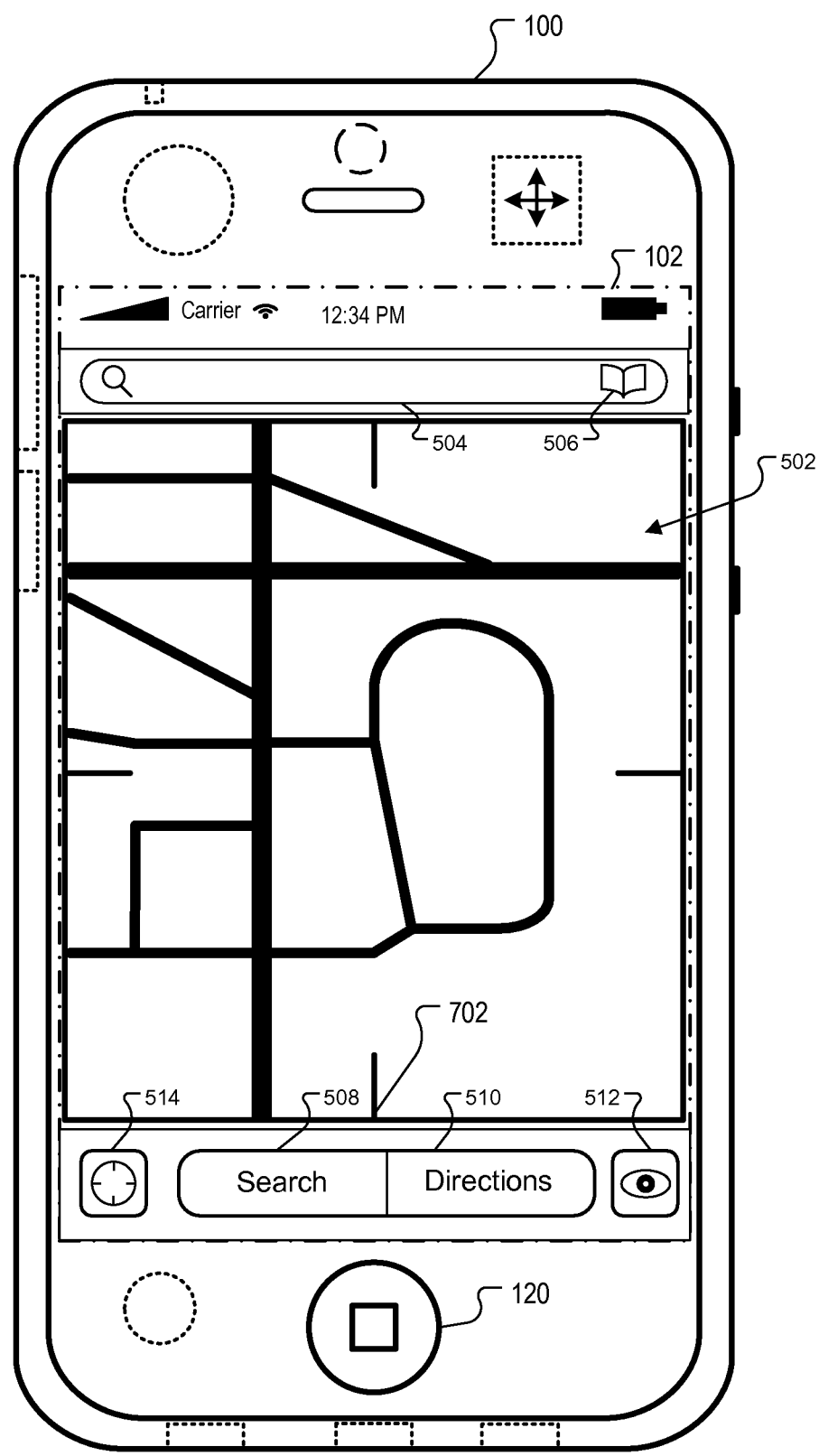
FIG. 7 illustrates another view of the map from FIG. 5A.

FIG. 7 illustrates another view of the map 502 from FIG. 5A. In this example, a geographic area 702 encloses the entire view of the map 502. In some implementations, this view of the map 502 and geographic area 702 can be shown, for example, when the mobile device is not moving or not moving very quickly, e.g. the user with mobile device 100 is walking. The geographic area 702 can be displayed to contain the entire view of the map 502 when, at a given zoom level of the map 502, the accuracy or precision of the estimated position of the device 100 spans the entirety of the displayed area of the map 502, i.e., the geographic area 702 covers the entirety of the displayed portion of the map 502 at the given zoom level. For example, if the map is zoomed to display a 50-meter region around the estimated current position and the accuracy of the estimated current position is 100 meters, then the geographic area 702 can be displayed to enclose the displayed region of the map.

Figure 8:
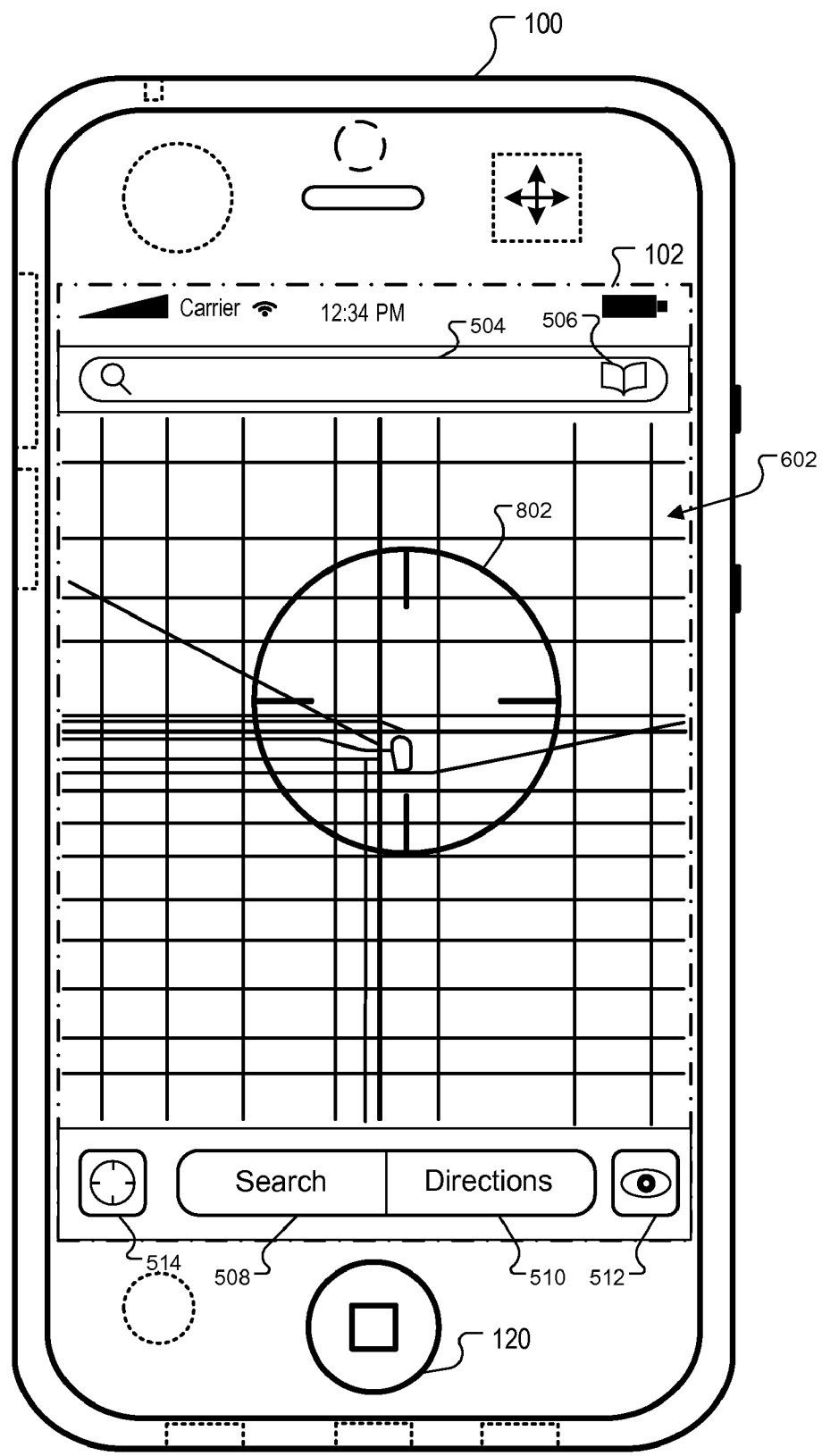
FIG. 8 illustrates another view of map with a larger geographic area than shown in FIG. 6.

FIG. 8 illustrates another view of map 602 with a larger geographic area 802 than shown in FIG. 6. The geographic area 604 could, for example, be determined using Wi-Fi, such as through access point 404 described in reference to FIG. 4, and the geographic area 802 could be determined using cell phone towers, such as the cell tower 406 described in reference to FIG. 4.

For example, the first geographic area from FIG. 4 can be determined using access points 404 and the second geographic area from FIG. 4 can be determined by cell tower 406. If the first geographic area is determined to be wholly contained within the second geographic area, the first geographic area can be used as geographic area 604 and be presented on the mobile device 100. If the first geographic area is determined to be at most partially contained within the second geographic area, the second geographic area could be used as geographic area 802 and be presented on the mobile device 100.

Some examples of the first geographic area being at most partially contained within the second geographic area include the access point 404 being moved, or the access point 404 and the cell tower 406 having a partial overlap of geographic areas (e.g. the first geographic area is on the edge and partially outside of the second geographic area). Other examples of the cause of geographic areas 604 and 802 being different would be for other positioning technologies, systems or services that have varying levels of accuracy or precision, such as a GPS and a radio tower.

In some implementations, the scaling of the map 502 can be different based on the geographic area selected, the technology/system/service used to determine or estimate the geographic area, or some other requirement. For example, if the first geographic area determined using access points 404, as described above, is selected to be presented as the geographic area 516 from FIG. 5A, the scaling can be larger than if the second geographic area, determined using cell tower 406, was selected to be presented as geographic area 802. The scaling of the map 602 can, for example, stay the same when the current location object 514 is selected. Continuing the example, if the default zoom level determined to be used on the mobile device 100 is close to the currently used zoom level, the zoom level can remain unchanged, e.g. if the default level is a street zoom and the current zoom level in on a city view, no change is made. If the current zoom level is a state view, and the default level is a street view, the map 602 can, for example, be changed to a street view.

The line width of the circle around the geographic area 802 can be changed based on the zoom level, or the line width can stay the same. For example, the line width can get larger or smaller when zooming in closer to the map. The change to the line width and/or to lengths of the crosshairs, tick marks, or the like on the circle can be based on an exponential algorithm, a linear algorithm, or some other algorithm.

Figure 9:
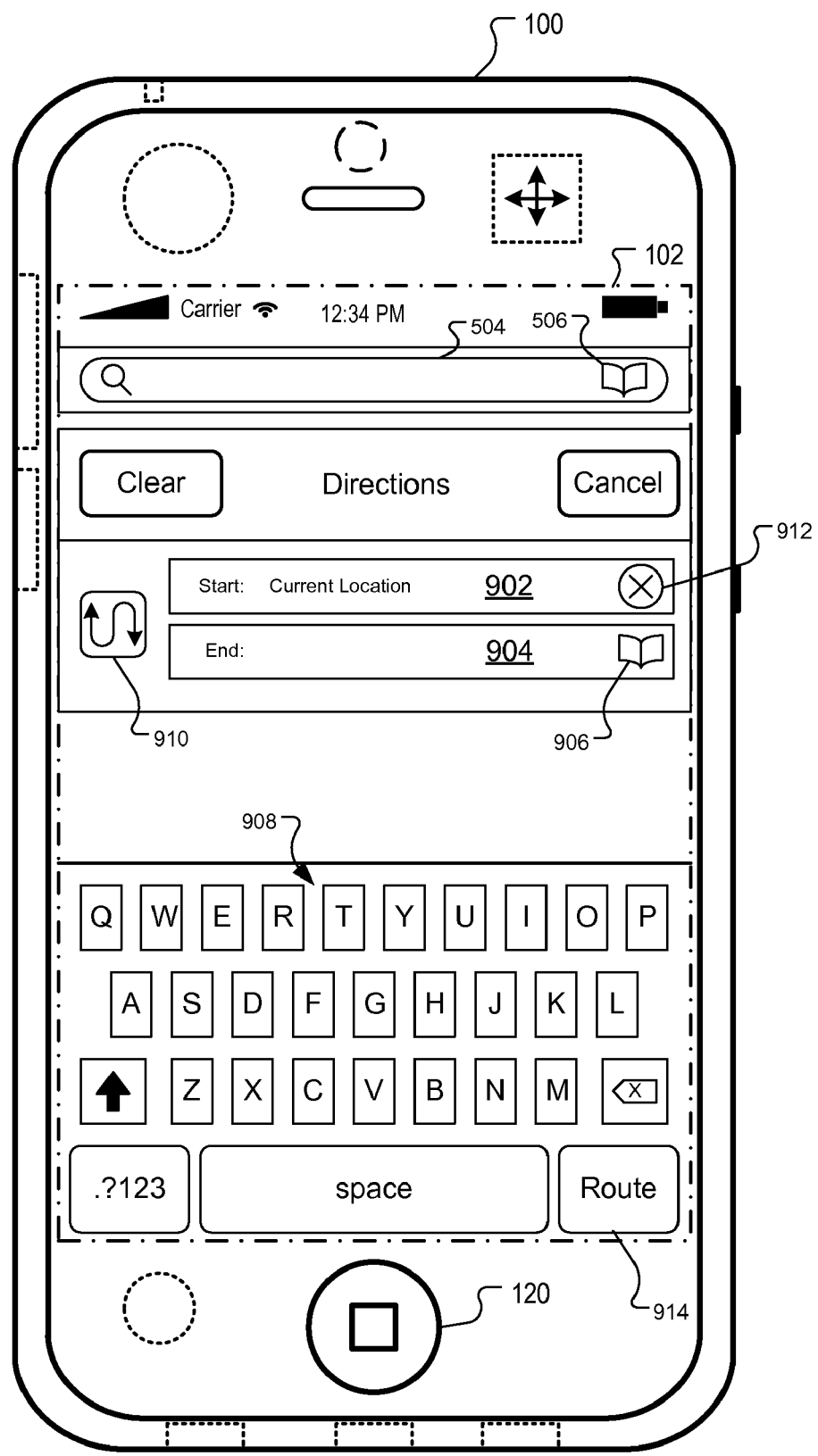
FIG. 9 illustrates an example of a user interface for getting directions.

FIG. 9 illustrates an example of an interface for getting directions on the mobile device 100. Selection of the directions object 510 can, for example, bring up the directions interface. The directions interface can allow the user of mobile device 100 to get directions to and from any location. In some implementations, the current location bookmark in the Bookmarks list can automatically be inserted a start location 902. A start location 902 can also be manually entered using a keyboard 908. An end location 904 can be selected from the Bookmarks list with an end bookmarks list object 906 or can be manually entered using the keyboard 908. If the current location is not used as the start location 902, it can be used as the end location 904 (e.g., by selecting the current location bookmark from the Bookmarks list).

The start location 902 and end location 904 can be swapped with a switch object 910. For example, the switch object can be used to make the end location 904 the new start location and the start location 902 the new end location.

In some implementations, the user can, for example, remove the current location bookmark from the start location 902 if a different start location is desired with a remove start location object 912. Alternatively, the user can manually enter a new location as the start location 902 using the keyboard 908. In other implementations, the user can select the current location bookmark or another location bookmark from the Bookmarks list as the start location. The remove start location object 912 can be replaced with a start bookmarks list object (not shown), similar to the end bookmarks list object 906, if the start location 902 is empty. Once the start location 902 and end location 904 have been entered the route object 914 can be selected and directions and optionally other information for a route from the start location 902 to the end location 904 can be displayed on the map, e.g. the map 502.

Figure 10:
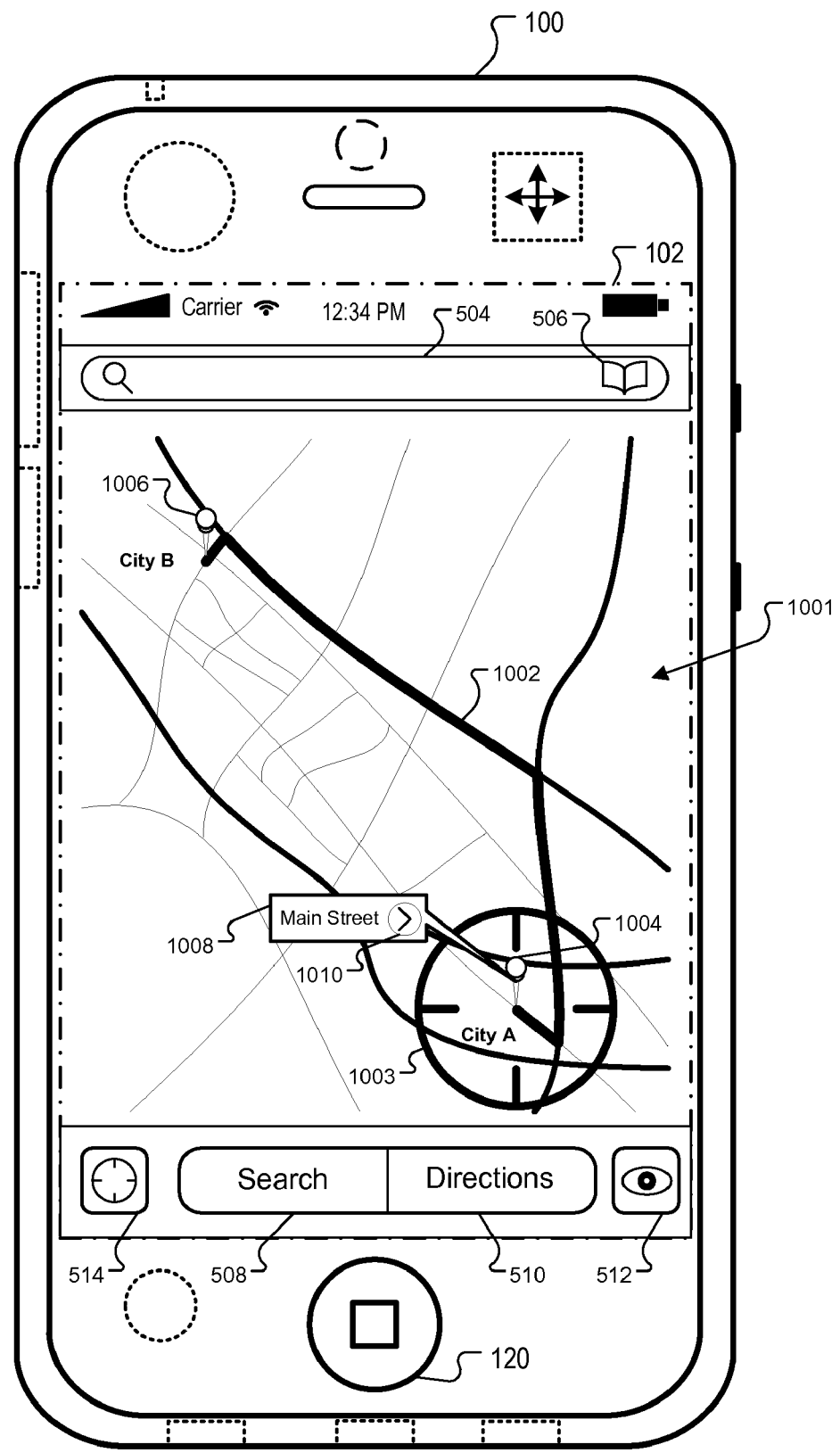
FIG. 10 illustrates an example of route information displayed on a map.

FIG. 10 illustrates an example of directions for a route 1002 displayed on a map 1001. The user, for example, can use the directions interface of FIG. 9 to get directions from the center or centroid of the geographic area 1003 in city A, to a destination address (e.g. an address entered on the keyboard 908, a selected bookmarked address). A start pin 1004 or other position marker can be placed in the center or centroid of the geographic area 1003 to represent an estimated current location of the mobile device 100; the actual location of the mobile device 100 can be anywhere within the geographic area 1003. An end pin 1006 can be placed at the destination address.

The route of the directions 1002 between the start pin 1004 and the end pin 1006 can be highlight or depicted in some other way to clearly show the route. In some implementations, the start pin 1004 has a street flag 1008 that displays the name of the street on which the start pin 1004 is placed. The street flag 1008 can have an object 1010 that is user selectable. Selection of the 1010 can display an interface to allow the user to change the display of the route 1002, to show turn by turn directions, or to select other options, to name a few examples.

Example Map View with Dropped Pin

Figure 11:
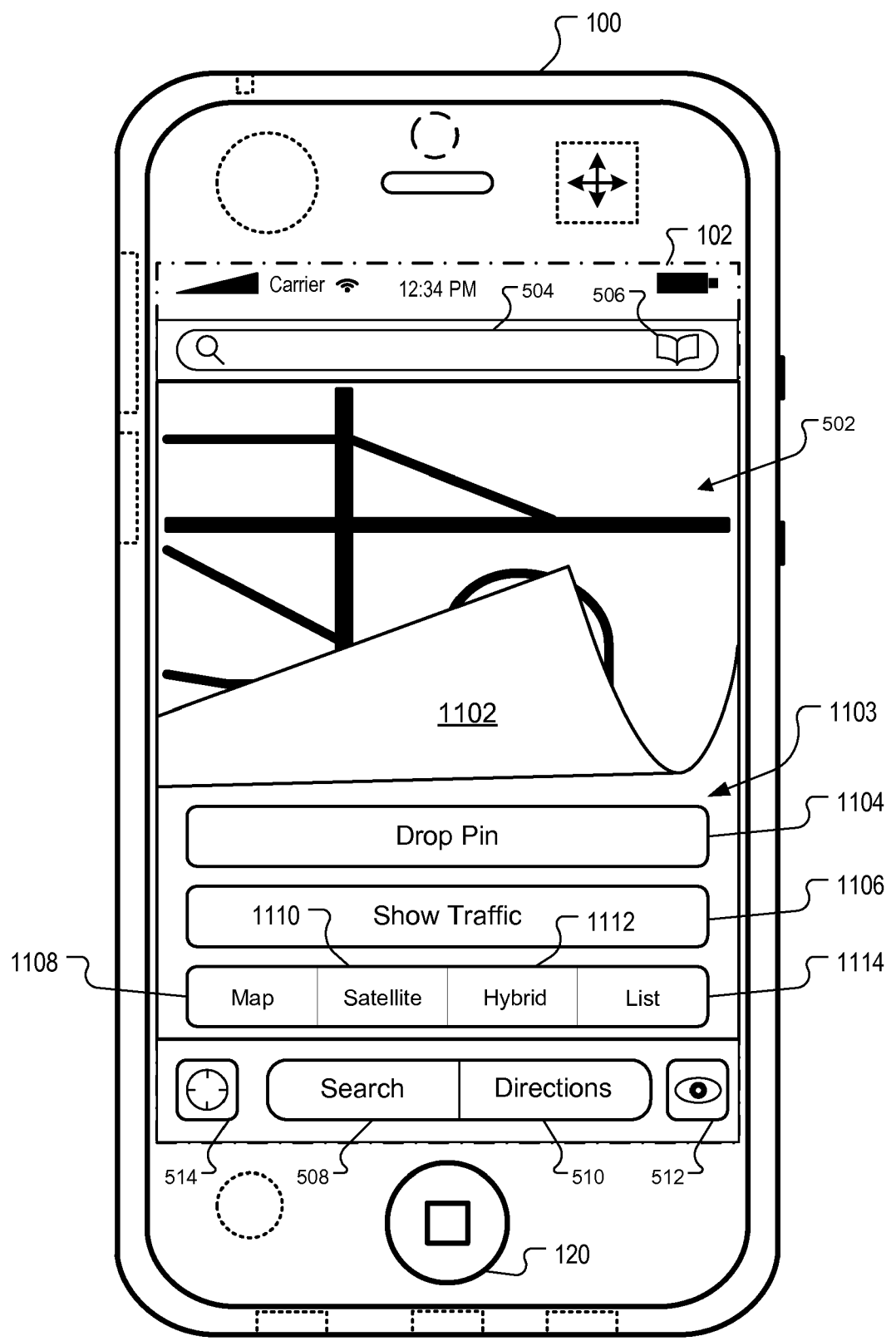
FIG. 11 illustrates an example menu in a mapping application.

FIG. 11 illustrates a menu presented when the user selects the map view object 512. When the map view object 512 is selected, the map 502 can be displayed with a page curl or flipped-page graphical effect 1102, to allow presentation of a menu 1103 on a bottom portion of the touch-sensitive display 102. In some implementations, this simulates a peeling of a layer with the map 502 to reveal the menu 1103 in a layer below. The flipped-page graphical effect 1102 can, for example, also allow presentation of other content such as the Bookmarks list, an address book, the directions interface, a phonebook, a calendar, a calculator, or other information. In some other implementations, the flipped-page graphical effect 1102 can allow additional content to be displayed toward the top, left, right, or middle of the touch-sensitive display 102. The flipped-page graphical effect 1102 can, for example, be a half page curl, or a whole page curl, to name a few examples.

The menu 1103 presented with the selection of the map view object 512 can contain user selectable objects including a drop pin object 1104 and a show traffic object 1106. Map views for the map 502 can be changed with a map object 1108, a satellite object 1110, and a hybrid object 1112. A list object 1114 can also be displayed.

The show traffic object 1106 can display traffic related information on the map 502. For example, roads with heavy traffic can be highlighted in red on the map 502. The map object 1108 can select a basic background (e.g. just streets, highways, etc are displayed) for the map 502. The satellite object 1110 can select a satellite view of the map 502 to be presented. The satellite view can contain terrain, such as trees, hills, mountains, buildings, etc. The hybrid object 1112 can have a combination of the basic background and the satellite view presented on the map 502. For example, terrain information is displayed with road information overlaid on top.

The list object 1114 can, for example, be used to display a list of one or more businesses, landmarks, addresses, or other locations located in the area displayed on the map 502 or in the vicinity of the current geographic area 516. In some implementations, the list of businesses can be a scroll list, or the list can be overlaid on top of map 502, e.g. the names and locations of businesses can be displayed on the map 502. In some implementations, the businesses, etc. in the list can be organized by name or by street. In some implementations, the businesses, landmarks, etc. are ordered by a location-based service from which the information regarding the businesses, landmarks, etc. are received. The location-based service can sort the list based on various criteria (e.g., popularity, relevance to a search query entered by the user of the device, etc). Selection of the list object 1114 can change the zoom level of map 502 so that too much information is not displayed on the map 502 (e.g., if the user is in a densely populated area the map can be zoomed in more than if the user is in a rural area).

In some implementations, when the list object 1114 is selected while a directions mode is active, e.g., the map is showing direction for a route, the list that is displayed is a list of the turn-by-turn directions for the route.

The drop pin object 1104 can, for example, allow the user to drop a pin or other position marker on the map 502. When the user drops a pin on a map (e.g., map 502), a special drop pin bookmark is placed in the Bookmarks list. In some implementations, the map can have one custom drop pin at any time. In some other implementations, the map can have more than one dropped pin at any time. The user can drop a pin on the map to mark and to keep track of an arbitrary location. For example, the user received a current location of a friend and wants to place a pin on the map where their friend is located. The user can use the dropped pin to get directions from the current location of the mobile device 100 to the location of the dropped pin, e.g. their friend's location. In the case of multiple dropped pins, the user can use the dropped pins to get direction from one arbitrary location to another arbitrary location.

Figure 12:
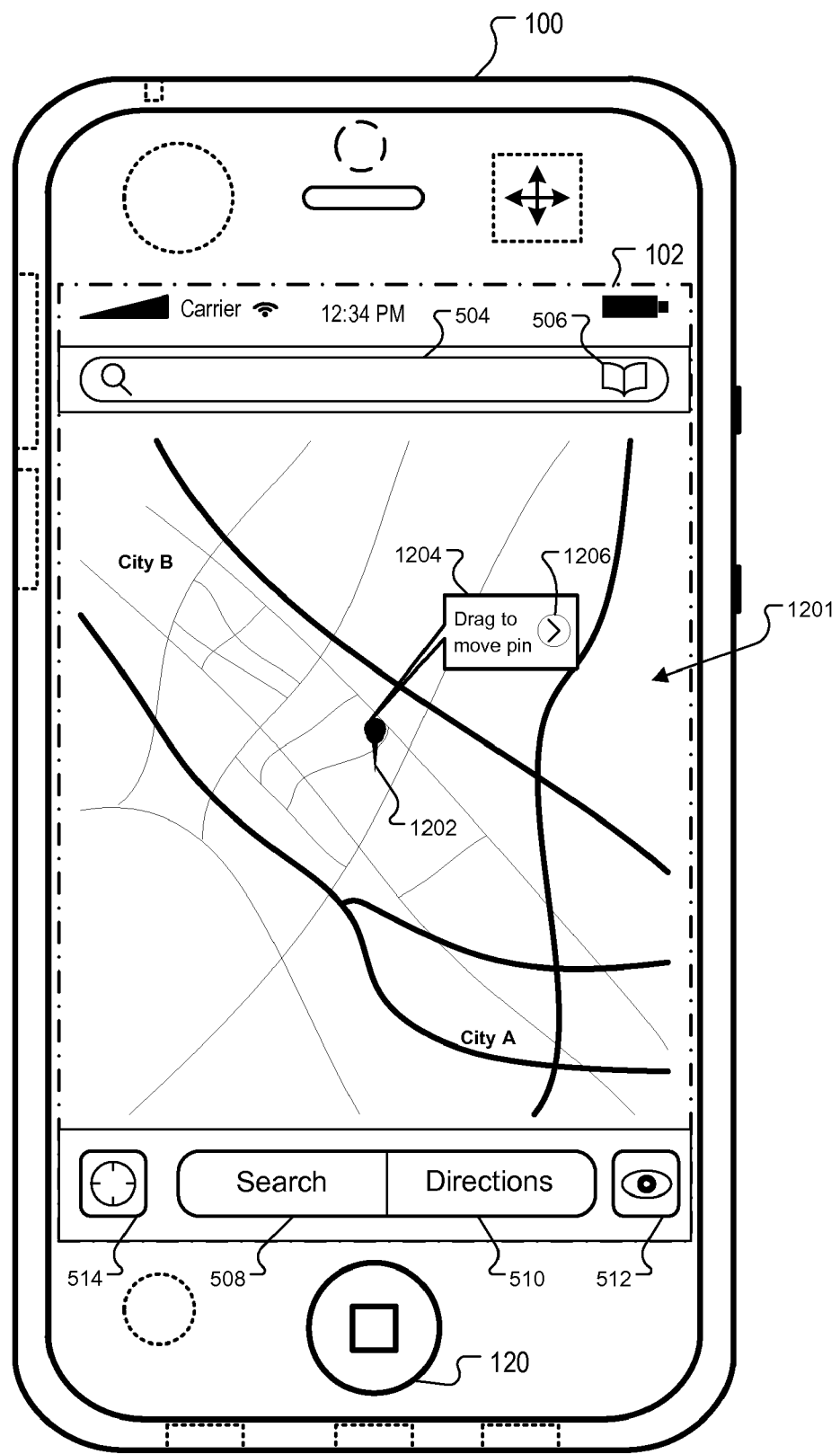
FIG. 12 shows an example of a map with a position marker dropped onto an arbitrary position on the map.

FIG. 12 shows an example of a dropped pin 1202 on a map 1201. The dropped pin 1202 can, for example, have a flag 1204 that provides information to the user of the mobile device 100. In some implementations, the flag 1204 can display information on the location where the dropped pin 1202 is placed, such as the city and state or street name, for example. The flag 1204 can include an arrow 1206 that is user selectable. In some implementations, when the user selects the arrow 1206, other content (e.g., additional information, a user-selectable menu of options, etc.) is displayed. In some implementations, the dropped pin 1202 can be moved by dragging it on the touch-sensitive display 102 to another location. The dropped pin 1202 can be any arbitrary location, e.g., a location that the user will need to get to in the future, the location of a friend needing directions, or some other point of reference.

Figure 13:
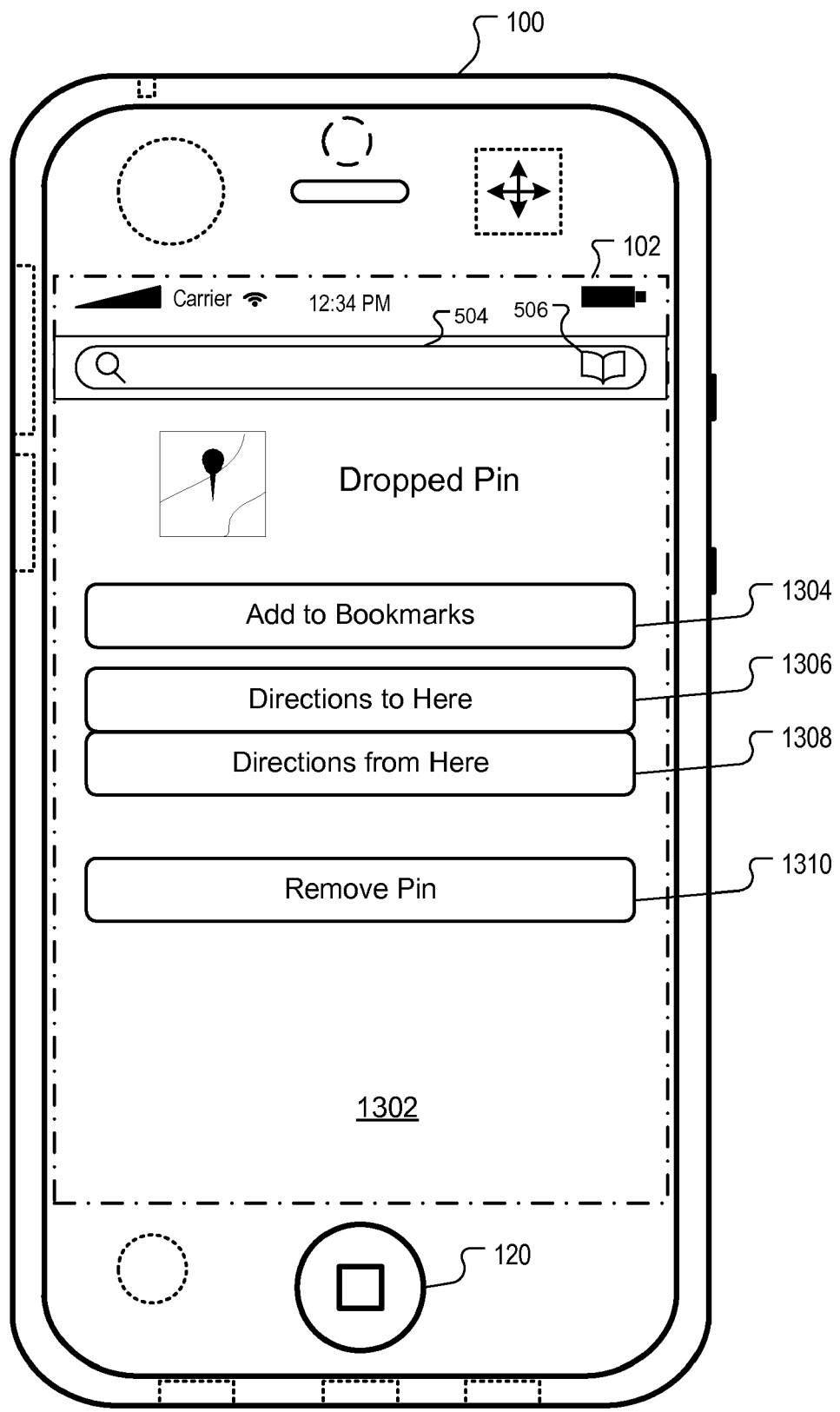
FIG. 13 illustrates a dropped position marker menu.

FIG. 13 illustrates a dropped pin menu 1302 displayed on the mobile device 100. The dropped pin menu 1302 can, for example, be accessed by double tapping on the dropped pin 1202 in FIG. 12, or by selecting the arrow 1206. The dropped pin menu 1302 can, for example, be associated with a dropped pin, e.g. the dropped pin 1202. The dropped pin menu 1302 can contain an add to bookmarks object 1304, a directions to here object 1306, a directions from here object 1308, and a remove pin object 1310.

In some implementations, the add to bookmarks object 1304 can create a bookmark in the Bookmarks list for the current location of the dropped pin 1202. When the bookmark is added to the Bookmarks list, the special dropped pin bookmark can, for example, be removed from the Bookmarks list, or the special dropped pin bookmark can remain in the Bookmarks list.

The directions to here object 1306 can bring up the directions interface for getting directions to the current location of the dropped pin 1202. For example, if the dropped pin 1202 is placed at a location that the user needs to get back to at a later time, the user can double tap on the dropped pin 1202 when they need directions. Continuing the example, if the user has the estimated current location (e.g., the centroid of an estimated geographic area) selected, selection of the directions to here object 1306 can bring up the directions interface with the estimated current location filled out as the start location, and the end location as the dropped pin 1202. This can allow the user of the mobile device 100 to easily get back to another location they were at recently, or to get to a friend's location, to name a few examples.

The directions from here object 1308 can bring up the directions interface and allow the user to select or enter an end destination. The directions from here object 1308 can, for example, be chosen when the user is giving directions to a friend located at the dropped pin 1202. The directions from here object 1308 can be selected, continuing the example, and a bookmark (e.g. a home bookmark with the home address of the user of the mobile device 100) or a manually entered location can be chosen as the end location. The directions to here object 1308 and the directions from here object 1308 can also be used to provide route information to or from the dropped pin 1202 for a doctor's appointment or a sporting event, to name a few additional examples.

The remove pin object 1310 can allow the user to remove the currently selected dropped pin 1202 from the map 502. In some implementations, the dropped pin 1202 is unique (e.g. there is only one dropped pin on the map at any time), and in other implementations, there can be more than one dropped pin on the map at any time. The user can select the remove pin object 1310 if the location of the dropped pin 1202 is no longer needed, e.g. the location of the dropped pin has been added to the Bookmarks list with the add to bookmarks object 1304.

Figure 14:
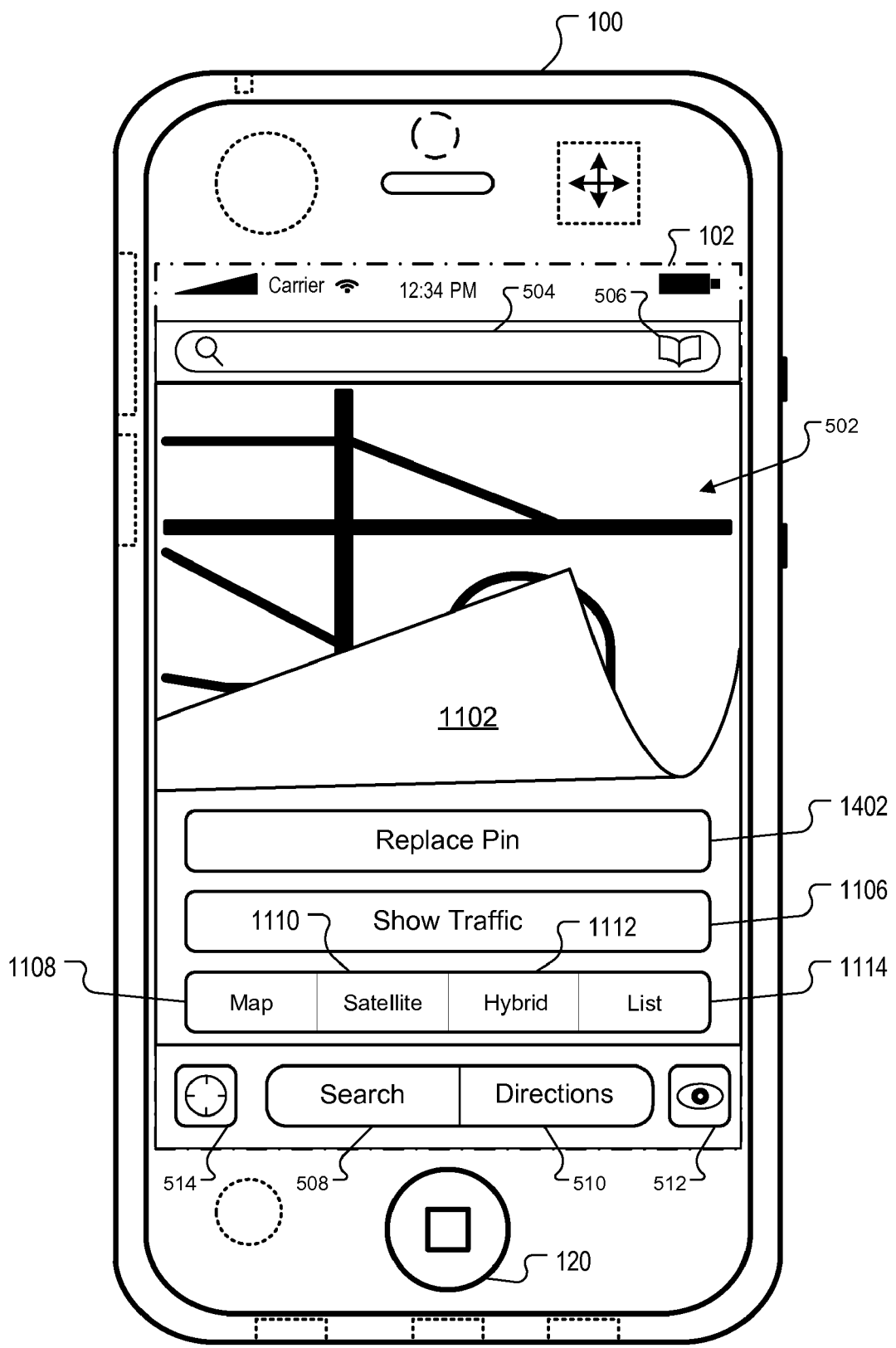
FIG. 14 illustrates another example menu in a mapping application.

FIG. 14 illustrates the menu presented by the map view object 512 when there is a dropped pin on the map. In this implementation, there can only be one dropped pin on the map at any time for keeping track of a point of interest, or a destination that will only be traveled to once, to list a few examples. The user can, for example, save the current dropped pin 1202 to the Bookmarks list to keep track of multiple points of interest. Continuing the example, the drop pin object 1104 is replaced with a replace pin object 1402. When the replace pin object 1402 is selected, for example, the currently dropped pin (e.g. dropped pin 1202) is removed from the map and a new pin is dropped onto the map. The old dropped pin (e.g. dropped pin 1202) may not currently be visible on the map.

In some other implementations, there can be more than one dropped pin. In this example, both the drop pin object 1104 and the replace pin object 1402 can be visible in the menu presented by selection of the map view object 512. The user could, for example, name the dropped pins to keep track of them on the map 502.

Figure 15:
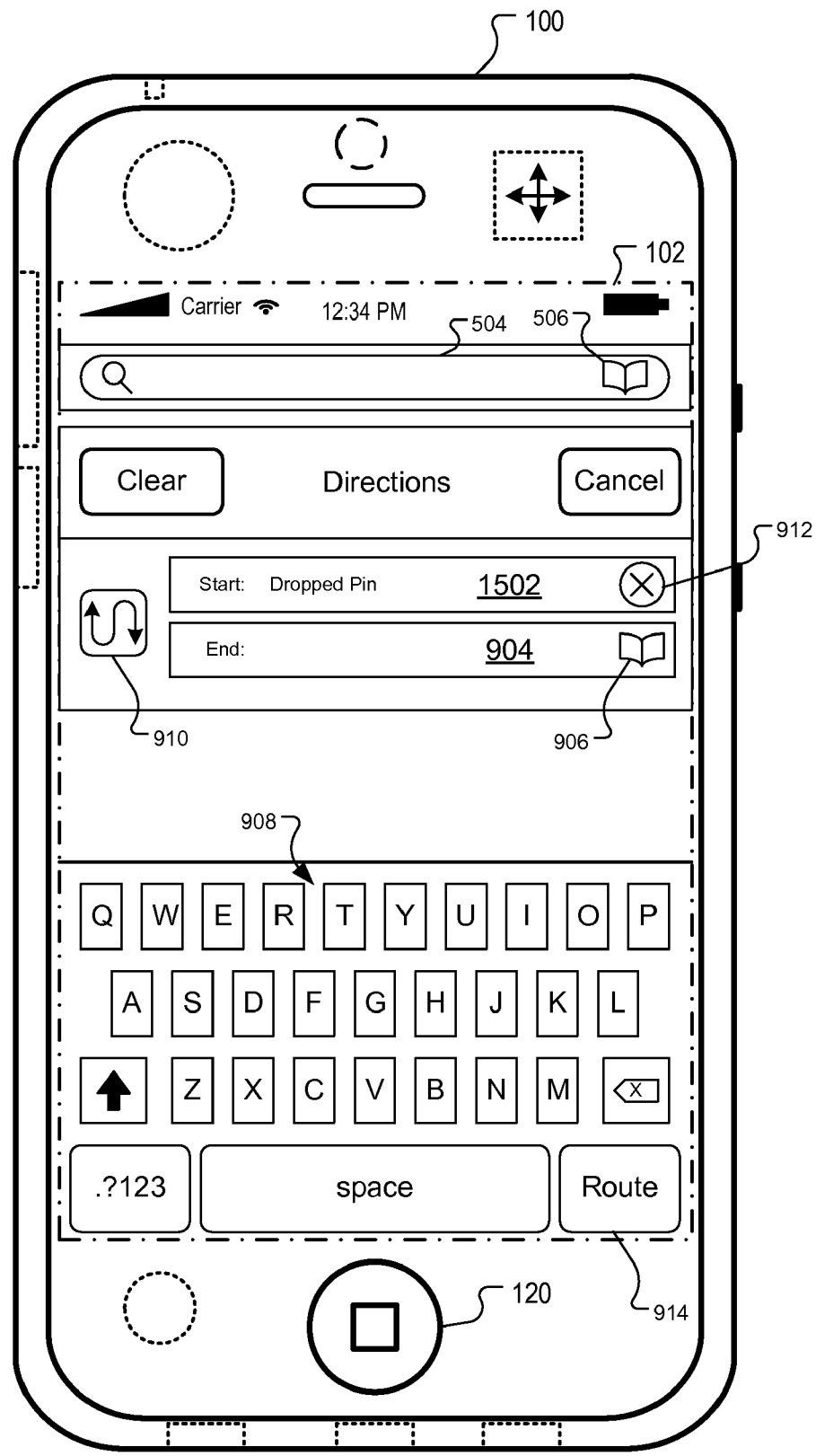
FIG. 15 illustrates another example of a user interface for getting directions.

FIG. 15 illustrates an example of the directions interface after selecting the directions from here object 1308. In this case, when the directions interface is displayed, the location of the dropped pin 1202 is filled in for a start location 1502. The user can select the end location 904 with the end bookmark list object 906 or the keyboard 908. The switch object 910 can be selected to swap the start location 1502 and the end location 904. If, for example, the user changes plans, the start location 1502 can be changed from the dropped pin 1202 to another location by selecting the remove start location object 912 and entering a new start location with the keyboard 908 or by selecting a location from the Bookmarks list. When both the start location 1502 and the end location 904 have been entered, the route object 914 can be selected to display directions on a map, e.g. the map 1201.

The directions interface can also be entered when the user selects the directions to here object 1306. In this case, when the directions interface is displayed, the location of the dropped pin 1202 is filled in as the end location 904.

Figure 16:
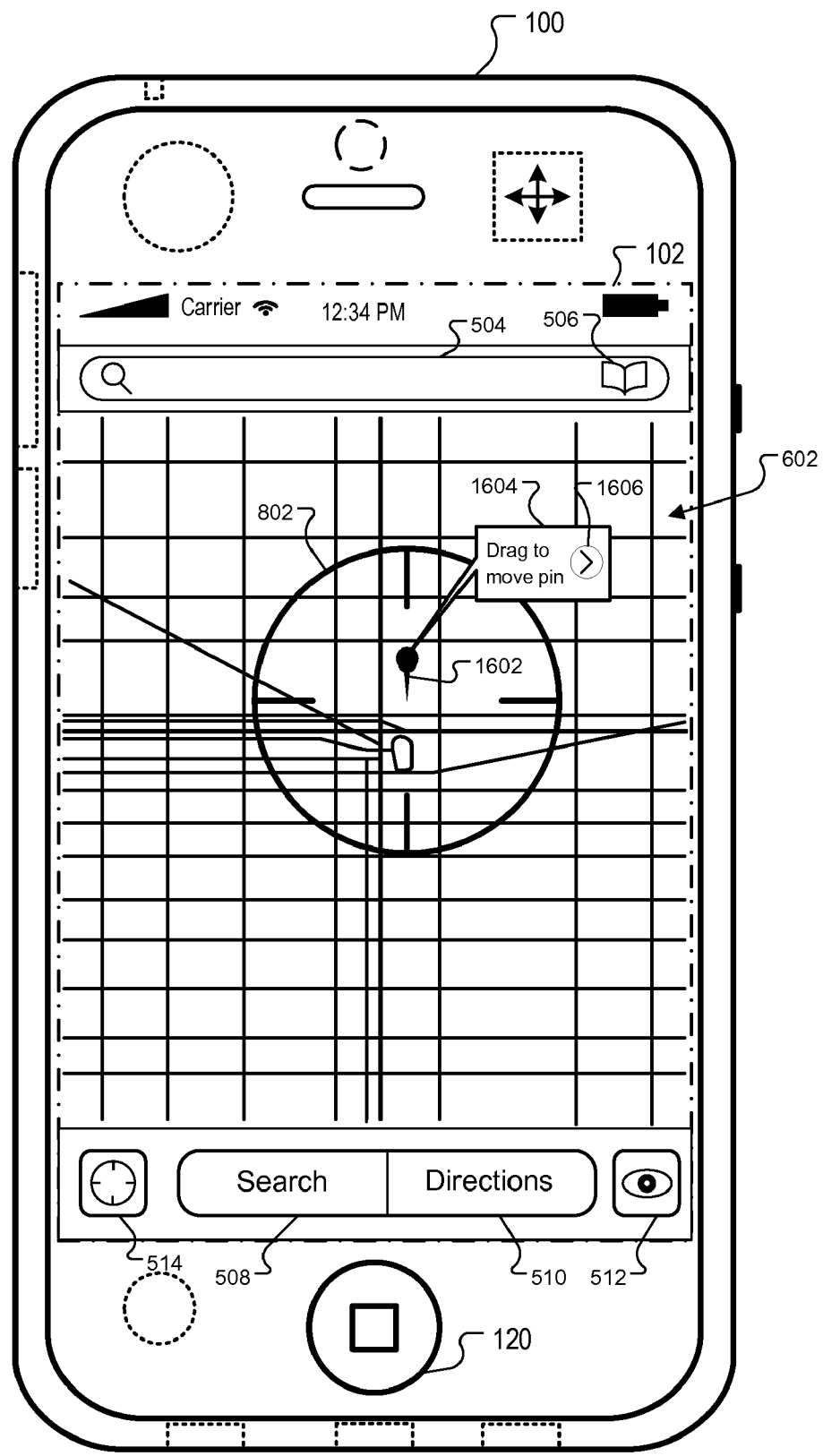
FIG. 16 illustrates a dropped pin in the center of a geographic area.

FIG. 16 illustrates a dropped pin 1602 placed at the centroid of the geographic area 802 from FIG. 8. When a geographic area (e.g., geographic area 802) of the mobile device 100 is displayed on a map (e.g., the map 602) and the dropped pin 1602 is placed on the map, the dropped pin 1602 is placed at the centroid of the geographic area. The user can drag the dropped pin 1602 to another location within the geographic area 802 or on the map 602 if desired by selecting the dropped pin, e.g. by touching the touch-sensitive display 102 at the location of the dropped pin 1602. In some implementations, the dropped pin 1602 can have a flag 1604 that can present information about the location of the dropped pin 1602 or instructions to the user. The dropped pin 1602 can, for example, be saved as a permanent bookmark in the Bookmarks list via the dropped pin menu 1302 accessed with an arrow 1606 in the flag 1604.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of what is disclosed here, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
   estimating a first current position of a device and a first geographic area at least partially surrounding the first estimated current position using a first positioning system;
   estimating a second current position of the device and a second geographic area at least partially surrounding the second estimated current position using a second positioning system; and
   providing for display an indication of either the first estimated current position or the second estimated position based on whether the first estimated geographic area is contained within the second estimated geographic area, providing for display the indication including:
      providing for display a first map view, including the first geographic area as the indication of the first estimated current position on the first map view, if the first geographic area is contained within the second geographic area; or
      providing for display a second map view, including the second geographic area as the indication of the second estimated current position, if the first geographic area is not contained within the second geographic area.

2. The method of claim 1, wherein the first positioning system is associated with a first level of positional accuracy, and the second positioning system is associated with a second level of positional accuracy that is lower than the first level of accuracy.

3. The method of claim 1, wherein estimating a first geographic area using a first positioning system comprises:
   using the first positioning system to estimate the first current position of the device and an error region associated with and at least partially surrounding the first estimated current position, wherein the first geographic area comprises the estimated error region.

4. The method of claim 1, wherein estimating a second geographic area using a second positioning system comprises:
   using the second positioning system to estimate the second current position of the device and an error region associated with and at least partially surrounding the second estimated current position, wherein the second geographic area comprises the estimated error region.

5. The method of claim 1, further comprising, if the indication of the first geographic area is presented:
generating route information for a route, wherein an a first endpoint of the route is a centroid of the first geographic area and a second endpoint is another geographic location; and
providing the route information for display.

6. The method of claim 1, further comprising, if the indication of the second geographic area is presented:
generating route information for a route, wherein an a first endpoint of the route is a centroid of the second geographic area and a second endpoint is another geographic location; and
providing the route information for display.

7. A mobile device comprising:
a display;
one or more processors; and
a computer-readable medium storing instructions for execution by the one or more processors, the instructions operable to cause the one or more processors to perform operations comprising:
estimating a first current position of a device and a first geographic area at least partially surrounding the first estimated current position using a first positioning system;
estimating a second current position of the device and a second geographic area at least partially surrounding the second estimated current position using a second positioning system; and
providing for display an indication of either the first estimated current position or the second estimated current position based on whether the first estimated geographic area is contained within the second estimated geographic area, providing for display the indication including:
providing for display a first map view, including the first geographic area as the indication of the first estimated current position on the first map view, if the first geographic area is contained within the second geographic area; or
providing for display a second map view, including the second geographic area as the indication of the second estimated current position, if the first geographic area is not contained within the second geographic area.

8. The device of claim 7, wherein the first positioning system is associated with a first level of positional accuracy, and the second positioning system is associated with a second level of positional accuracy that is lower than the first level of accuracy.

9. The device of claim 7, the operations further comprising:
using the first positioning system to estimate the first position of the device and an error region associated with and at least partially surrounding the first estimated current position, wherein the first geographic area comprises the estimated error region.

10. The device of claim 7, the operations further comprising:
using the second positioning system to estimate the second current position of the device and an error region associated with and at least partially surrounding the second estimated current position, wherein the second geographic area comprises the estimated error region.

11. The device of claim 7, the operations further comprising:
generate route information for a route, wherein an a first endpoint of the route is a centroid of the first geographic area and a second endpoint is another geographic location; and
present the route information.

12. The device of claim 7, the operations further comprising instructions to:
generating route information for a route, wherein an a first endpoint of the route is a centroid of the second geographic area and a second endpoint is another geographic location; and
providing the route information for display.

13. A computer program product, stored on a non-transitory storage medium, operable to cause a portable device to perform operations comprising:
estimating a first current position of a device and a first geographic area at least partially surrounding the first estimated current position using a first positioning system;
estimating a second current position of the device and a second geographic area at least partially surrounding the second estimated current position using a second positioning system; and
providing for display an indication of either the first estimated current position or the second estimated current position based on whether the first estimated geographic area is contained within the second estimated geographic area, providing for display the indication including:
providing for display a first map view, including the first geographic area as the indication of the first estimated current position on the first map view, if the first geographic area is contained within the second geographic area; or
providing for display a second map view, including the second geographic area as the indication of the second estimated current position, if the first geographic area is not contained within the second geographic area.

14. The product of claim 13, wherein the first positioning system is associated with a first level of positional accuracy, and the second positioning system is associated with a second level of positional accuracy that is lower than the first level of accuracy.

15. The product of claim 13, wherein estimating a first geographic area using a first positioning system comprises:
using the first positioning system to estimate the first current position of the device and an error region associated with and at least partially surrounding the first estimated current position, wherein the first geographic area comprises the estimated error region.

16. The product of claim 13, wherein estimating a second geographic area using a second positioning system comprises:
using the second positioning system to estimate the second current position of the device and an error region associated with and at least partially surrounding the second estimated current position, wherein the second geographic area comprises the estimated error region.

17. The product of claim 13, the operations further comprising, if the indication of the first geographic area is presented:
generating route information for a route, wherein an a first endpoint of the route is a centroid of the first geographic area and a second endpoint is another geographic location; and
providing the route information for display.

* * * * *

UNITED STATES PATENT AND TRADEMARK OFFICE
CERTIFICATE OF CORRECTION

PATENT NO. : 8,355,862 B2  
APPLICATION NO. : 11/969901  
DATED : January 15, 2013  
INVENTOR(S) : Mike Matas, Gregory N. Christie and Christopher Blumenberg Page 1 of 1

It is certified that error appears in the above-identified patent and that said Letters Patent is hereby corrected as shown below:

In the Claims

Column 21, Line 3 at Claim 5; replace:
"generating route information for a route, wherein an a first" with
-- generating route information for a route, wherein a first --

Column 21, Line 10 at Claim 6; replace:
"generating route information for a route, wherein an a first" with
-- generating route information for a route, wherein a first --

Column 21, Line 62 at Claim 11; replace:
"generate route information for a route, wherein an a first" with
-- generate route information for a route, wherein a first --

Column 22, Line 6 at Claim 12; replace:
"generating route information for a route, wherein an a first" with
-- generating route information for a route, wherein a first --

Column 22, Line 57 at Claim 17; replace:
"generating route information for a route, wherein an a first" with
-- generating route information for a route, wherein a first --

Signed and Sealed this
Sixteenth Day of July, 2013

Teresa Stanek Rea
*Acting Director of the United States Patent and Trademark Office*